US012683543B2

(12) United States Patent
Gendell

(10) Patent No.: US 12,683,543 B2
(45) Date of Patent: Jul. 14, 2026

(54) DEPLOYABLE ARRAY STRUCTURE AND ASSEMBLY INCLUDING THE ARRAY STRUCTURE

(71) Applicant: Alexander Gendell, Hoboken, NJ (US)

(72) Inventor: Alexander Gendell, Hoboken, NJ (US)

( * ) Notice: Subject to any disclaimer, the term of this patent is extended or adjusted under 35 U.S.C. 154(b) by 3 days.

(21) Appl. No.: 18/617,124

(22) Filed: Mar. 26, 2024

(65) Prior Publication Data

US 2025/0309822 A1     Oct. 2, 2025

(51) Int. Cl.
*H02S 30/20*          (2014.01)
*H02S 20/10*          (2014.01)

(52) U.S. Cl.
CPC .............. *H02S 30/20* (2014.12); *H02S 20/10* (2014.12)

(58) Field of Classification Search
CPC ...................................................... H02S 30/20
See application file for complete search history.

(56) References Cited

U.S. PATENT DOCUMENTS 8,764,105 B2    7/2014  Gendell
9,214,892 B2   12/2015  White 9,352,853 B2    5/2016  Eskenazi et al.
2008/0163921 A1*  7/2008  Leong ................... H10F 77/147
                                                136/246
2009/0126775 A1*  5/2009  White ..................... H02S 30/20
                                                136/245

FOREIGN PATENT DOCUMENTS

CN          103925710 A  *  7/2014  .............. F24S 23/71

OTHER PUBLICATIONS

English machine translation of Bostaph (CN-103925710-A) provided by the EPO website, All Pages, 2025. (Year: 2025).*

* cited by examiner

*Primary Examiner* — Daniel P Malley, Jr.
(74) *Attorney, Agent, or Firm* — Armstrong Teasdale LLP

(57) ABSTRACT

An array assembly includes a base structure including a plurality of extendable legs. The array assembly includes a mast structure movably coupled to the base structure, and an array structure movably coupled to the mast structure. The array structure includes a plurality of arms spaced relative to each other, the plurality of arms are configurable between a collapsed position and an expanded position, wherein adjacent arms of the plurality of arms each define an axis of rotation. The adjacent arms are circularly movable around the axis of rotation relative to each other between the collapsed position and the expanded position.

20 Claims, 48 Drawing Sheets

DEPLOYABLE ARRAY STRUCTURE AND ASSEMBLY INCLUDING THE ARRAY STRUCTURE

STATEMENT OF GOVERNMENT SUPPORT

This invention was made with Government support under contracts 80NSSC21C0199, 80NSSC22CA159, 80NSSC23PB434 awarded by NASA. The Government has certain rights in the invention.

FIELD OF THE DISCLOSURE

The present disclosure is directed to a deployable array structure and an assembly that includes the array structure.

BACKGROUND OF THE DISCLOSURE

Traditionally, deployable array structures require a significant amount of user involvement to deploy the structure, which increases the complexity and time required. In addition, existing deployable array structures utilize a significant number of components with limited functionality. In some applications, user involvement is limited and package size and weight are a concern.

U.S. Pat. No. 9,214,892 to White et al. describes a solar array assembly including a plurality of triangular flexible blanket gores having solar cells. The solar array includes a static panel spar and a pivot panel together with the solar assembly being stowed therebetween in an accordion fashion. In deployment, the pivot panel rotates away from the static panel spar and about a hub assembly, thereby unfolding the solar array assembly. The solar array assembly is fully deployed when the pivot panel is latched to the static panel spar, thereby maintaining the desired preload tension on the solar array assembly.

U.S. Pat. No. 9,352,853 to Eskenazi et al. describes generally circular solar arrays that have an increased surface area when deployed compared to prior known circular solar arrays having a comparable stowed length. To deploy the solar array, the extension is first rotated into an extended position, after which gores of the solar array including solar cells are rotated about a hub at an end of the extension and unfolded.

U.S. Pat. No. 8,764,105 to Gendell describes a folding chair with a hinge utilizing the geometry of an offset pyramid. The pyramid support structure can be disposed in at least one closed and flat position and can be disposed in at least one open and resting position. The structure includes at least four axes, which are offset from one another and at least two of which intersect at offset apices. U.S. Pat. No. 8,764,105 is hereby incorporated by reference in its entirety.

Therefore, a need exists for a deployable solar array structure utilizing fewer components, which can be compacted for shipping, easy to deploy, and requires minimal or even no human intervention to deploy.

This background section is intended to introduce the reader to various aspects of art that may be related to various aspects of the present disclosure, which are described and/or claimed below. This discussion is believed to be helpful in providing the reader with supporting information to facilitate a better understanding of the various aspects of the present disclosure. Accordingly, it should be understood that these statements are to be read in this light, and not as admissions of prior art.

SUMMARY OF THE DISCLOSURE

The exemplary embodiments disclosed herein describe a deployable array structure.

In one aspect of the present disclosure, an array assembly includes a base structure including a plurality of extendable legs. The array assembly includes a mast structure movably coupled to the base structure, and an array structure movably coupled to the mast structure. The array structure includes a plurality of arms spaced relative to each other, the plurality of arms are configurable between a collapsed position and an expanded position, wherein adjacent arms of the plurality of arms each define an axis of rotation. The adjacent arms are circularly movable around the axis of rotation relative to each other between the collapsed position and the expanded position.

In another aspect, an array structure configured to engage with an array assembly, the array structure including a first set of arms and a second set of arms spaced relative to each other, at least one of the arms of the first set of arms and at least one of the arms of the second set of arms define an axis of rotation therebetween. The array structure includes an adjustable mechanism assembly aligned with a longitudinal axis and configured to move between a first position and a second position. The array structure includes each of the first set of arms movably coupled to a corresponding support member and each of the second set of arms movably coupled to the adjustable mechanism assembly. Movement of the adjustable mechanism assembly between the first position and the second position causes the corresponding support member to move from a first position to a second position, wherein the corresponding support member in the second position causes each of the first set of arms to move circularly relative to the corresponding axis of rotation and in a direction away from each of the second set of arms. Each of the second set of arms moves circularly relative to the corresponding axis of rotation as the corresponding support member moves from the first position to the second position, wherein the array structure is in an expanded position when the corresponding support member is in the second position.

In yet another aspect, a method of moving an array assembly between a collapsed position and an expanded position. The array assembly includes a base structure, a mast structure movably coupled to the base structure, and an array structure movably coupled to the mast structure. The array structure includes a plurality of arms spaced relative to each other, wherein adjacent arms of the plurality of arms each define an axis of rotation. The method includes moving the base structure in a vertical direction away from the mast structure and the array structure. The method includes expanding the base structure. The method includes extending the mast structure and the array structure to a predetermined position that is a distance from the base structure in the vertical direction. The method includes expanding the array structure such that each of the plurality of arms move circularly around the axis of rotation until two leading arms of the plurality of arms move into a predetermined position.

As used herein, "a", "an", and "the" refer to both singular and plural referents unless the context clearly dictates otherwise.

As used herein, the term "about" refers to a measurable value such as a parameter, an amount, a temporal duration, and the like and is meant to include variations of +/−15% or less, preferably variations of +/−10% or less, more preferably variations of +/−5% or less, even more preferably variations of +/−1% or less, and still more preferably variations of +/−0.1% or less of and from the particularly recited value, in so far as such variations are appropriate to perform in the invention described herein. Furthermore, it is also to be understood that the value to which the modifier "about" refers is itself specifically disclosed herein.

As used herein, spatially relative terms, such as "beneath", "below", "lower", "above", "upper", "front", "back", "side", "left", "right", "rear", "top", "bottom", and the like, are used for ease of description to describe one element or feature's relationship to another element(s) or feature(s). It is further understood that the terms "front", "back", "left", and "right" are not intended to be limiting and are intended to be interchangeable, where appropriate. Further, it should be noted that the terms "first," "second," and the like herein do not denote any order, quantity, or relative importance, but rather are used to distinguish one element from another.

As used herein, the terms "comprise(s)", "comprising", and the like, specify the presence of stated features, integers, steps, operations, elements, and/or components, but do not preclude the presence or addition of one or more other features, integers, steps, operations, elements, components, and/or groups thereof.

As used herein, the terms "configure(s)", "configuring", and the like, refer to the capability of a component and/or assembly, but do not preclude the presence or addition of other capabilities, features, components, elements, operations, and any combinations thereof.

All ranges disclosed herein are inclusive of the endpoints, and the endpoints are independently combinable with each other. Each range disclosed herein constitutes a disclosure of any point or sub-range lying within the disclosed range.

All methods described herein can be performed in any suitable order unless otherwise indicated herein or otherwise clearly contradicted by context. The use of any and all examples, or exemplary language (e.g., "such as"), is intended merely to better illustrate the invention and does not pose a limitation on the scope of the invention or any embodiments unless otherwise claimed.

Any combination or permutation of features, functions, and/or embodiments as disclosed herein is envisioned. Additional advantageous features, functions, and applications of the disclosed systems, methods, and assemblies of the present disclosure will be apparent from the description which follows, particularly when read in conjunction with the appended figures. All references listed in this disclosure are hereby incorporated by reference in their entireties.

BRIEF DESCRIPTION OF THE DRAWINGS

Features and aspects of embodiments are described below with reference to the accompanying drawings, in which elements are not necessarily depicted to scale. Corresponding reference characters indicate corresponding parts throughout the several views of the drawings.

Exemplary embodiments of the present disclosure are further described with reference to the appended figures. It is to be noted that the various features, steps and combinations of features/steps described below and illustrated in the figures can be arranged and organized differently to result in embodiments which are still within the scope of the present disclosure.

Figure 1:
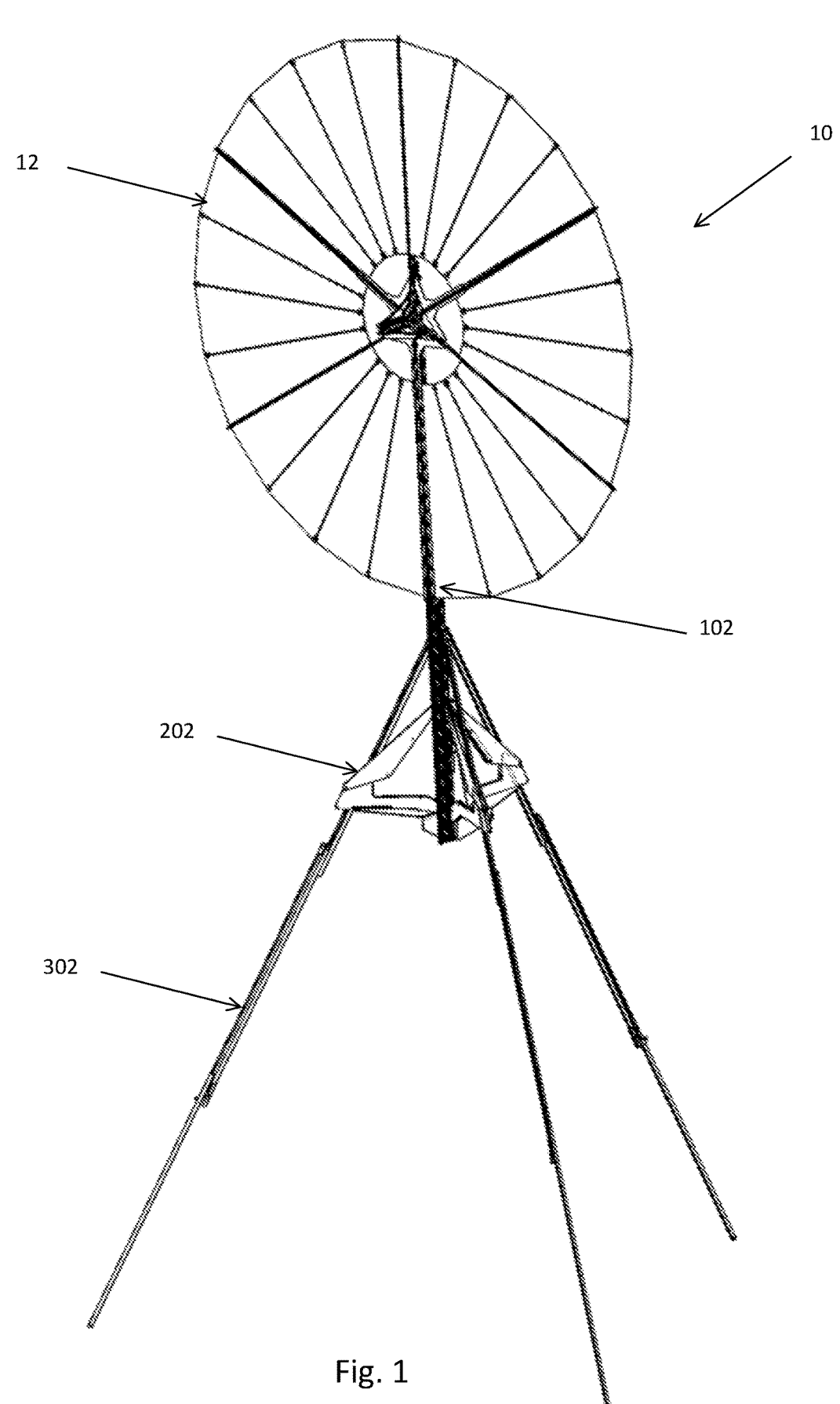
Figure 2:
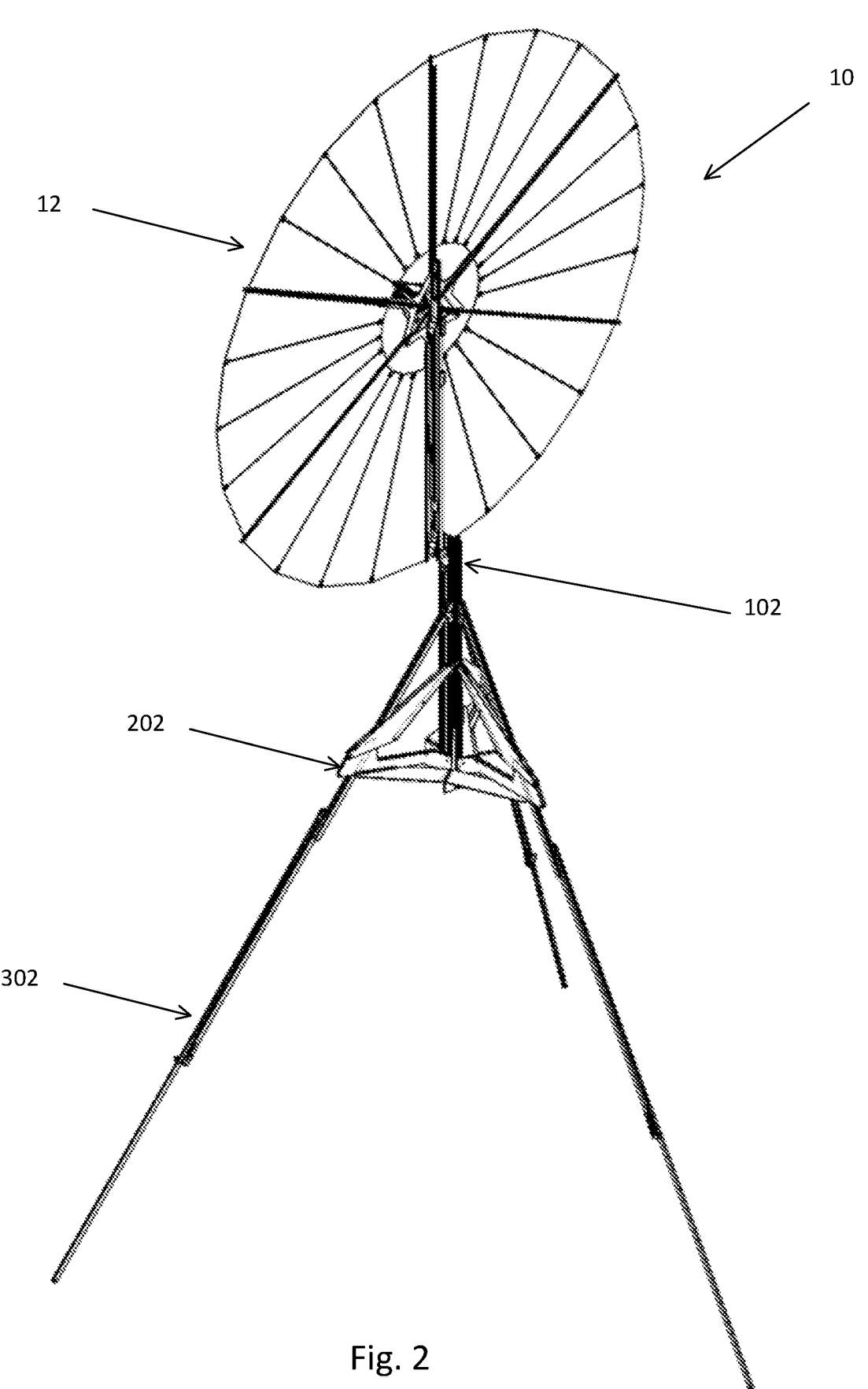
Figure 3:
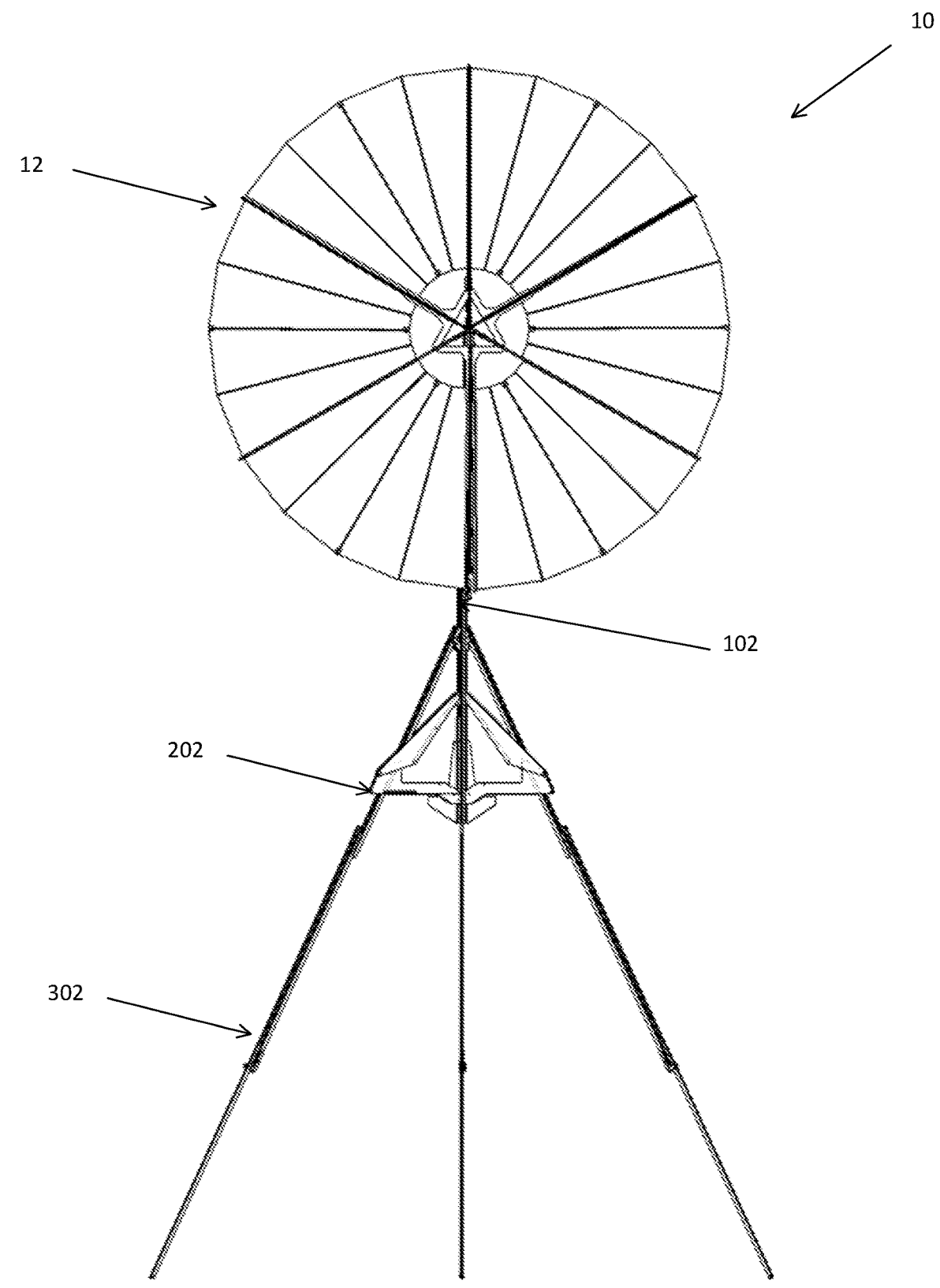
Figure 4:
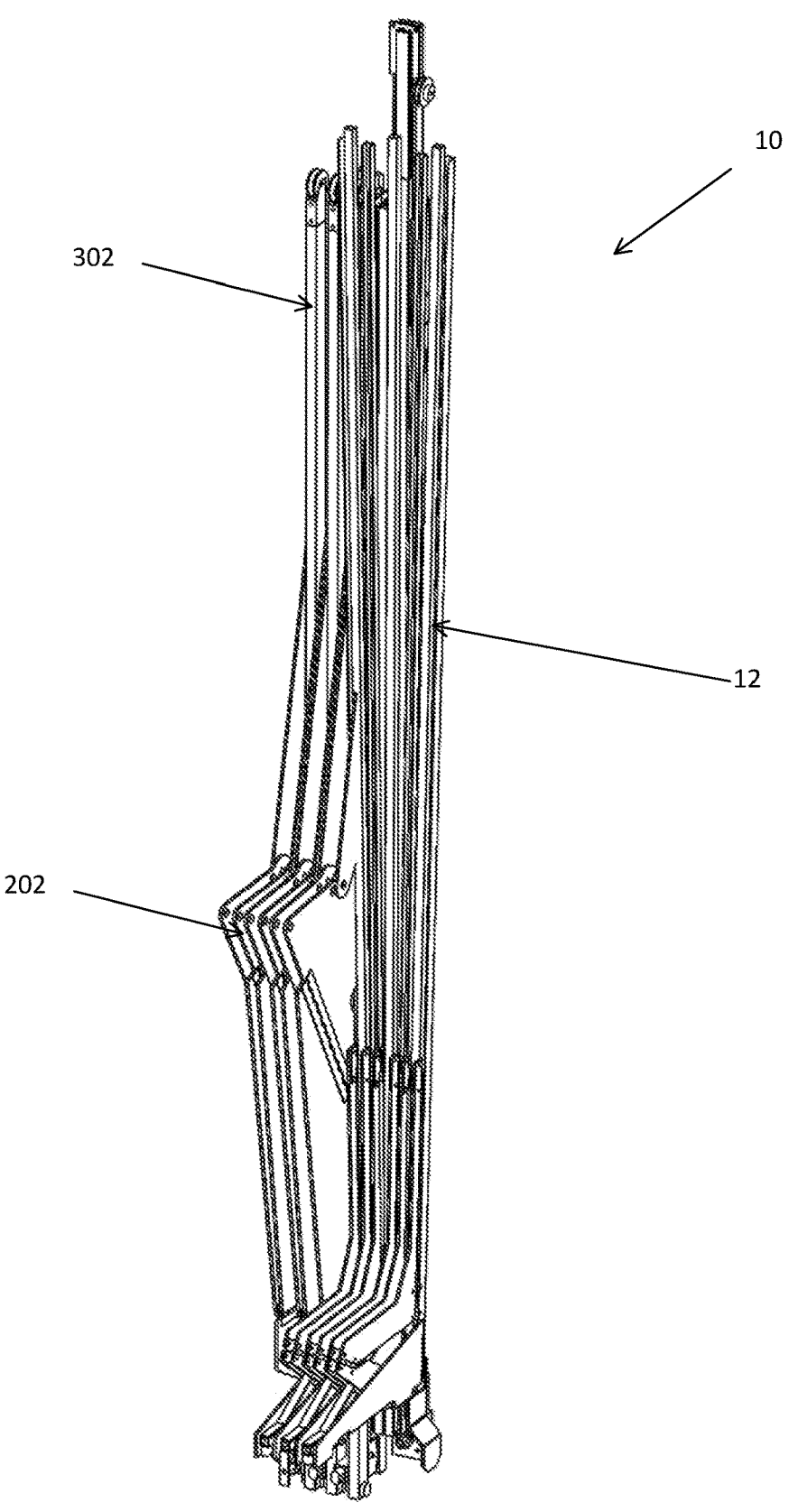
Figure 5:
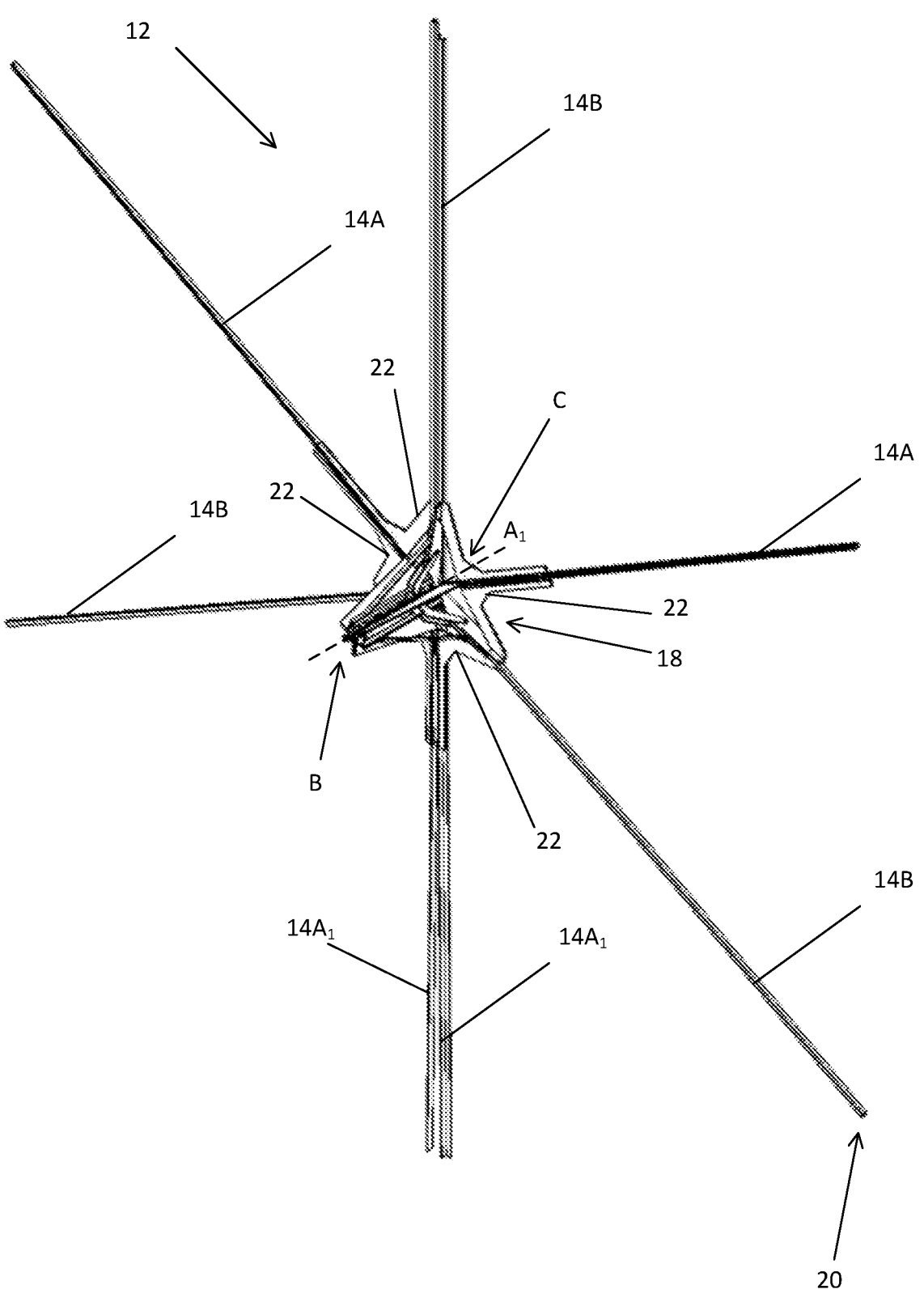
Figure 6:
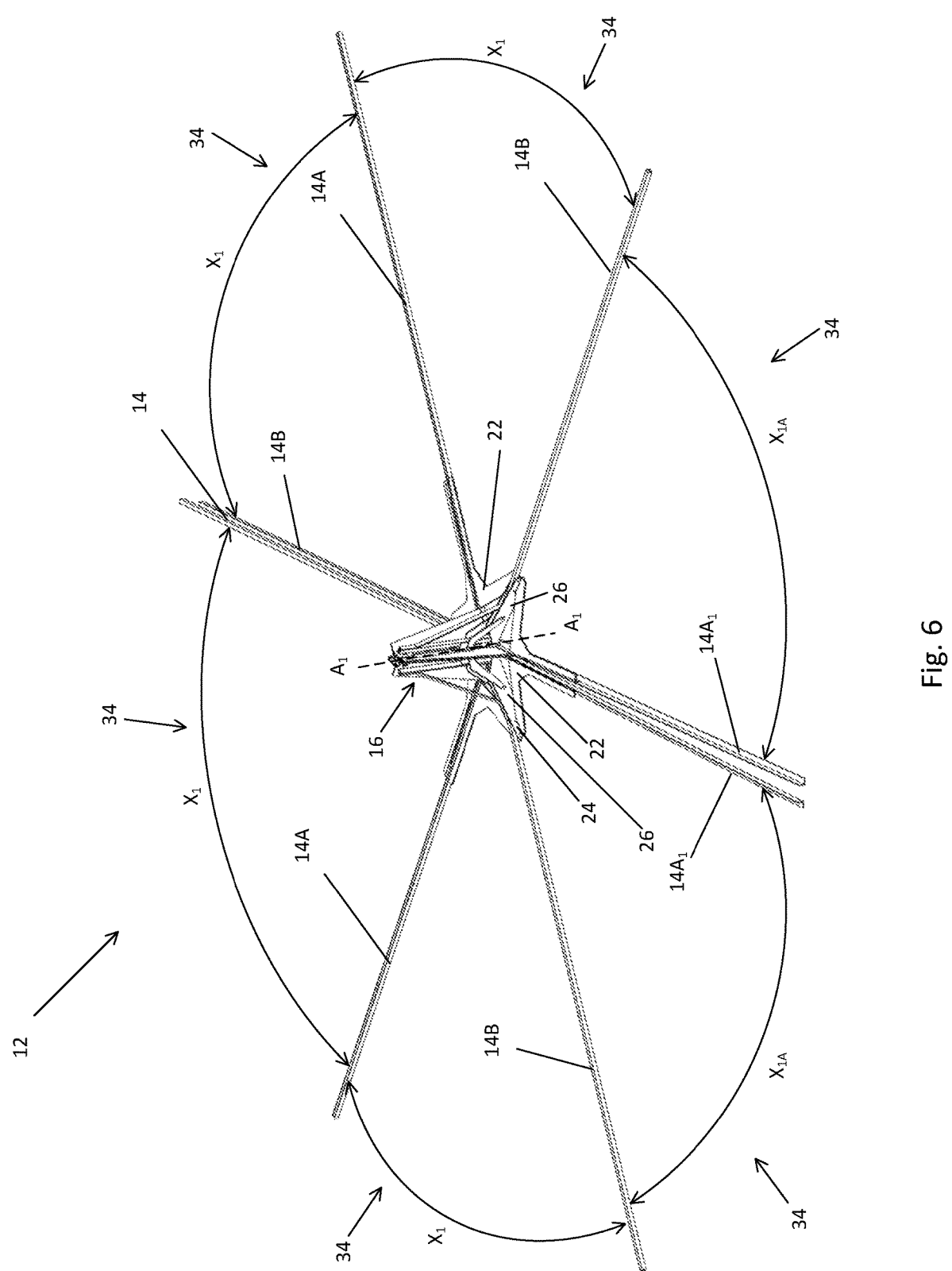
Figure 7:
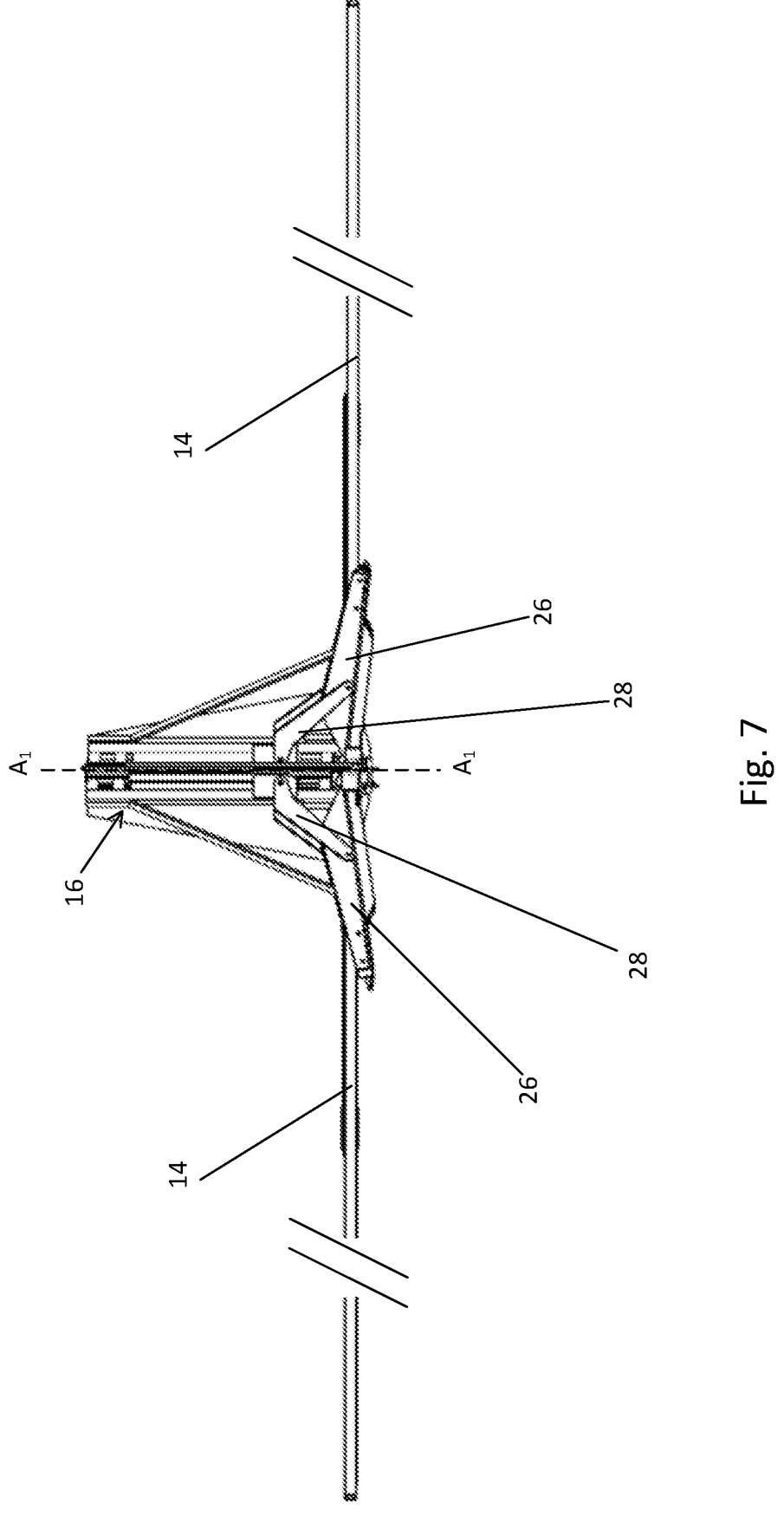
Figure 8:
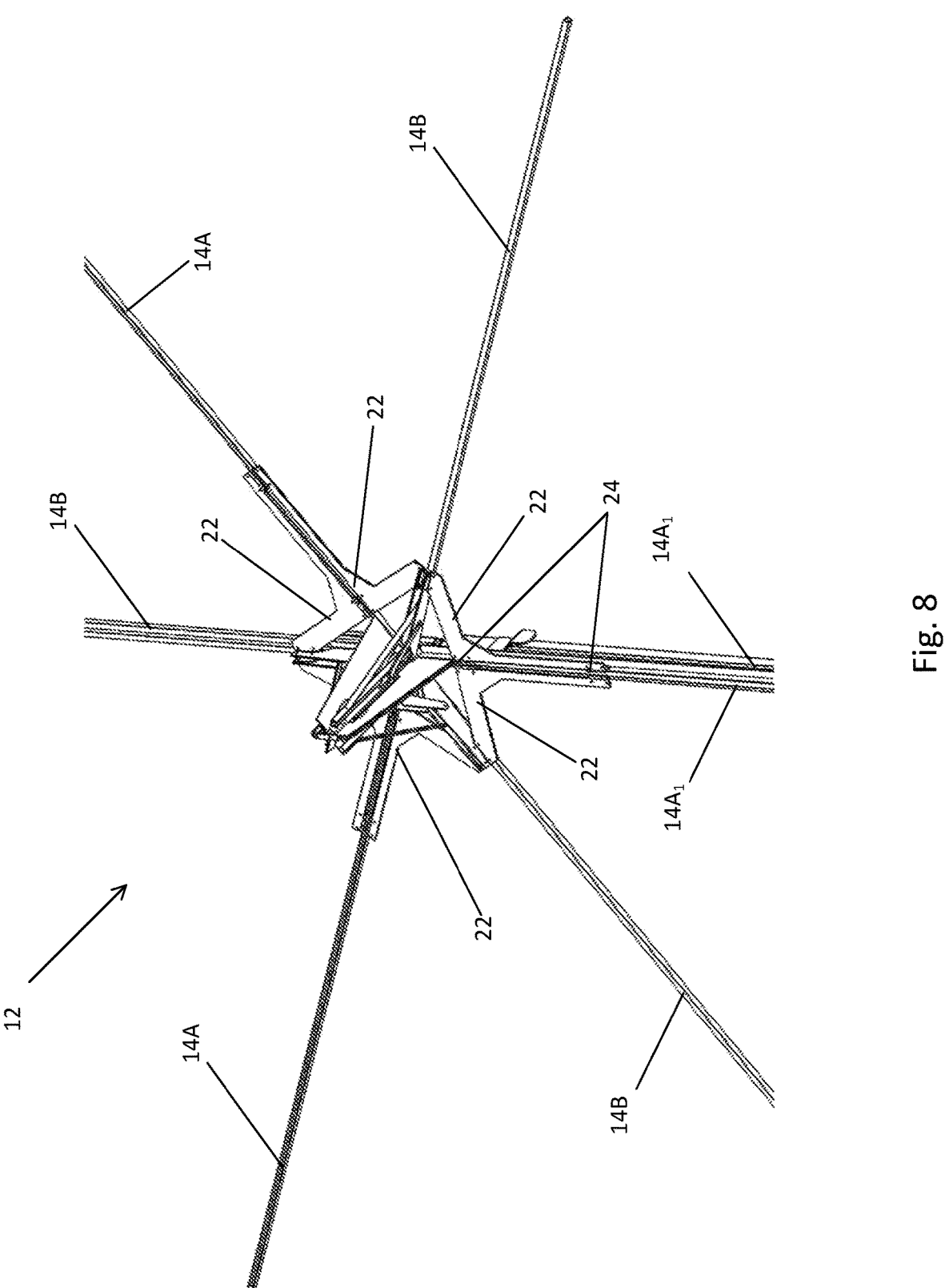
Figure 9:
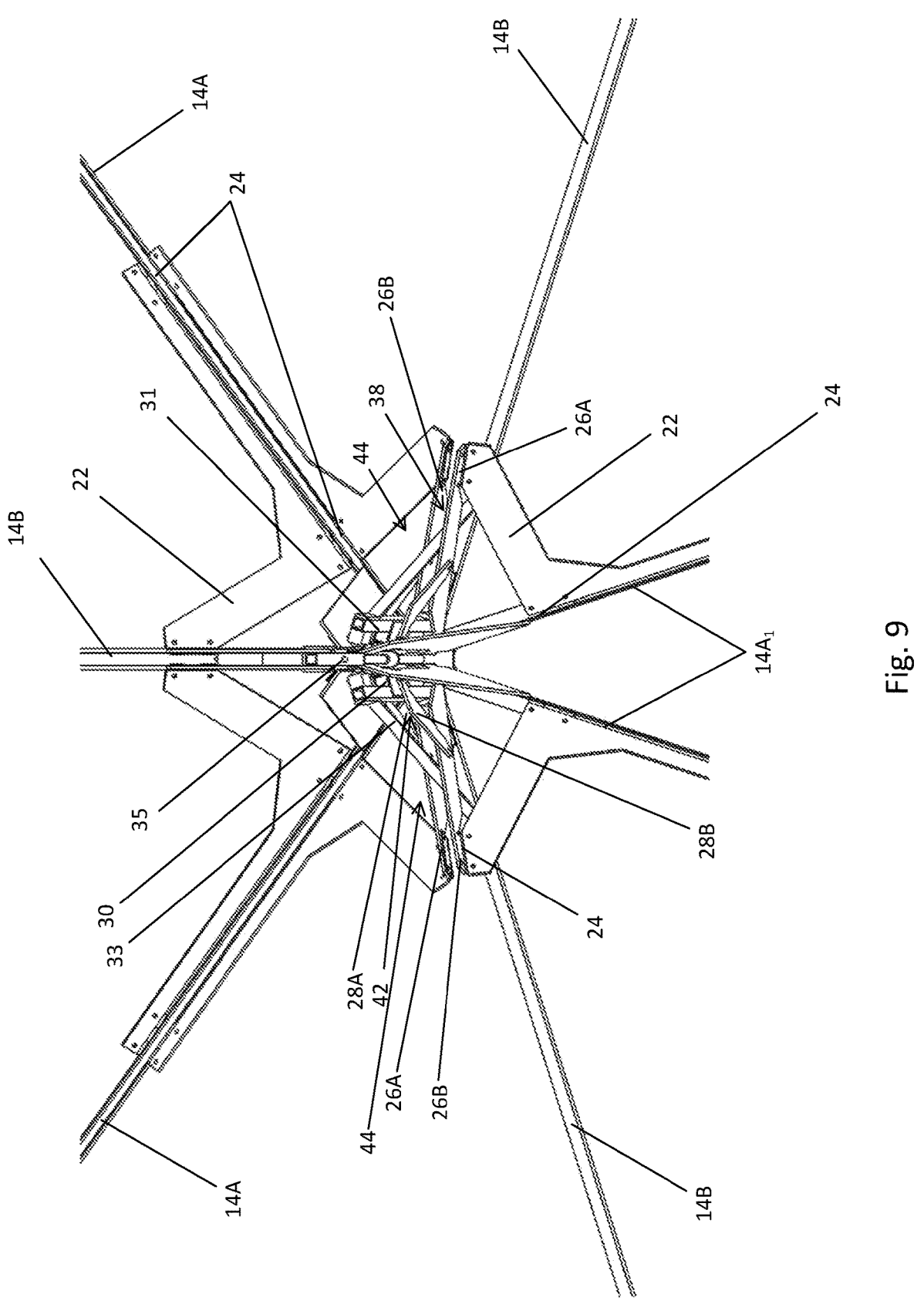
Figure 10:
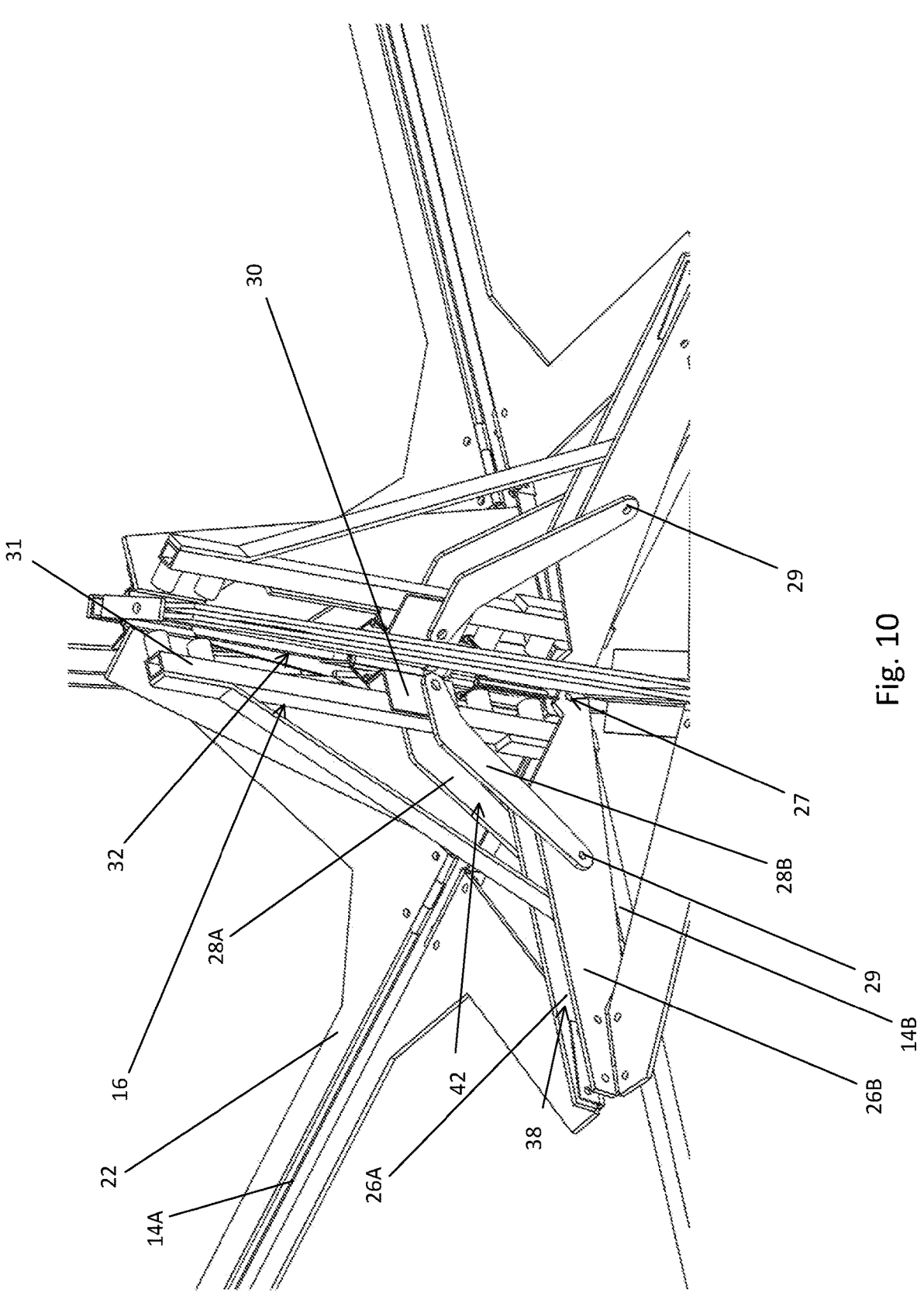
Figure 11:
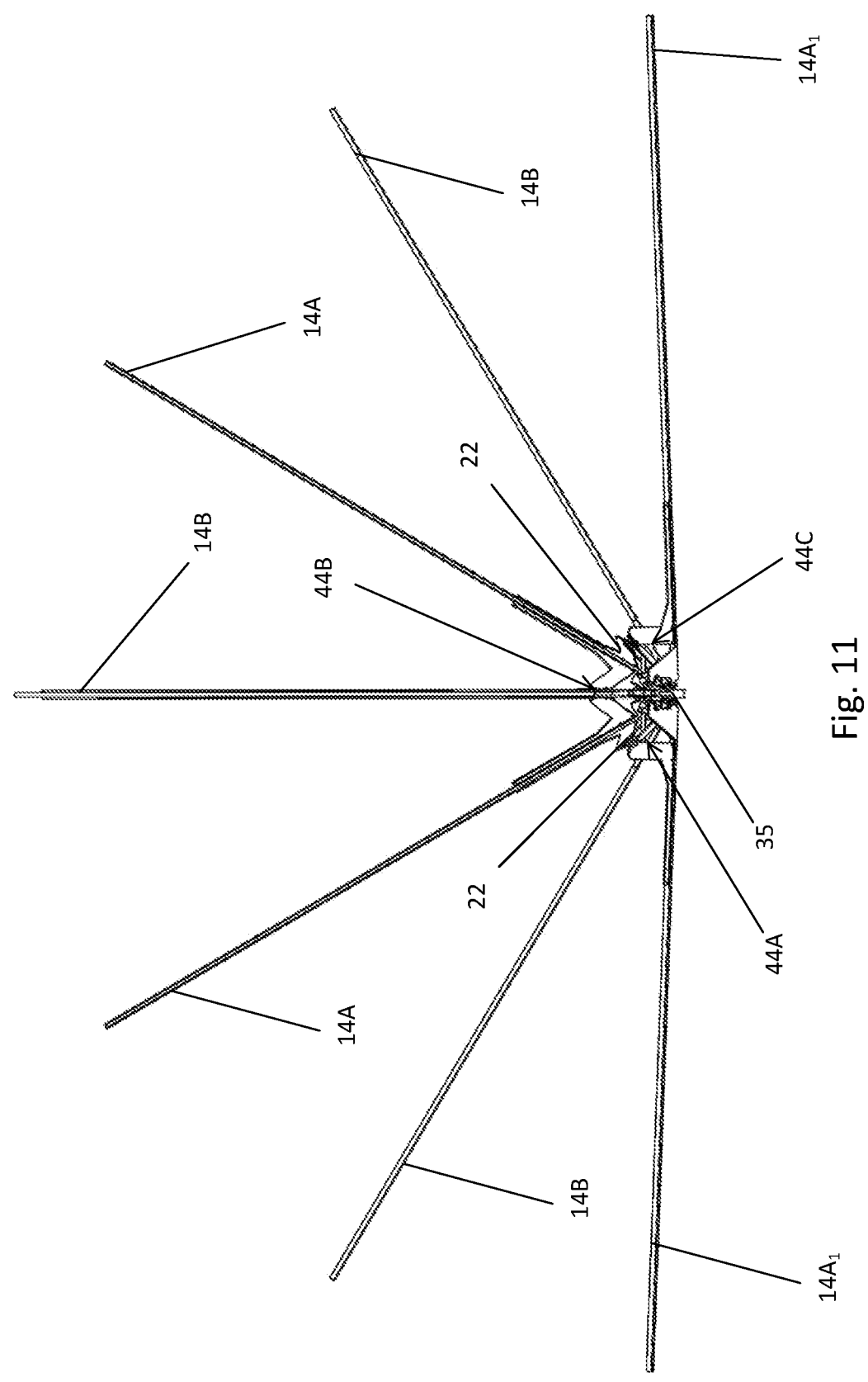
Figure 12:
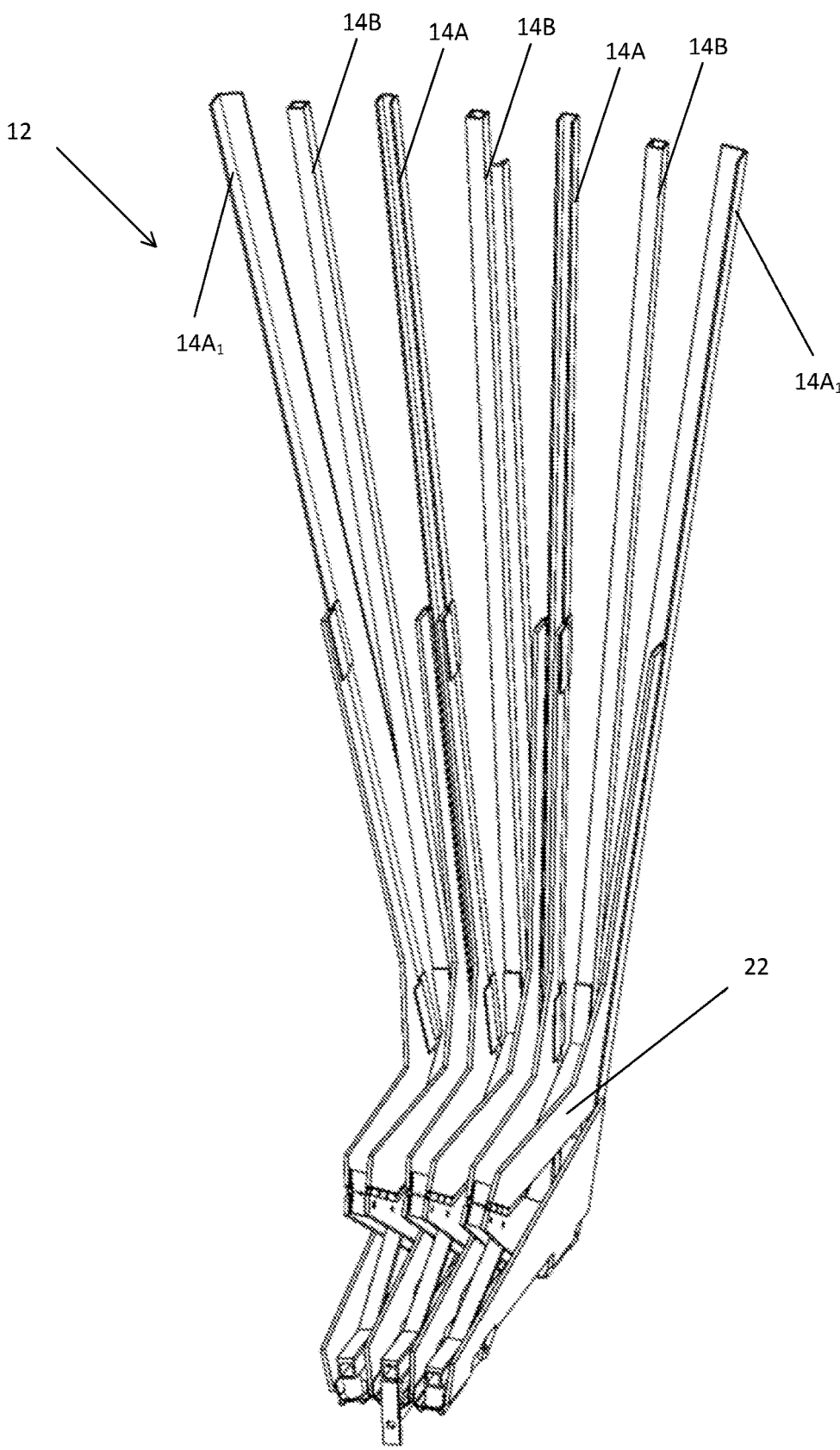
Figure 13:
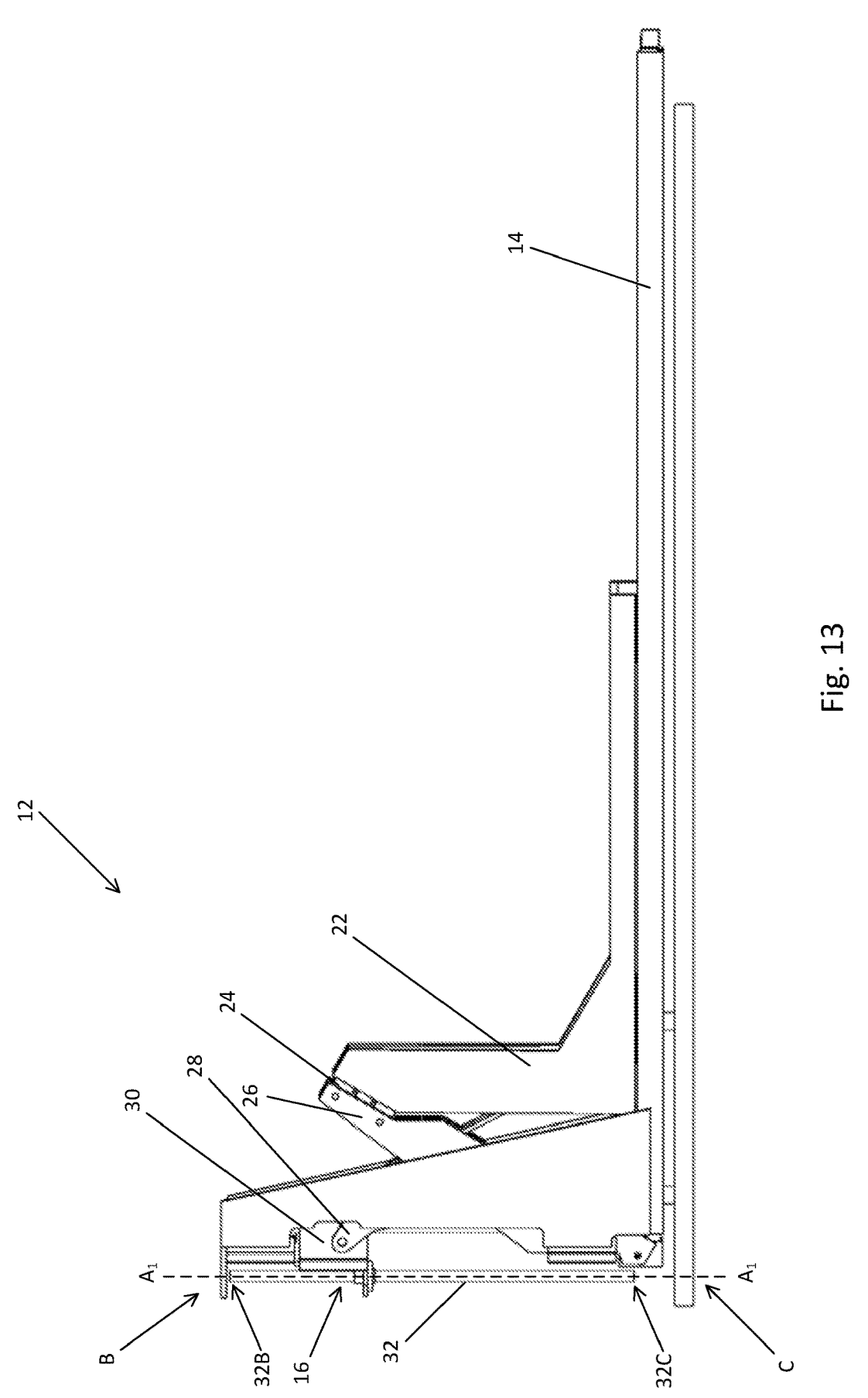
Figure 14:
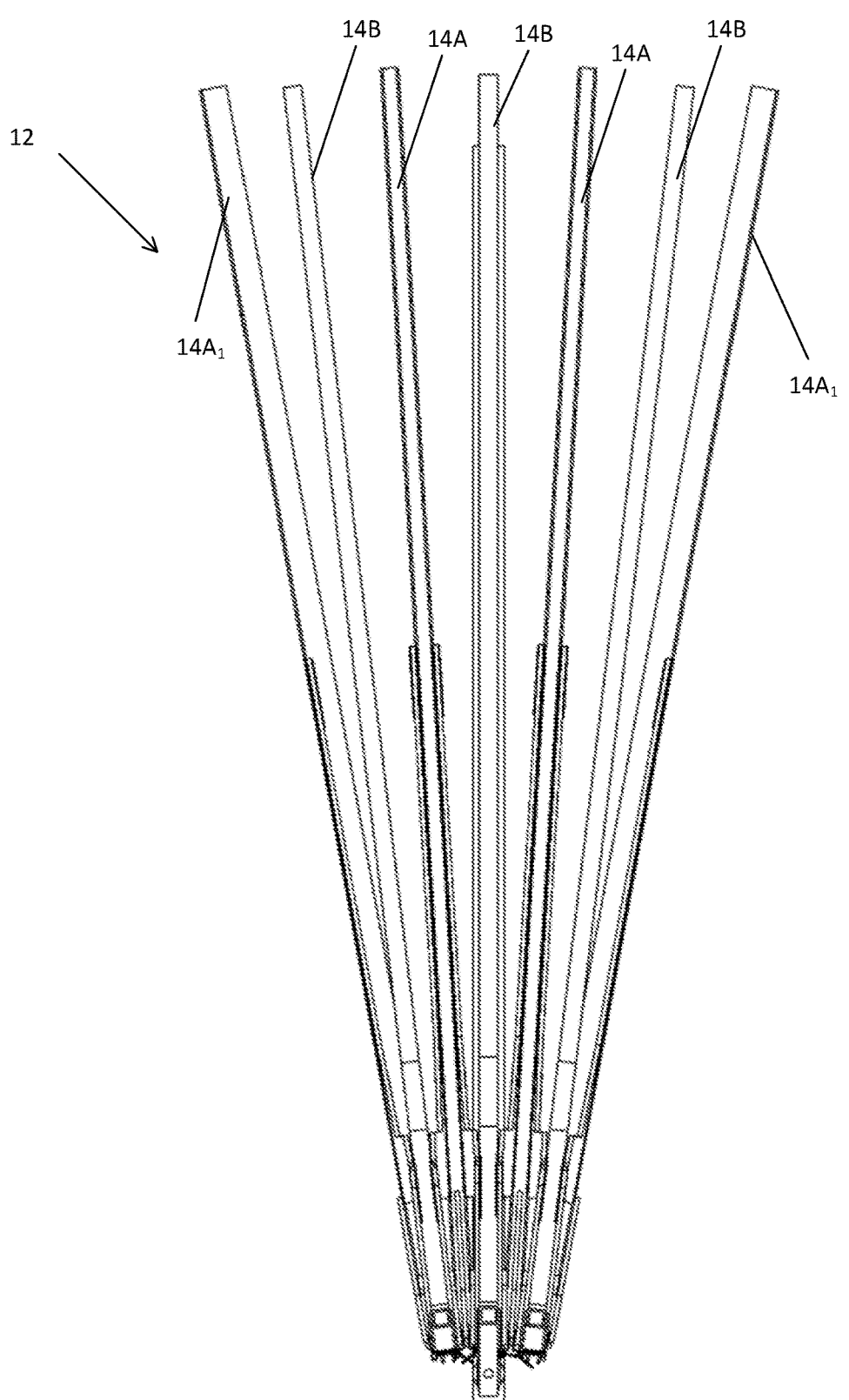
Figure 15:
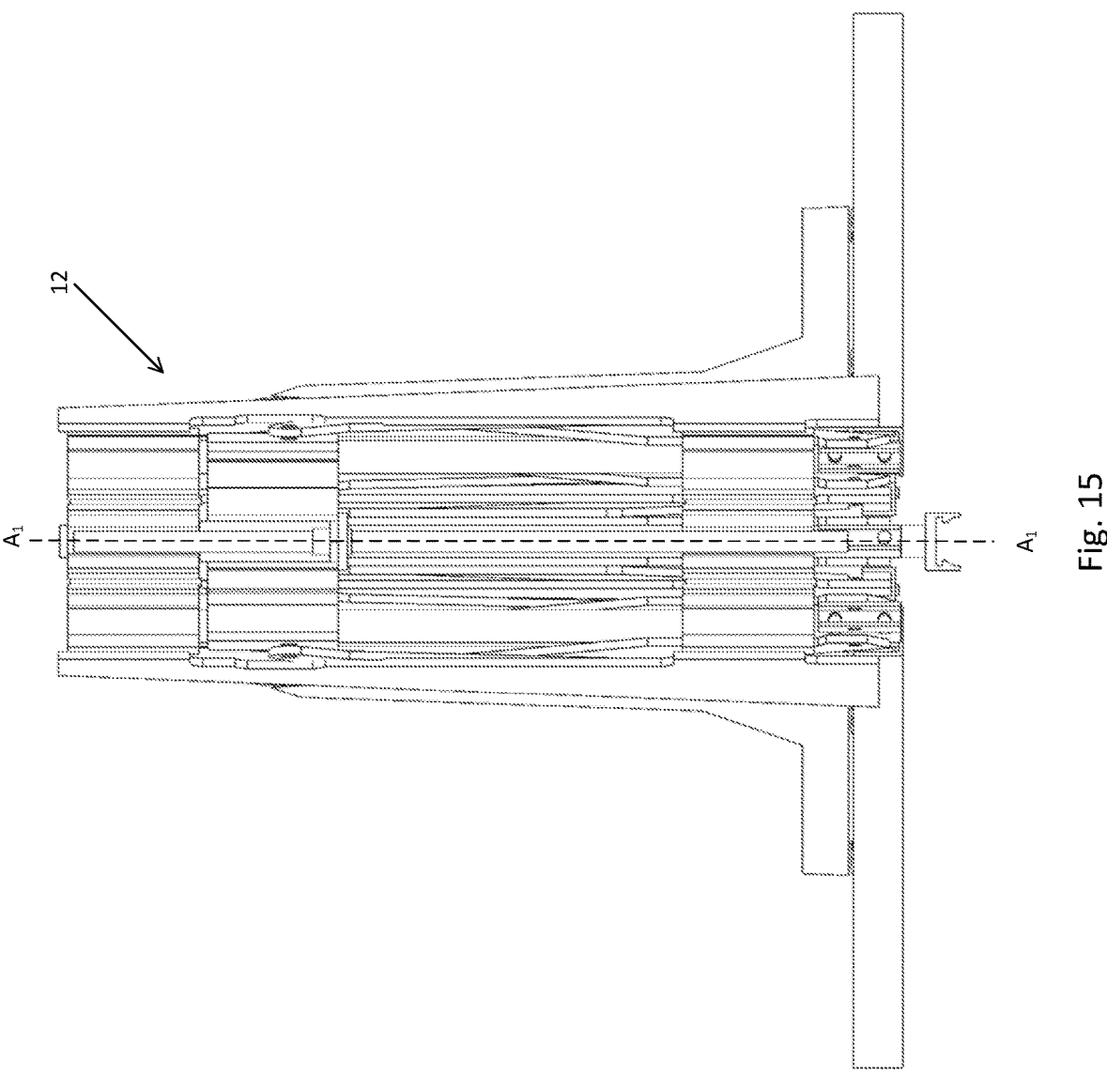
Figure 16:
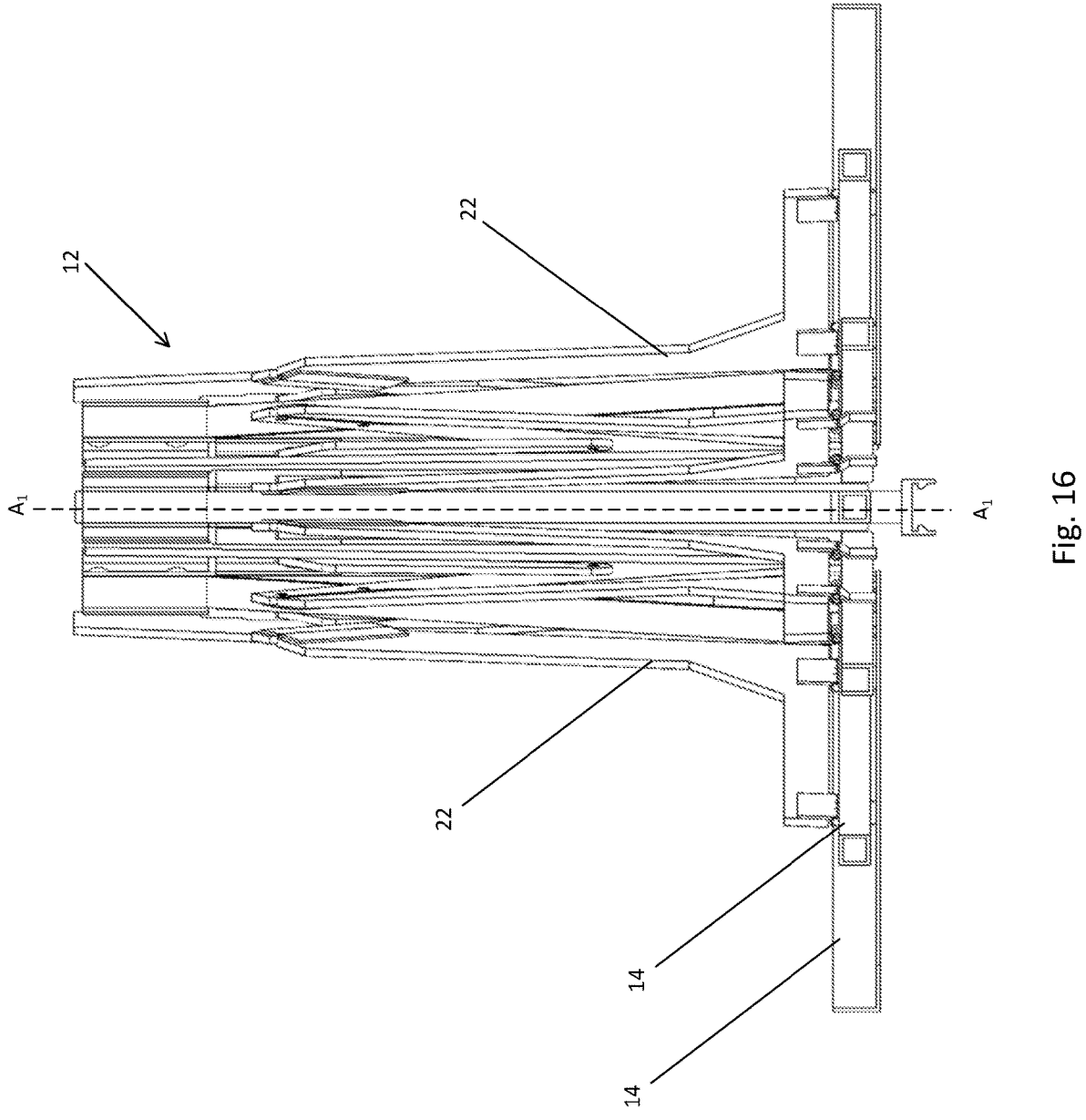
Figure 17:
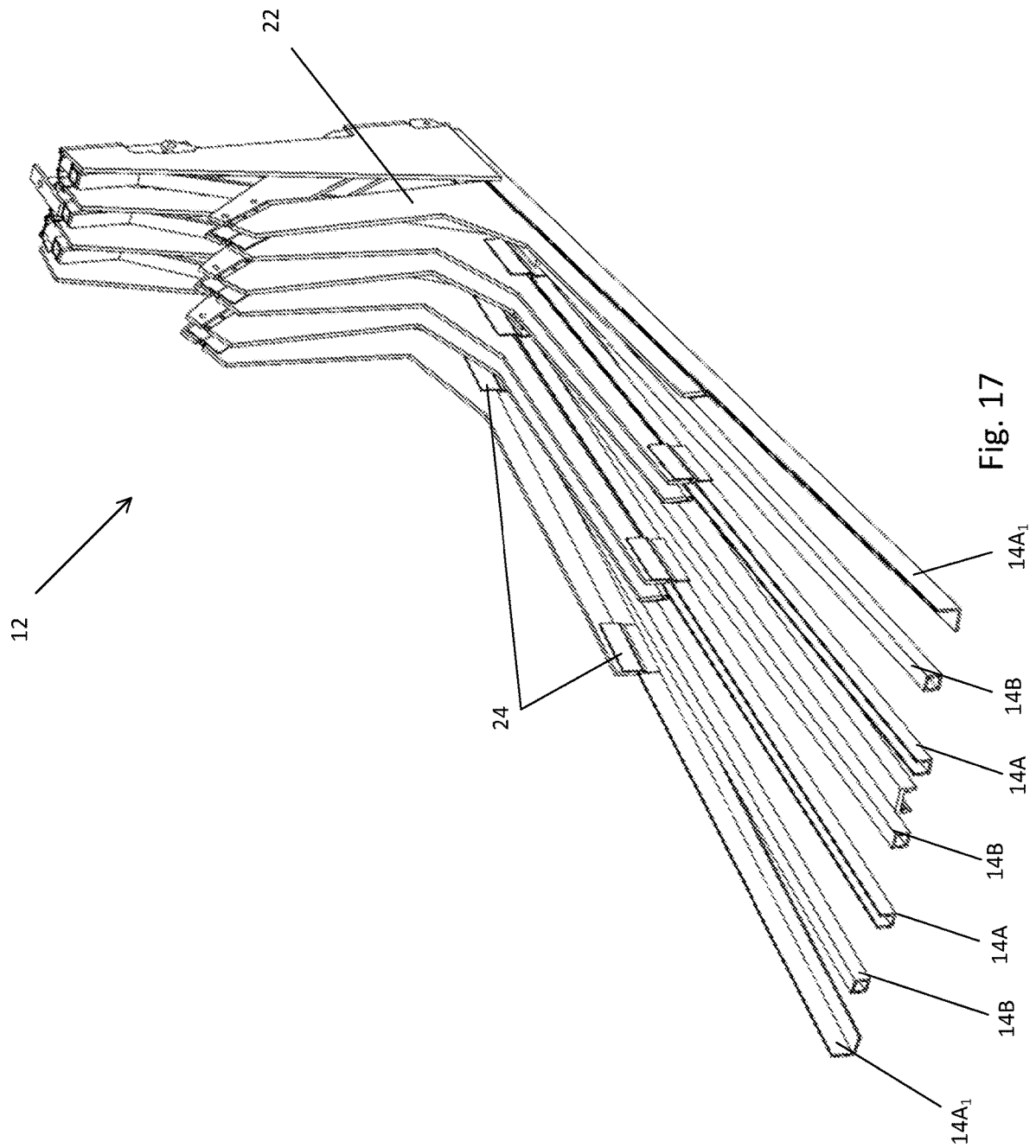
Figure 18:
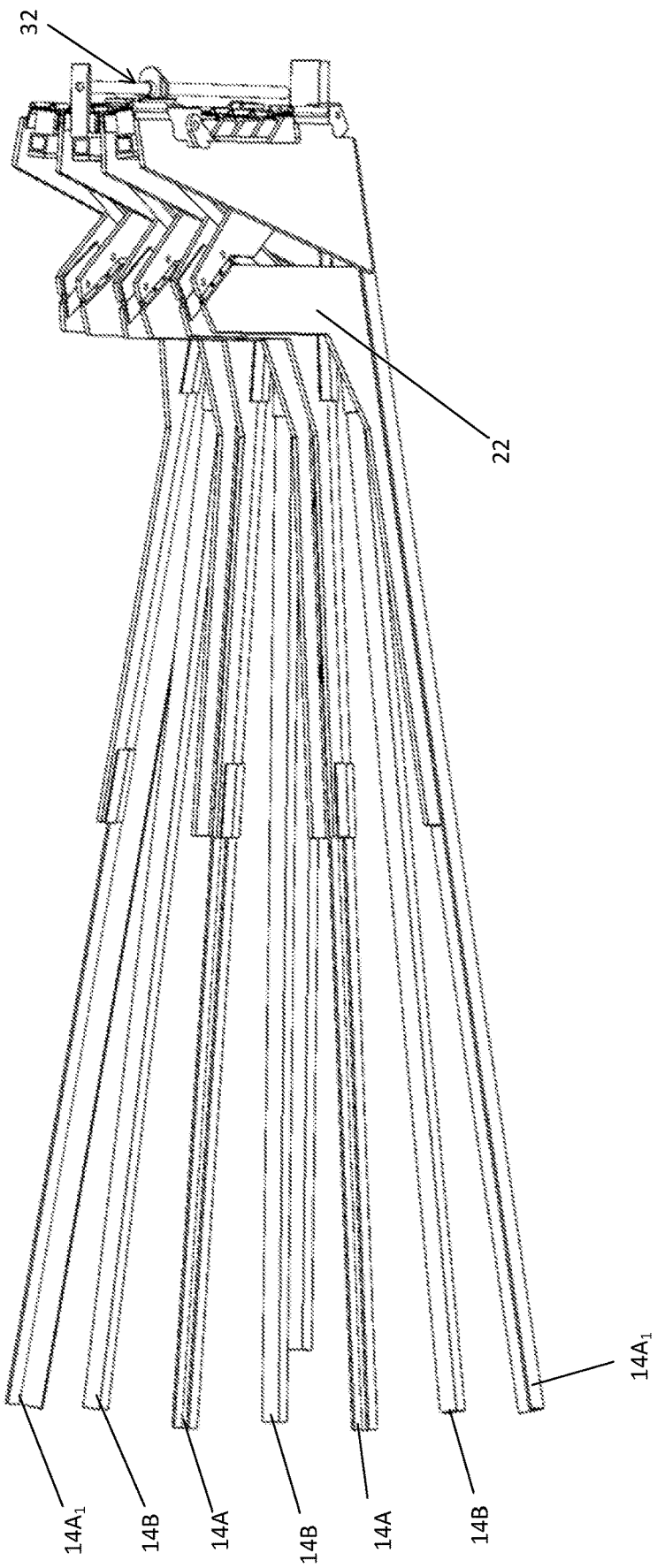
Figure 19:
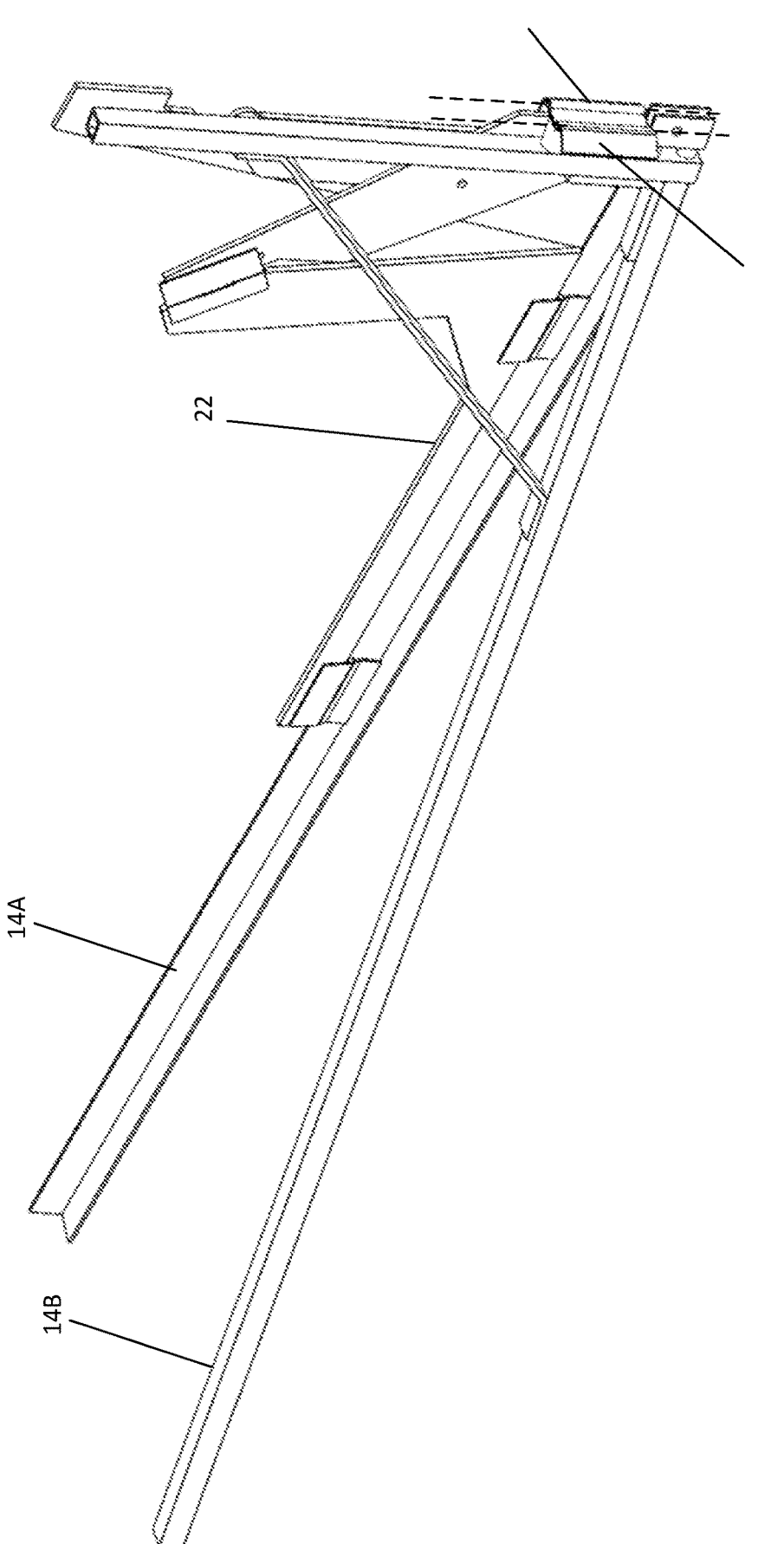
Figure 20:
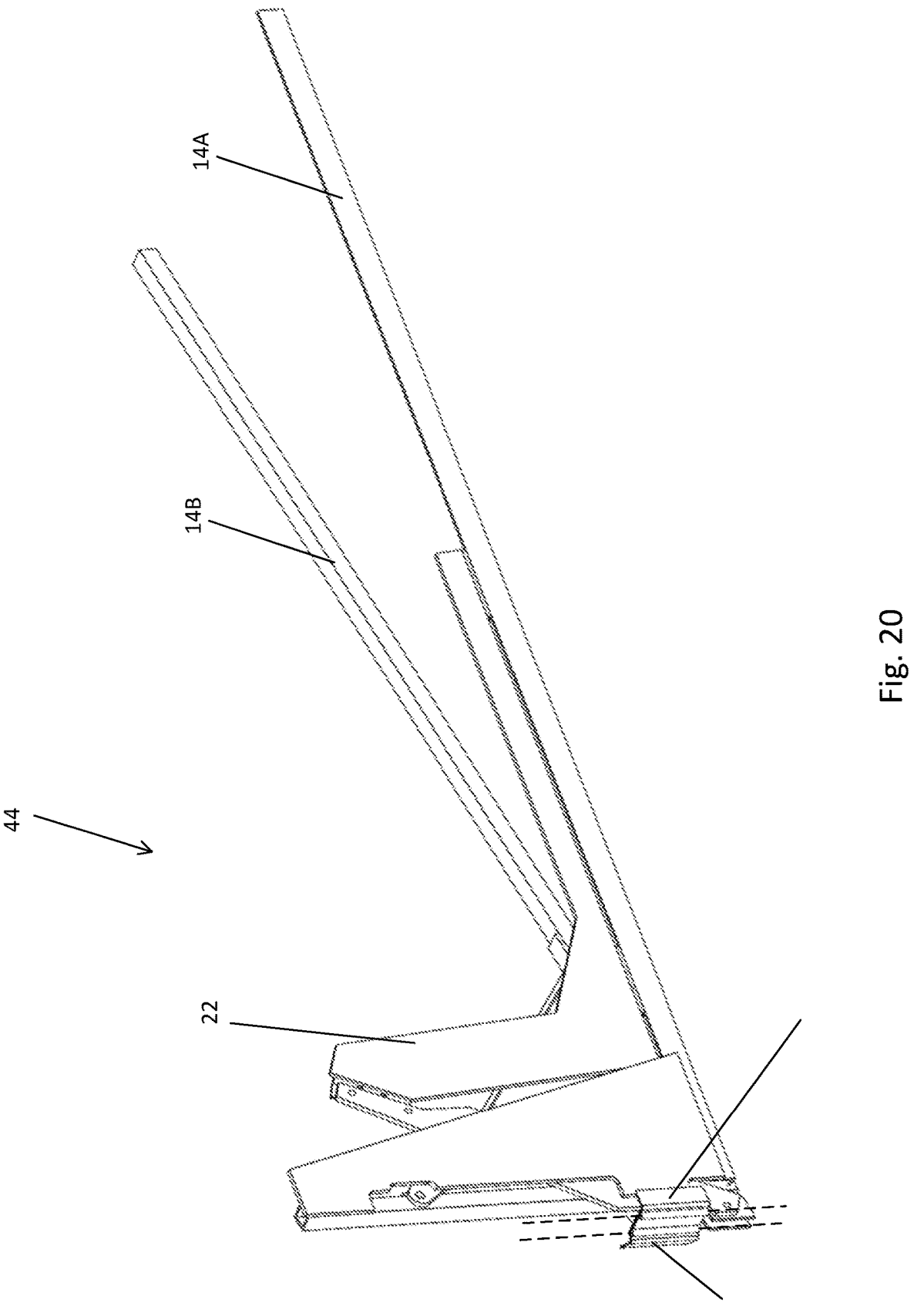
Figure 21:
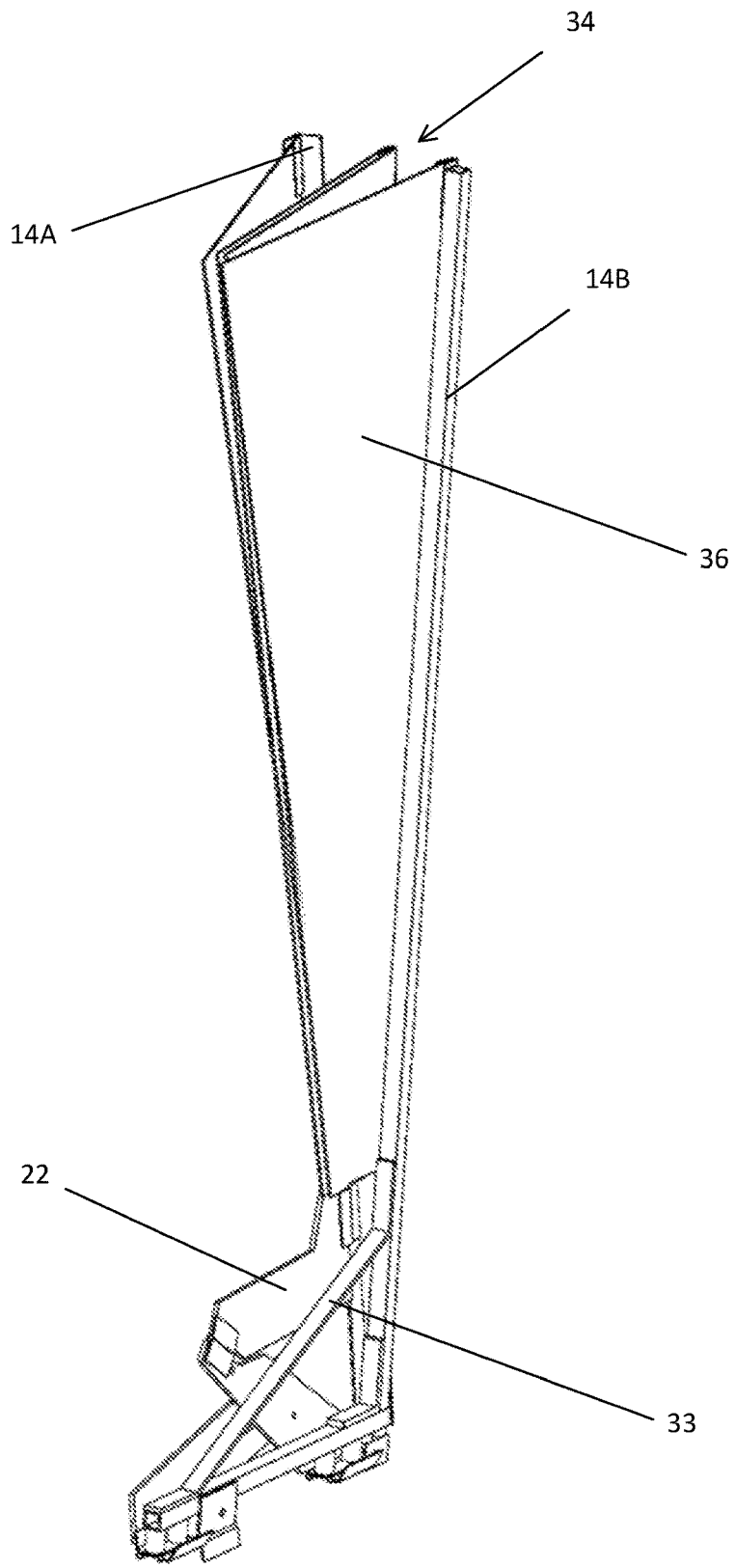
Figure 22A:
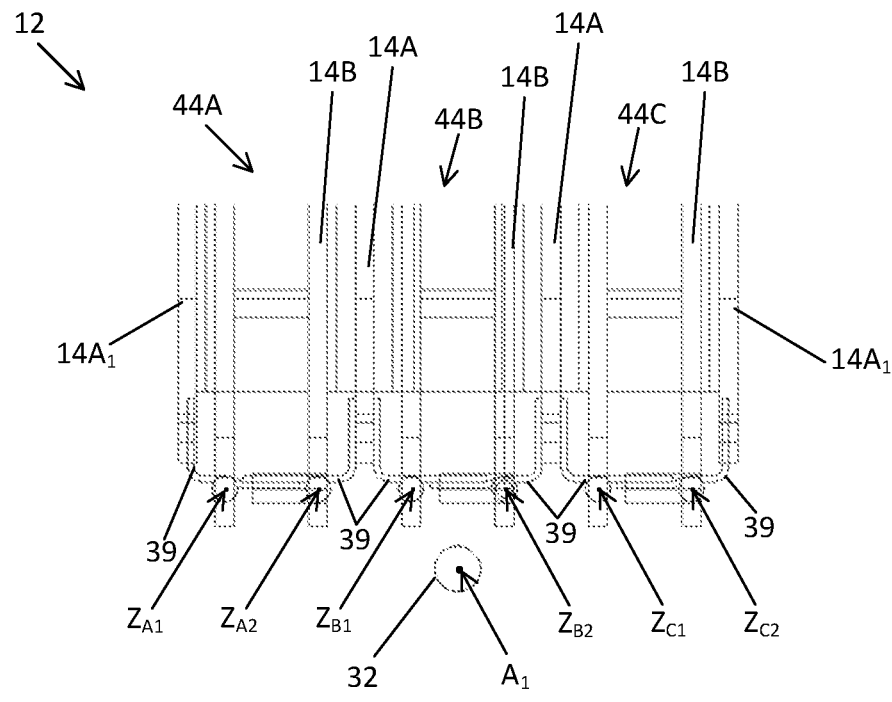
Figure 22B:
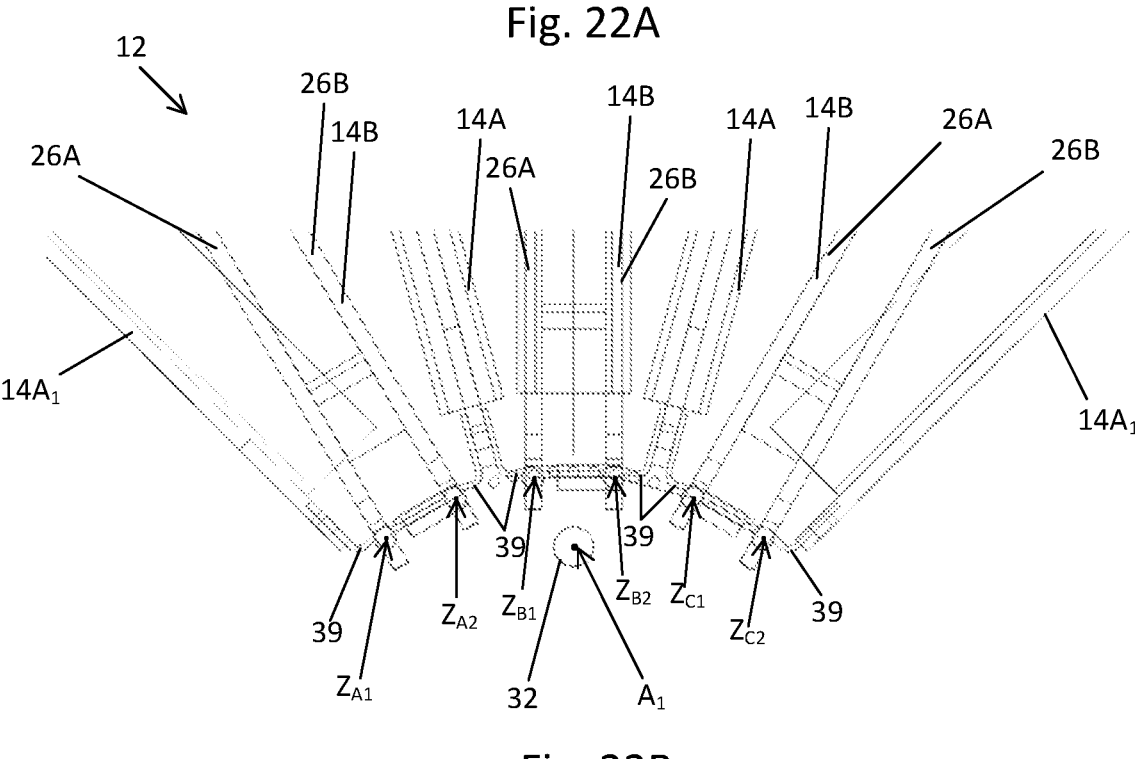
Figure 22E:
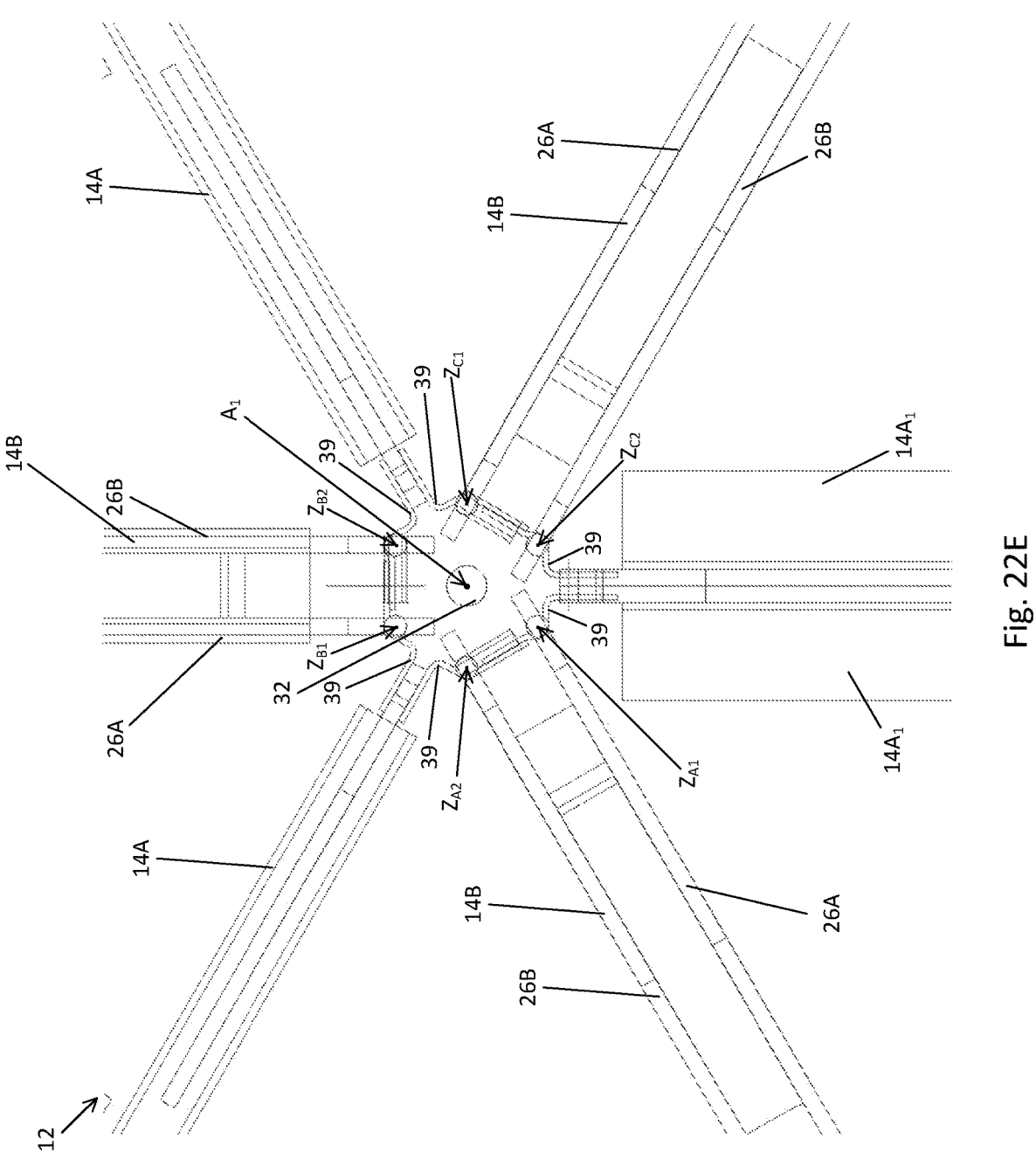
Figure 23:
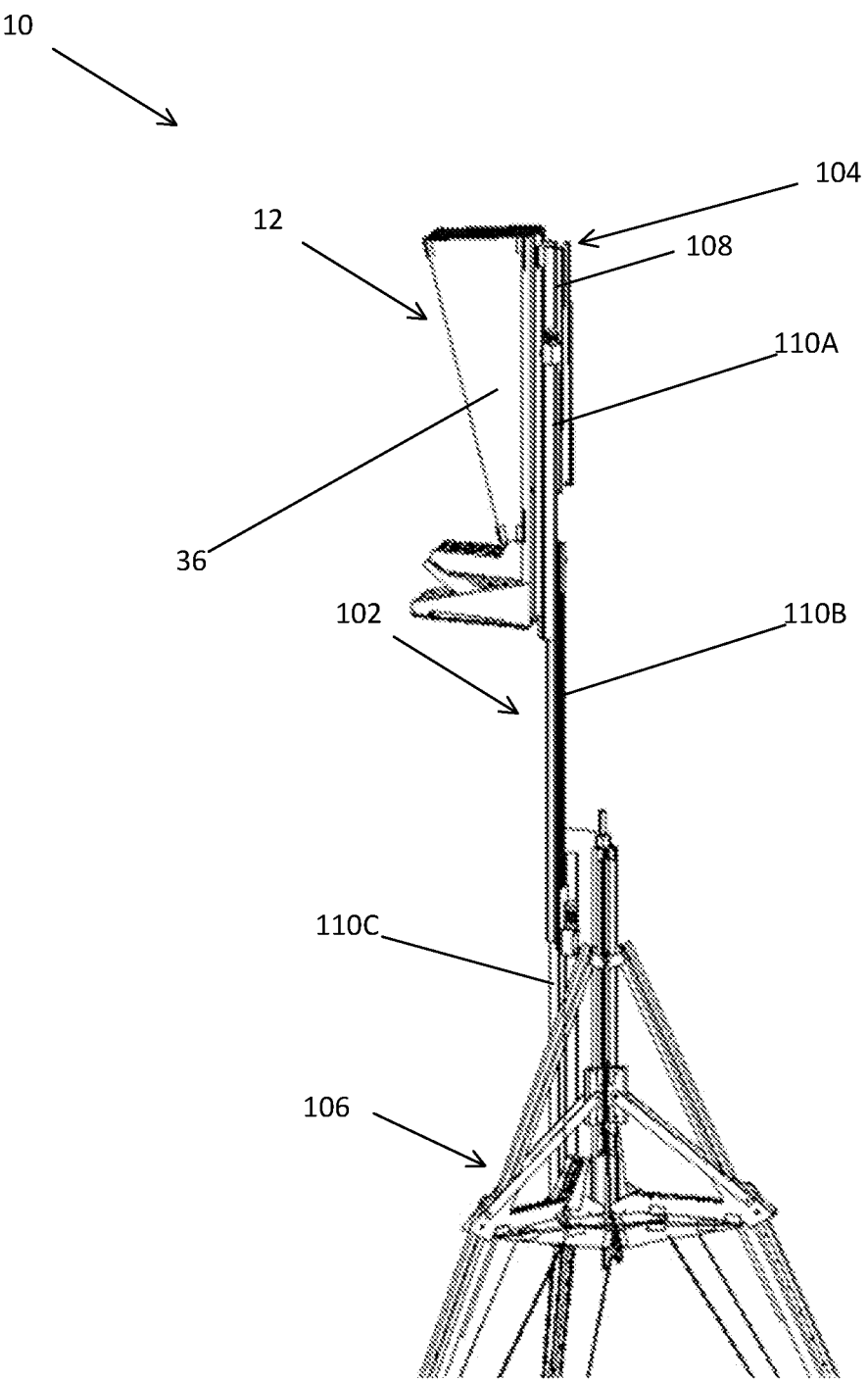
Figure 24:
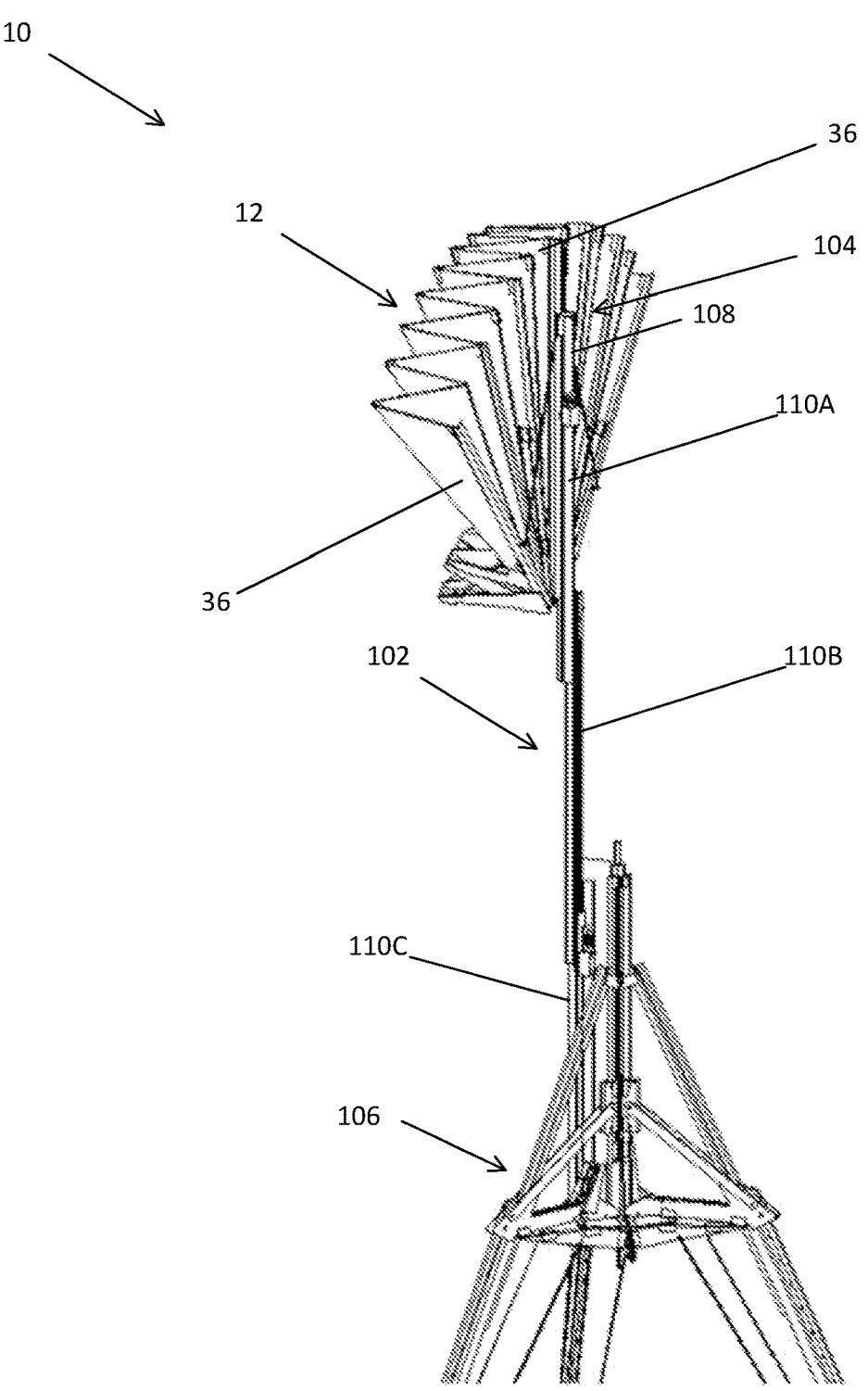
Figure 25:
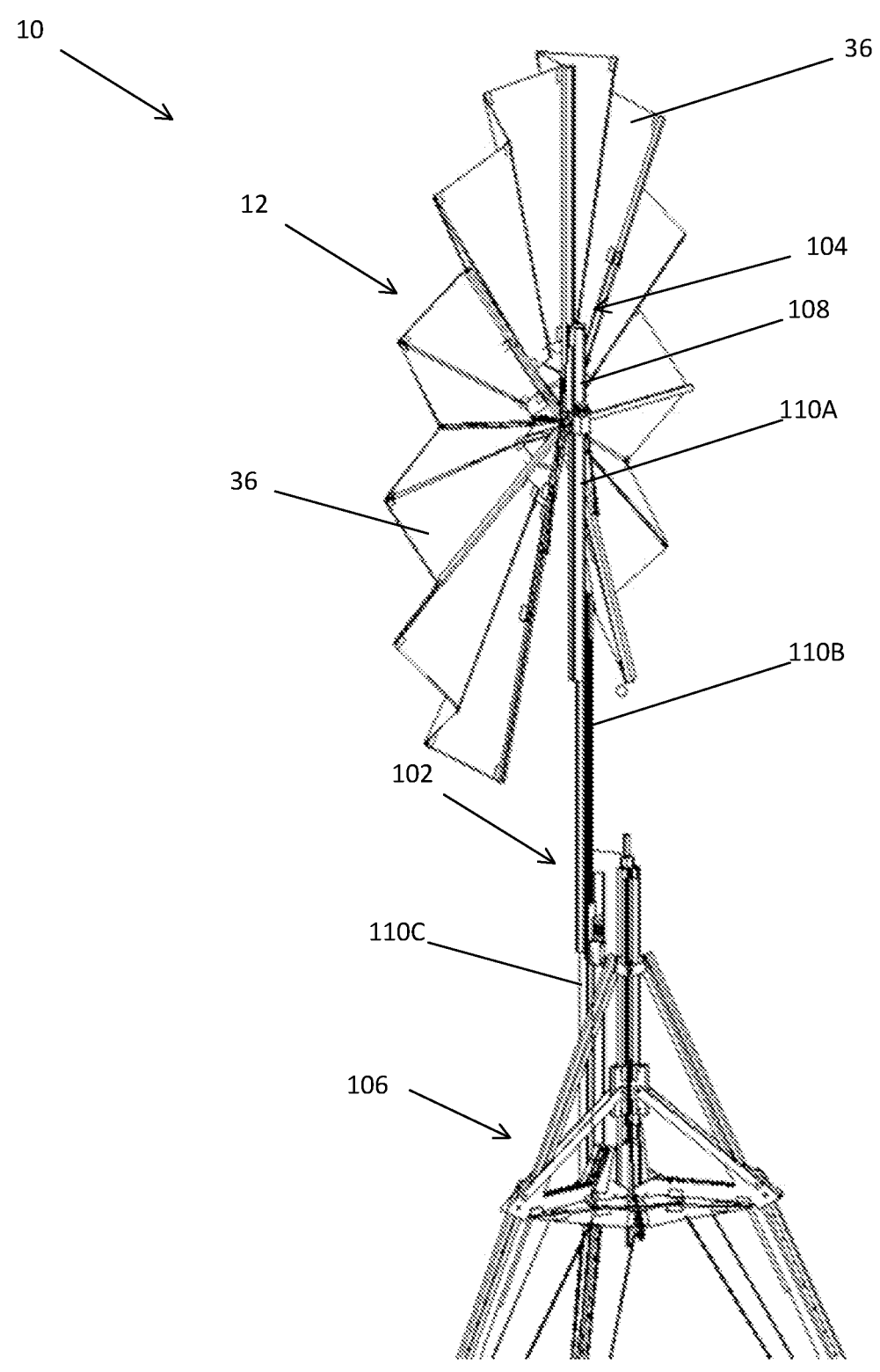
Figure 26:
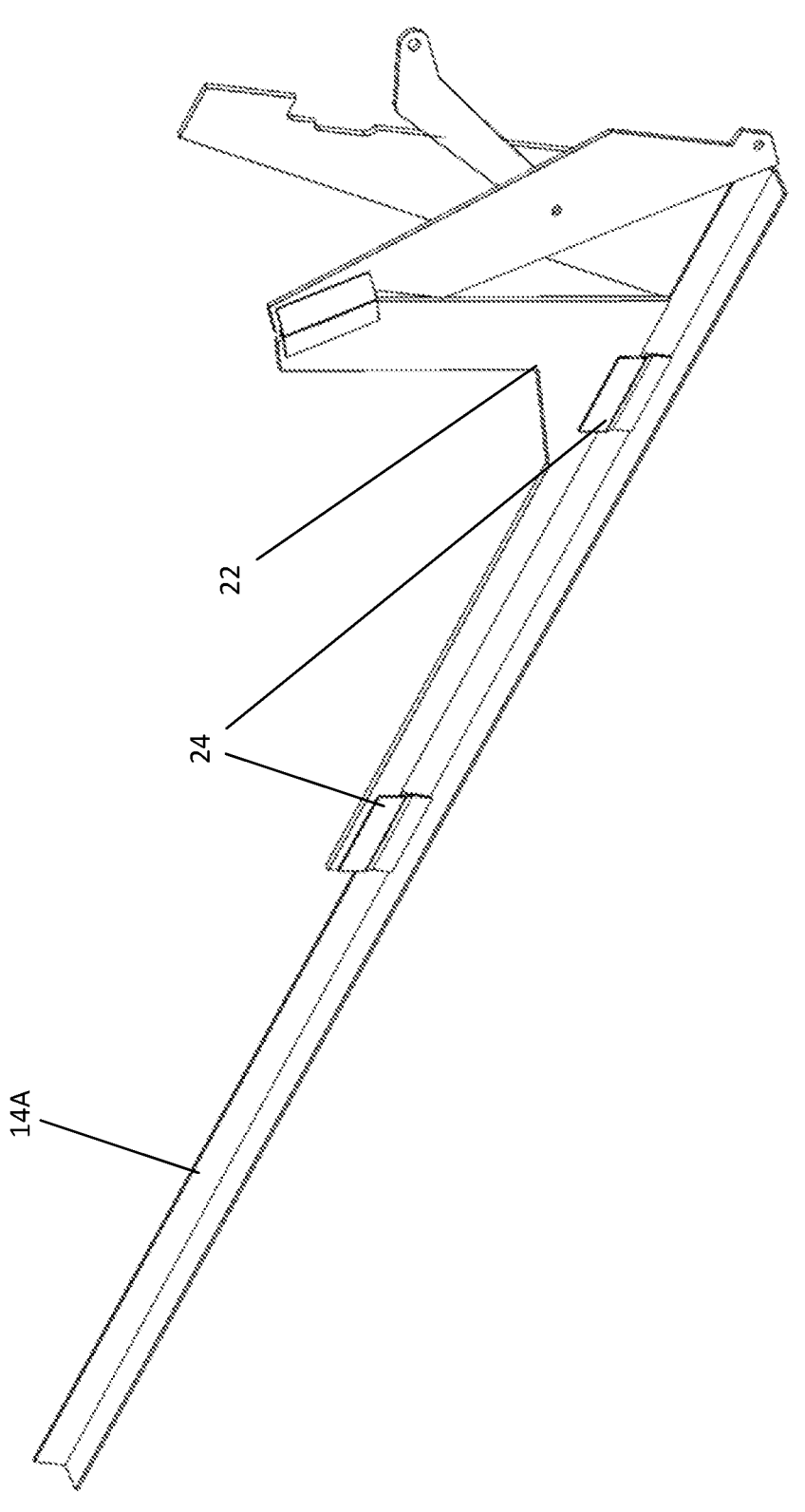
Figure 27A:
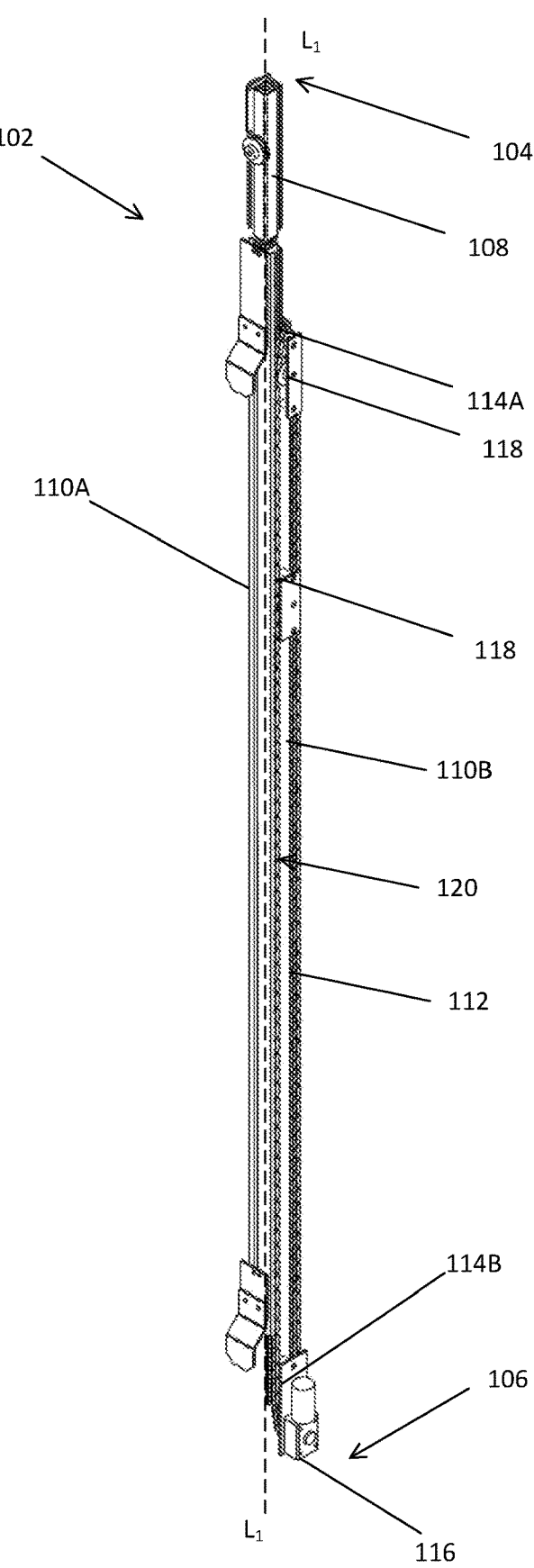
Figure 27B:
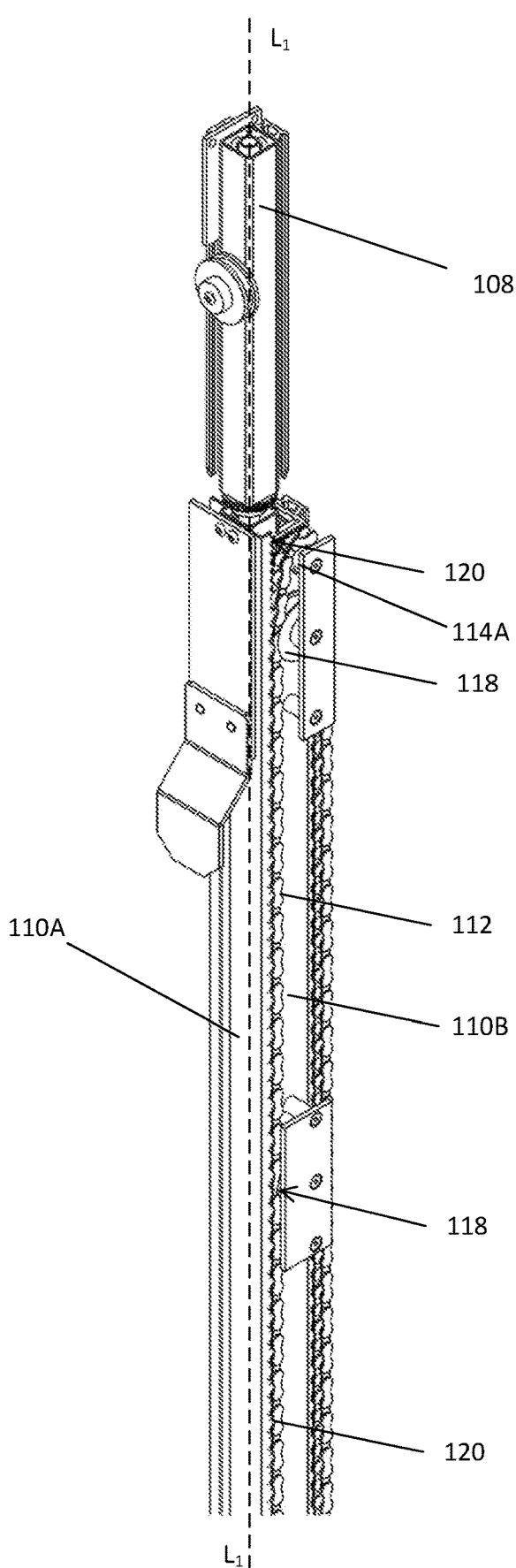
Figure 27C:
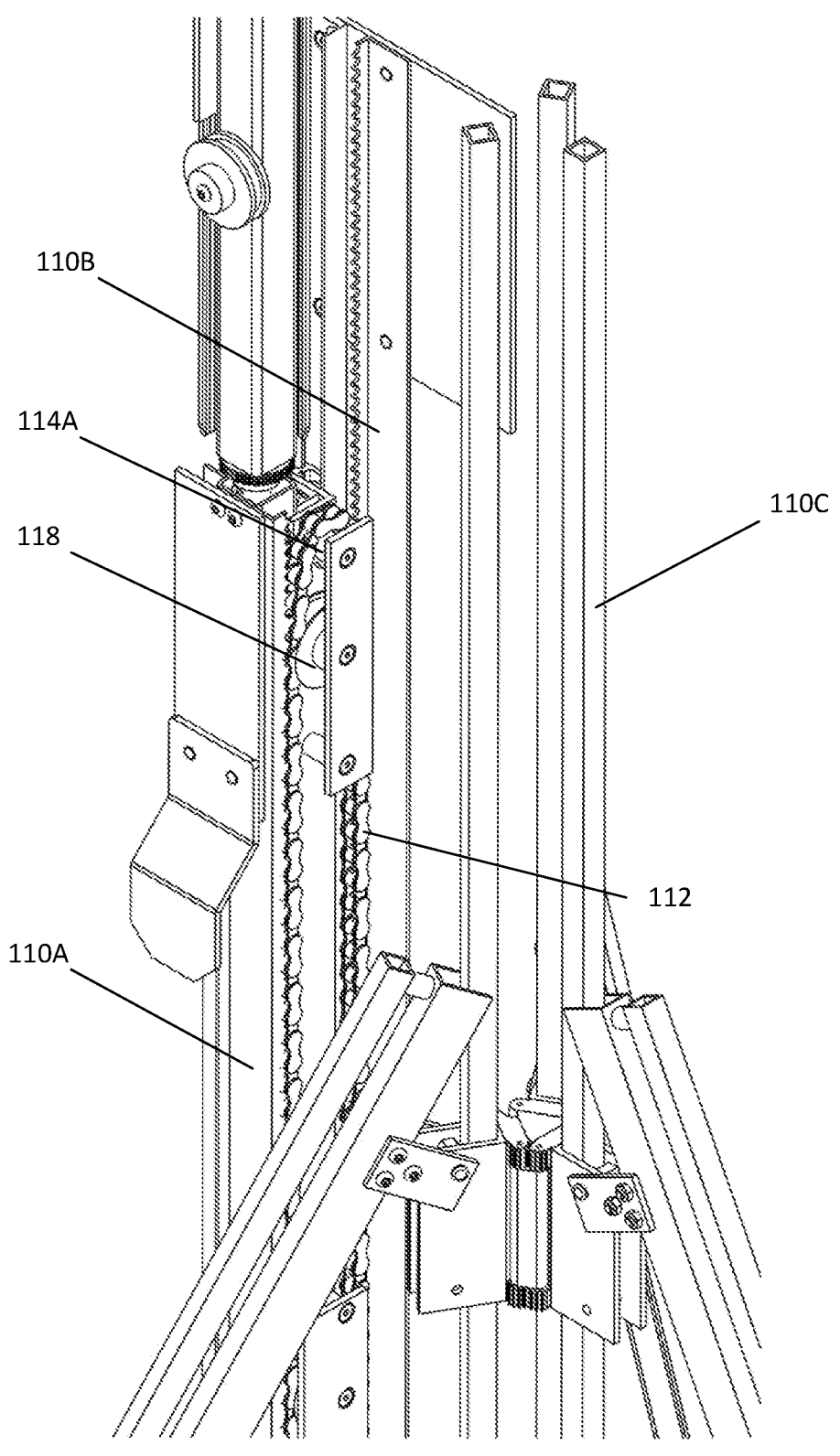
Figure 28:
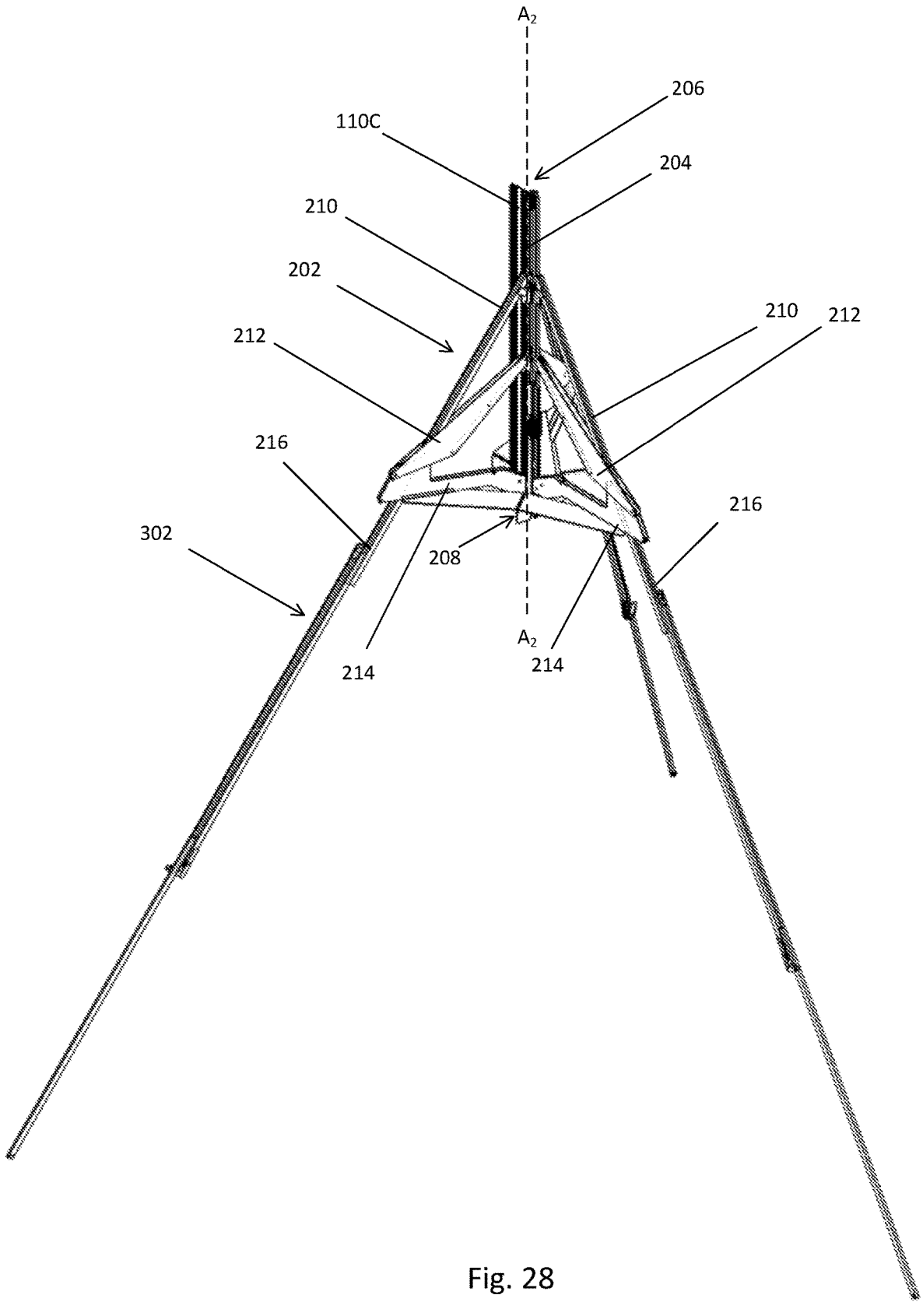
Figure 29A:
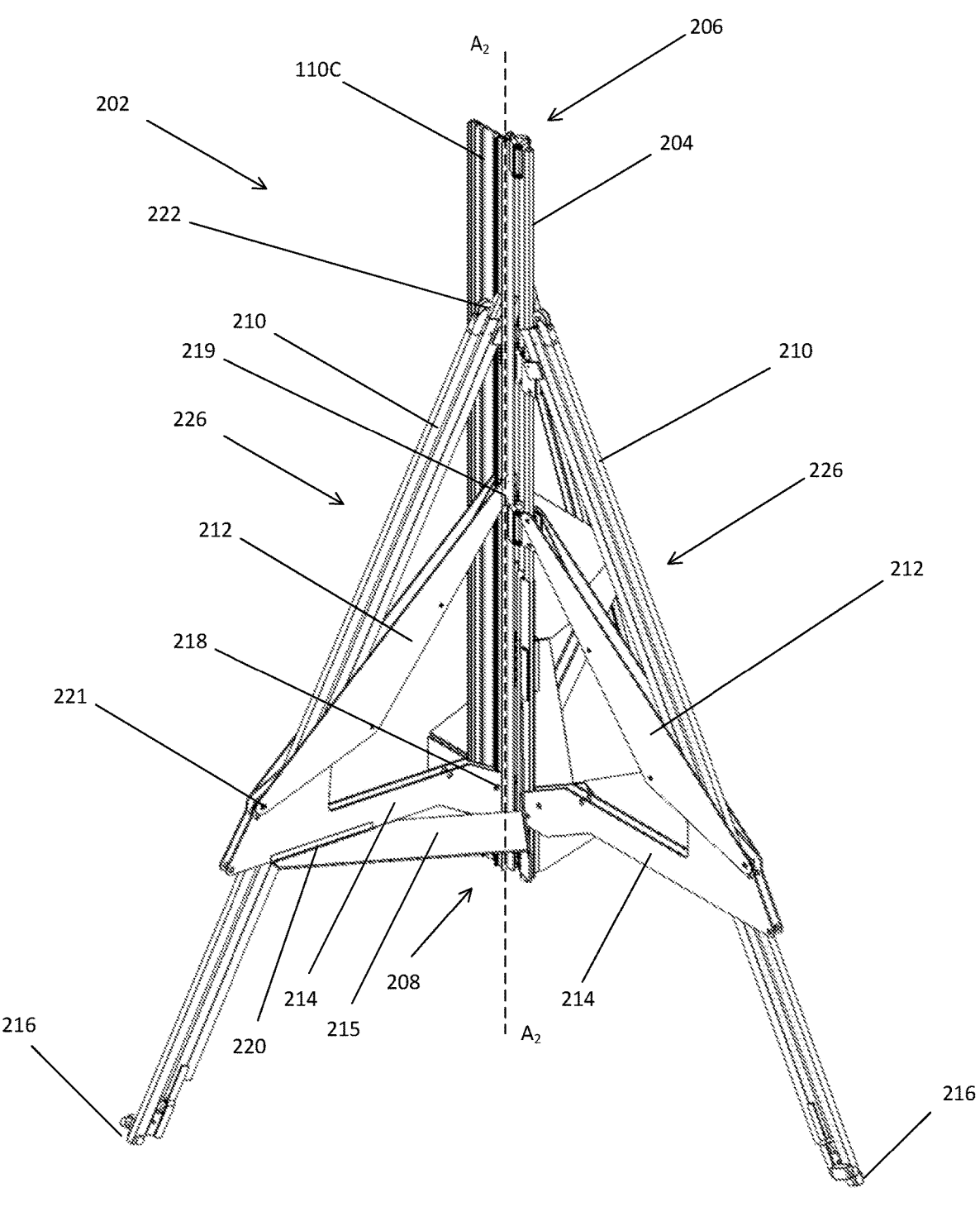
Figure 29B:
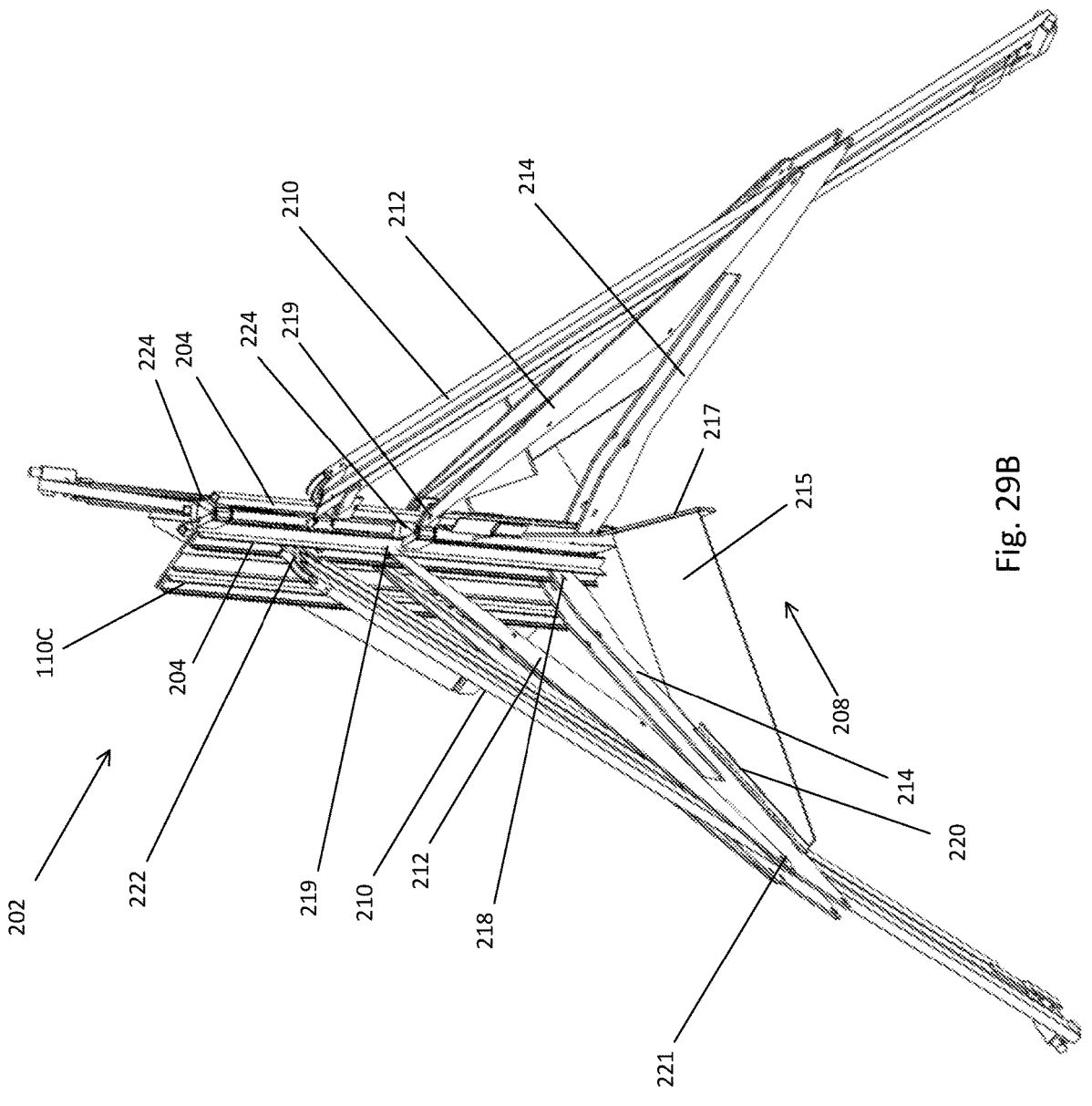
Figure 30:
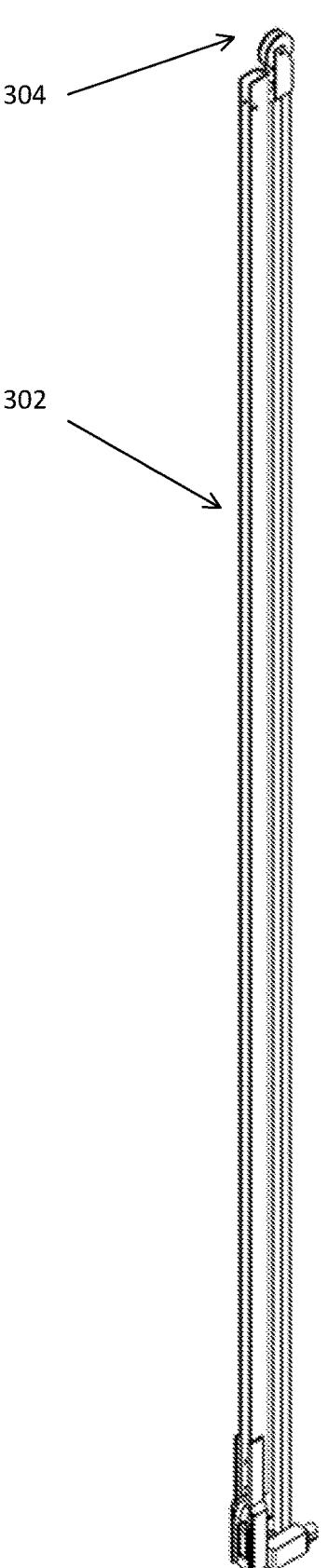
Figure 31:
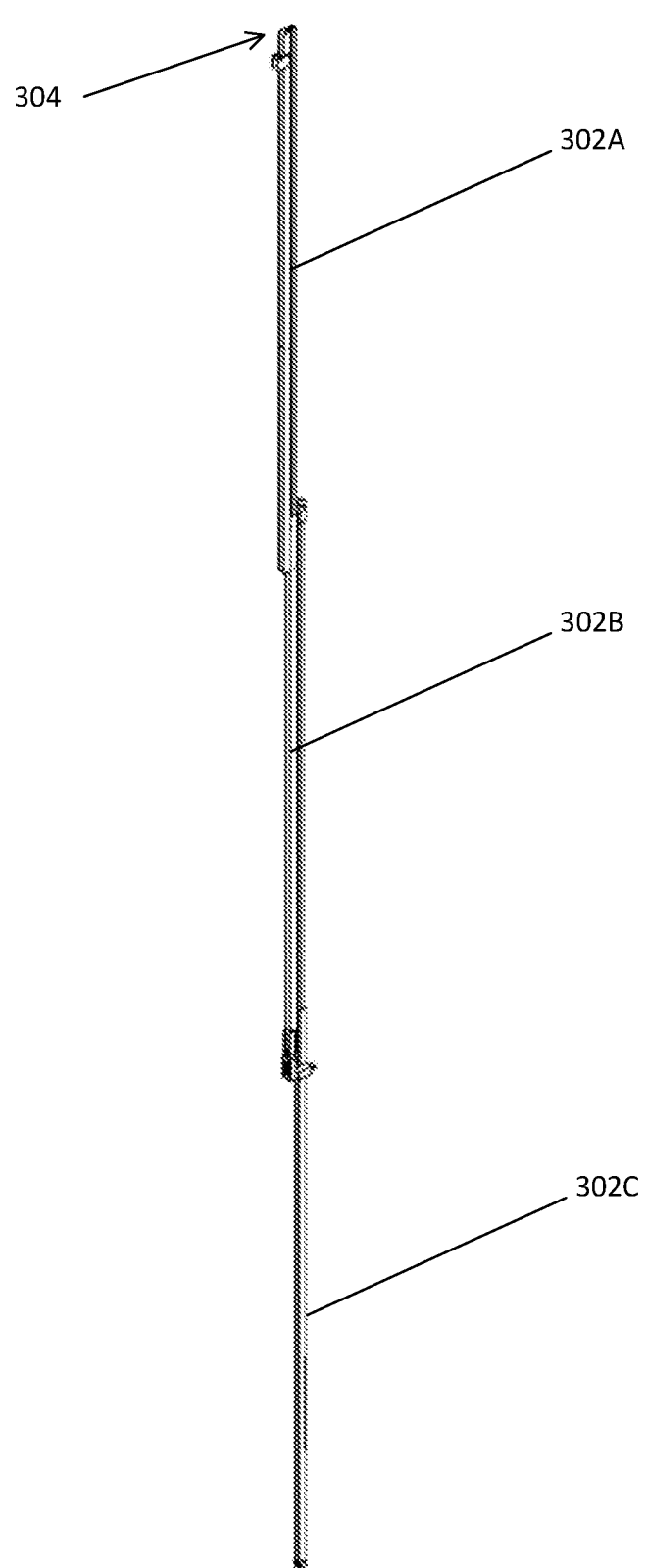
Figures 32A, 32B, 32C:
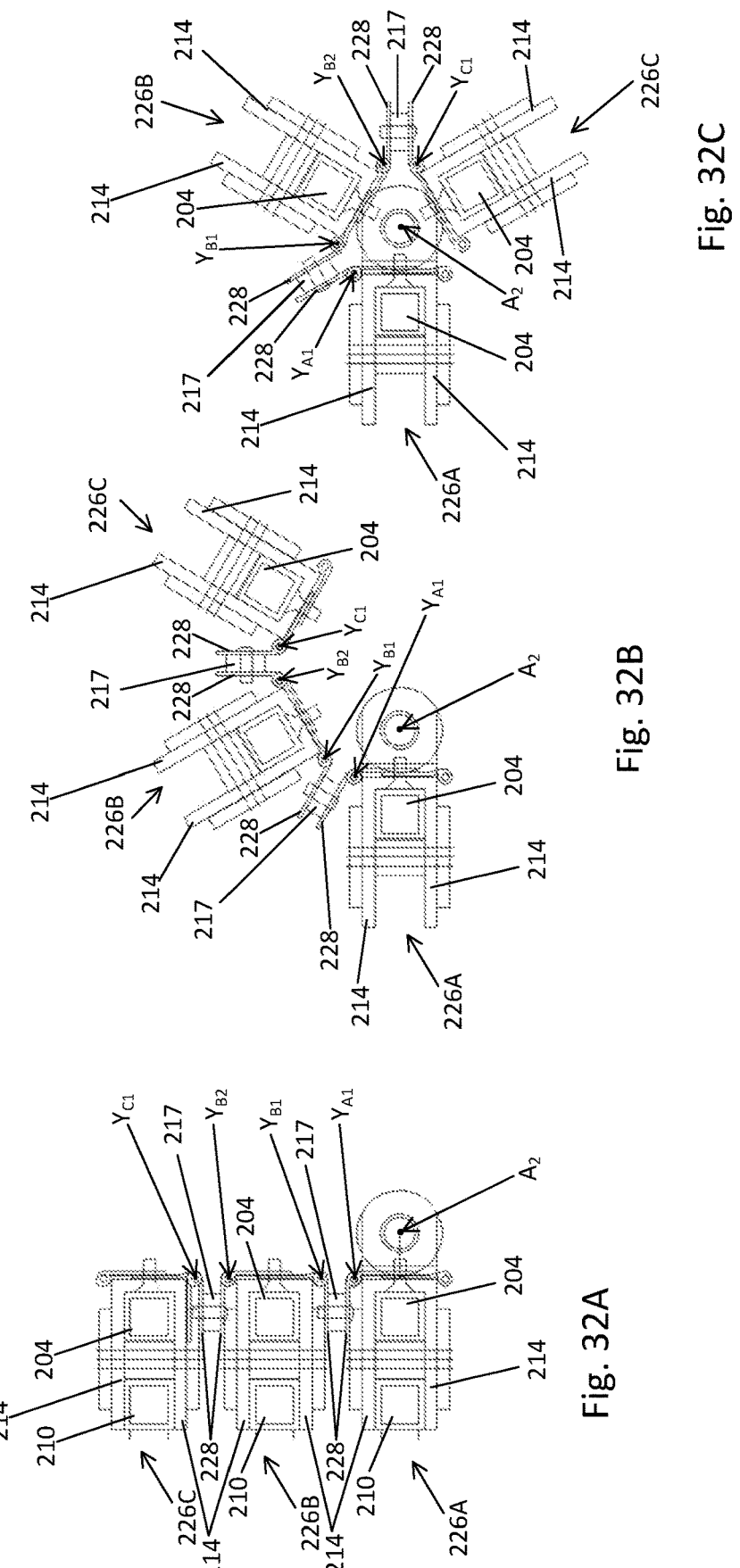
Figure 33C:
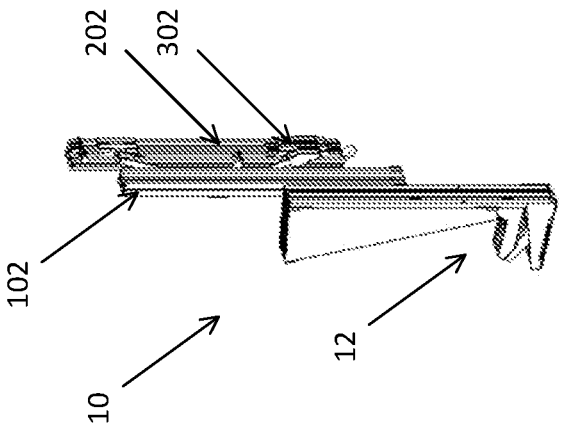
Figure 33B:
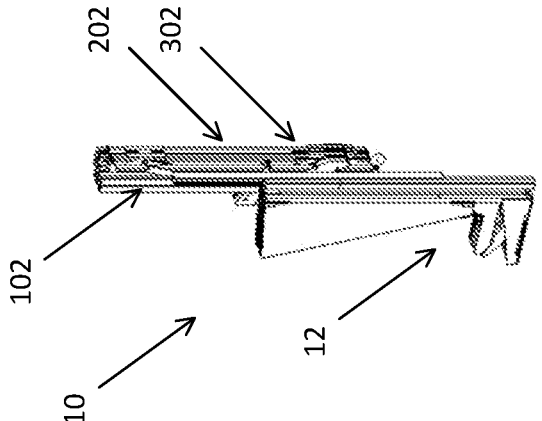
Figure 33A:
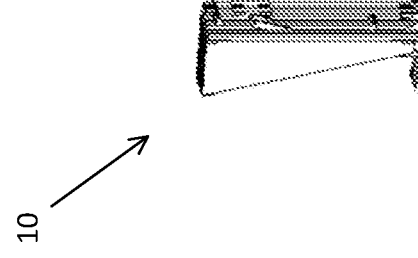
Figure 33F:
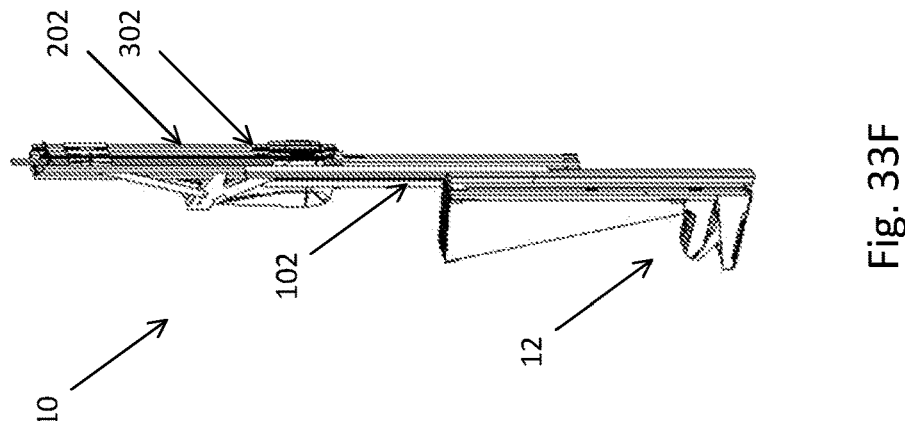
Figure 33E:
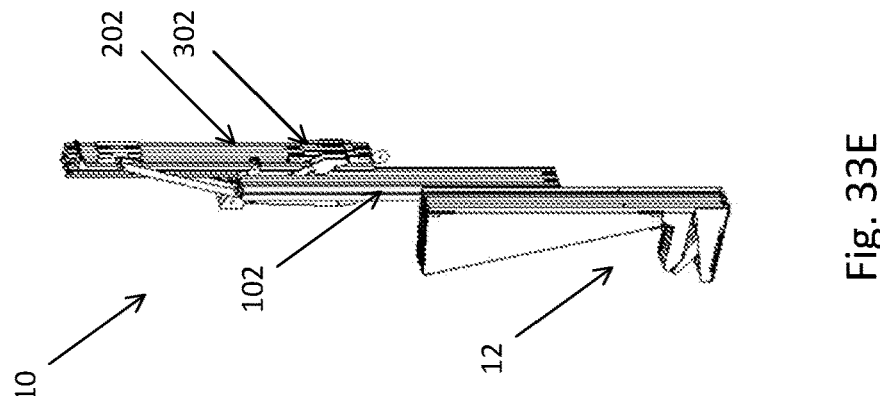
Figure 33D:
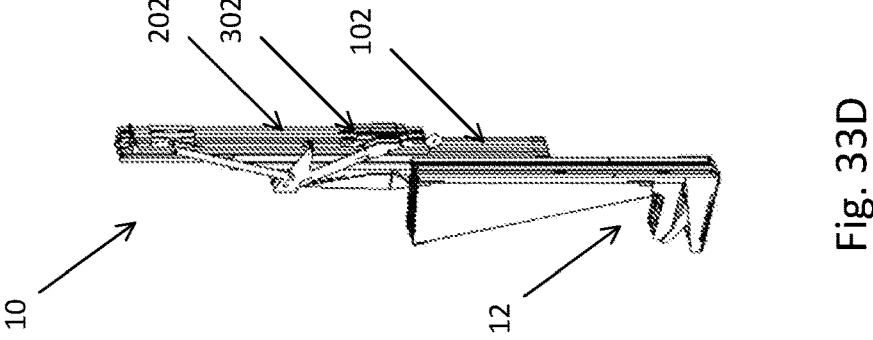
Figure 33I:
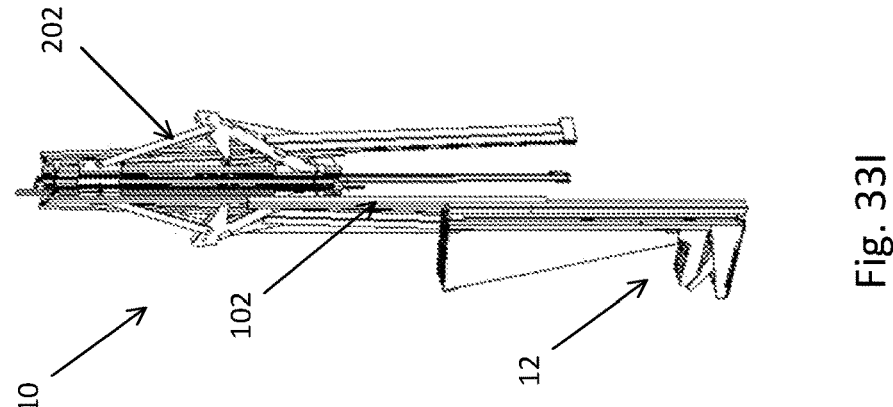
Figure 33H:
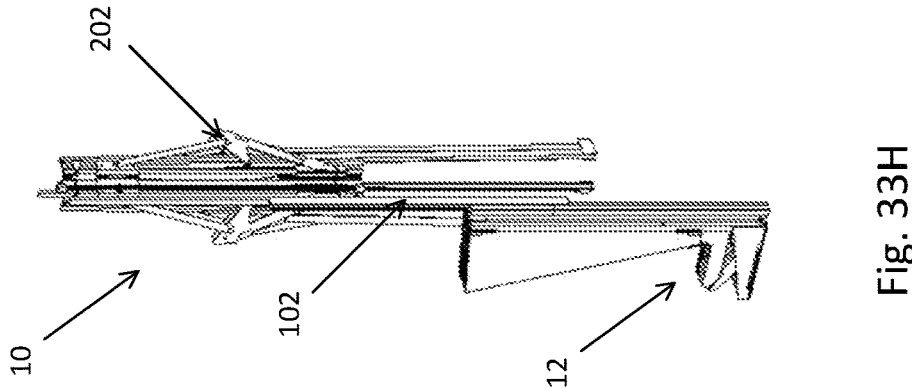
Figure 33G:
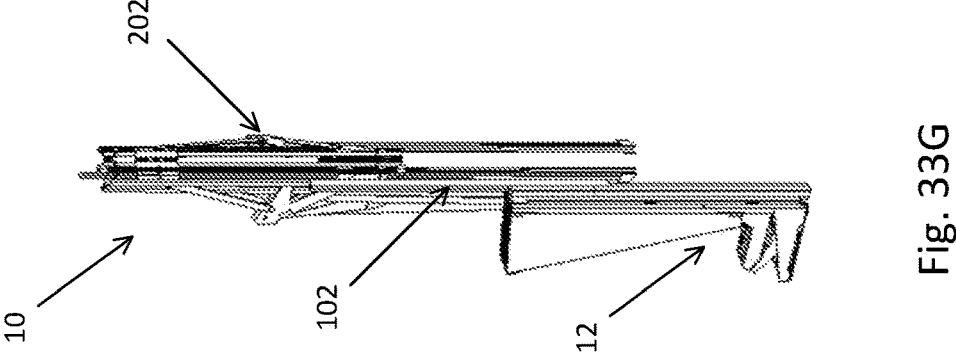
Figure 33L:
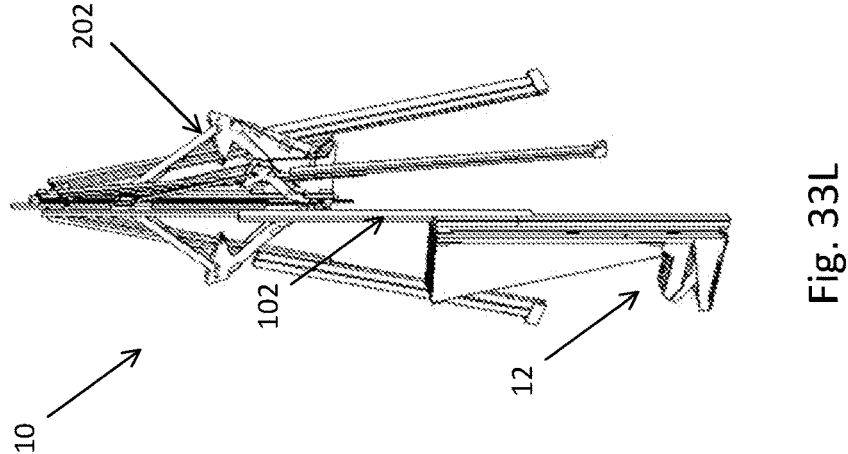
Figure 33K:
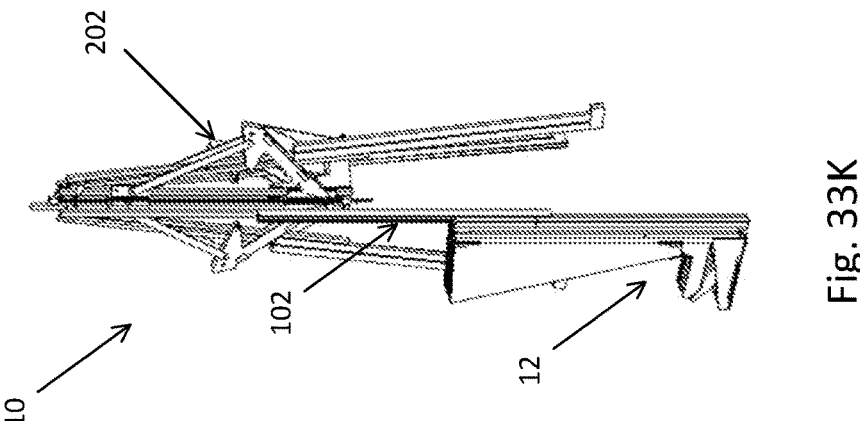
Figure 33J:
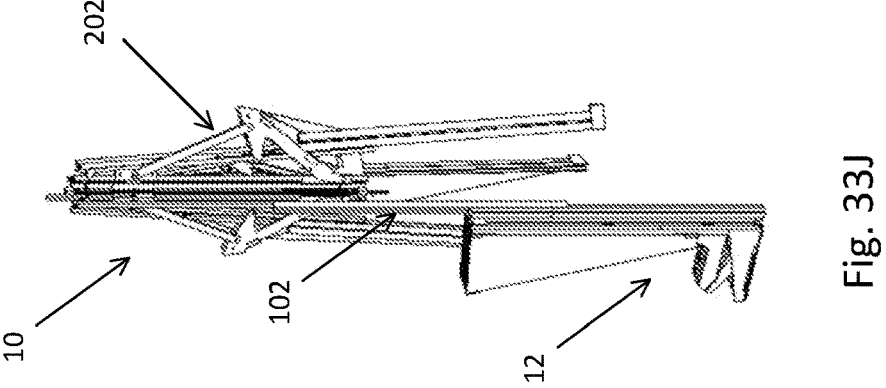
Figure 33O:
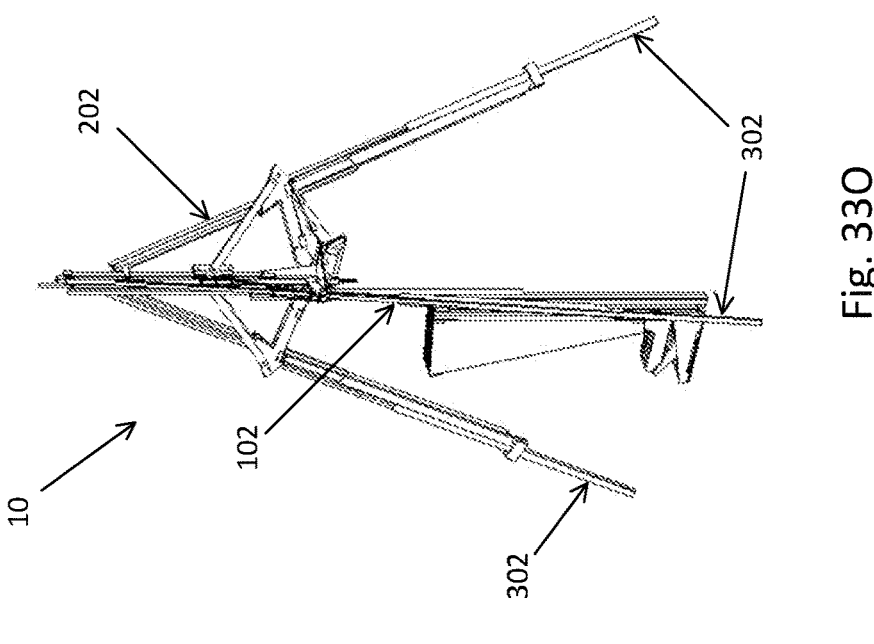
Figure 33N:
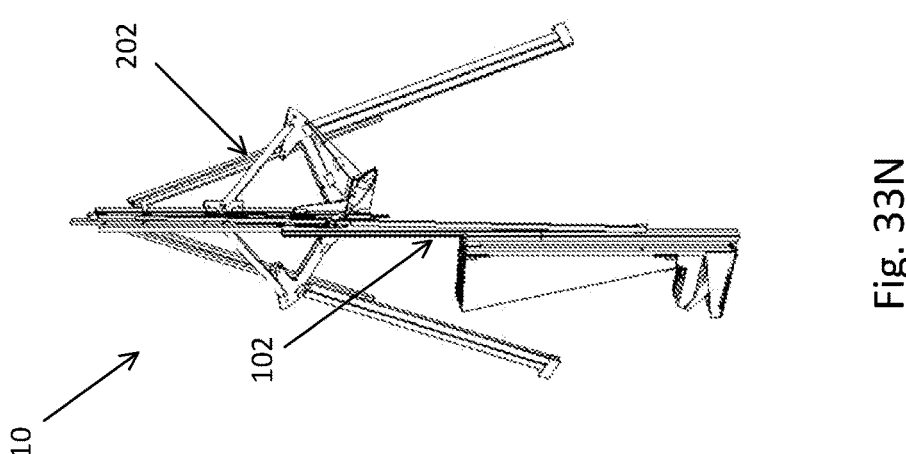
Figure 33M:
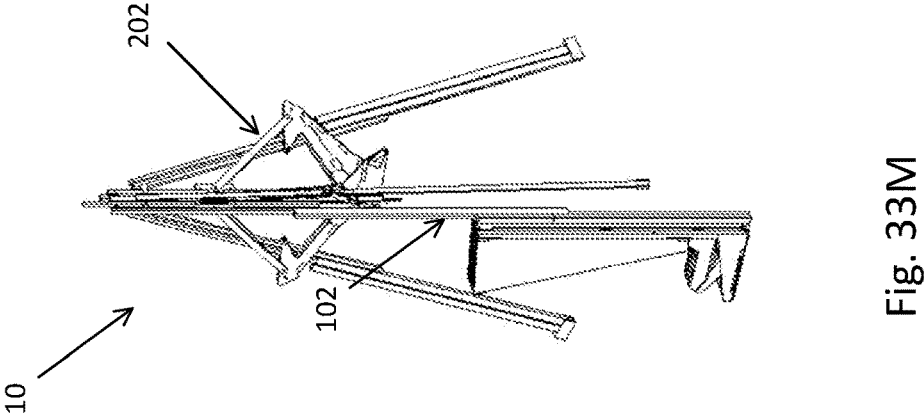
Figures 33P, 33Q, 33R:
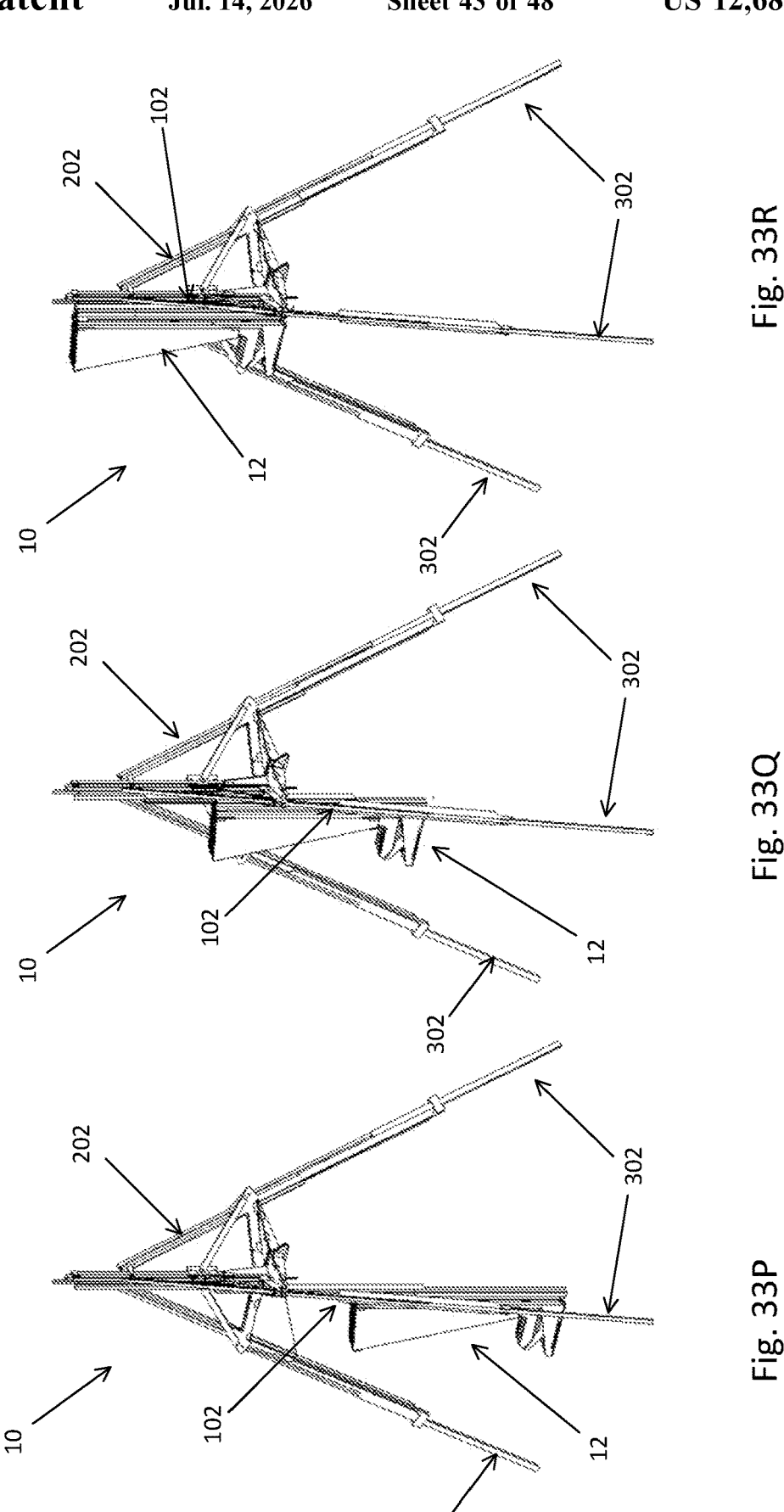
Figures 33S, 33T, 33U:
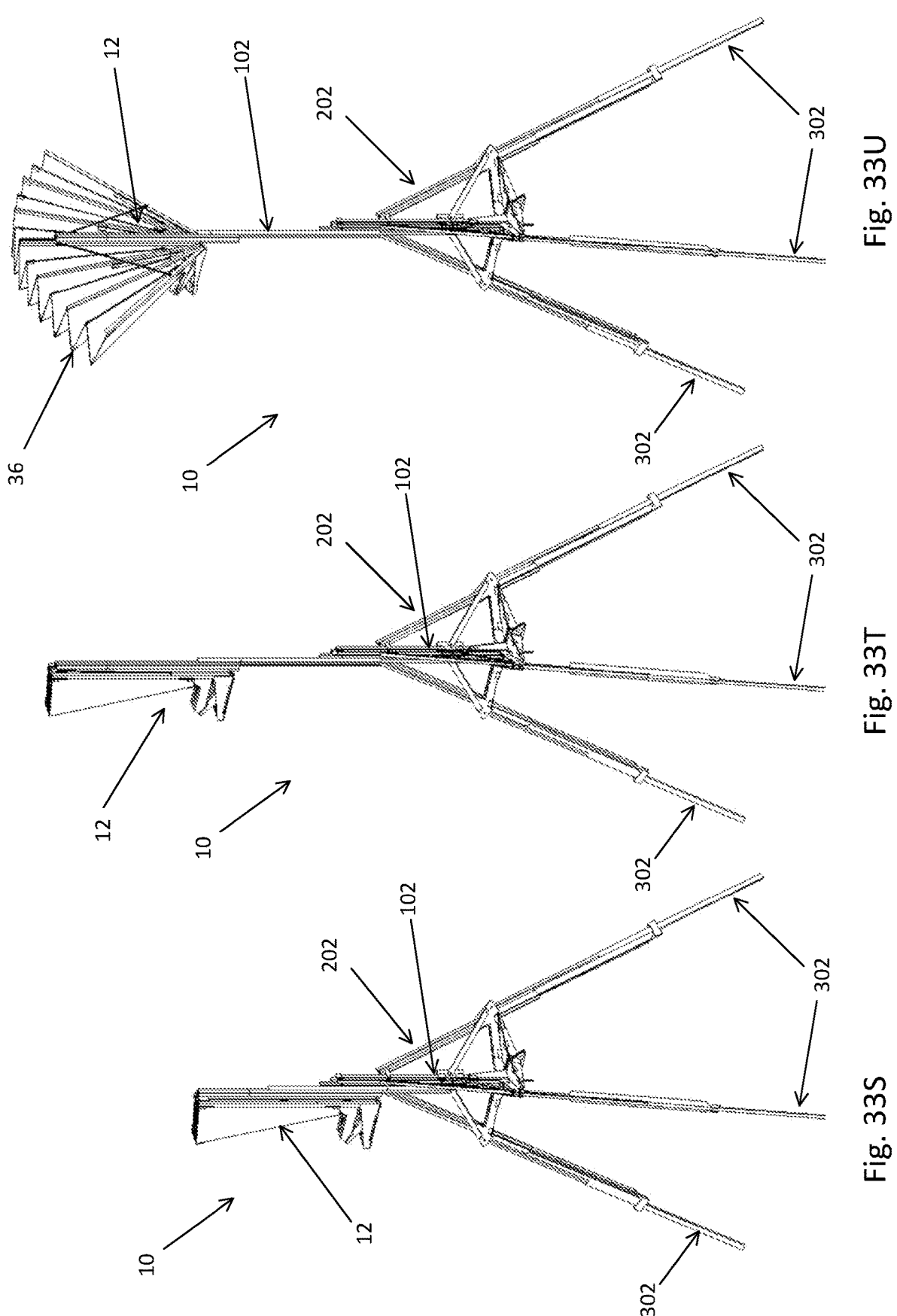
Figures 33V, 33W, 33X:
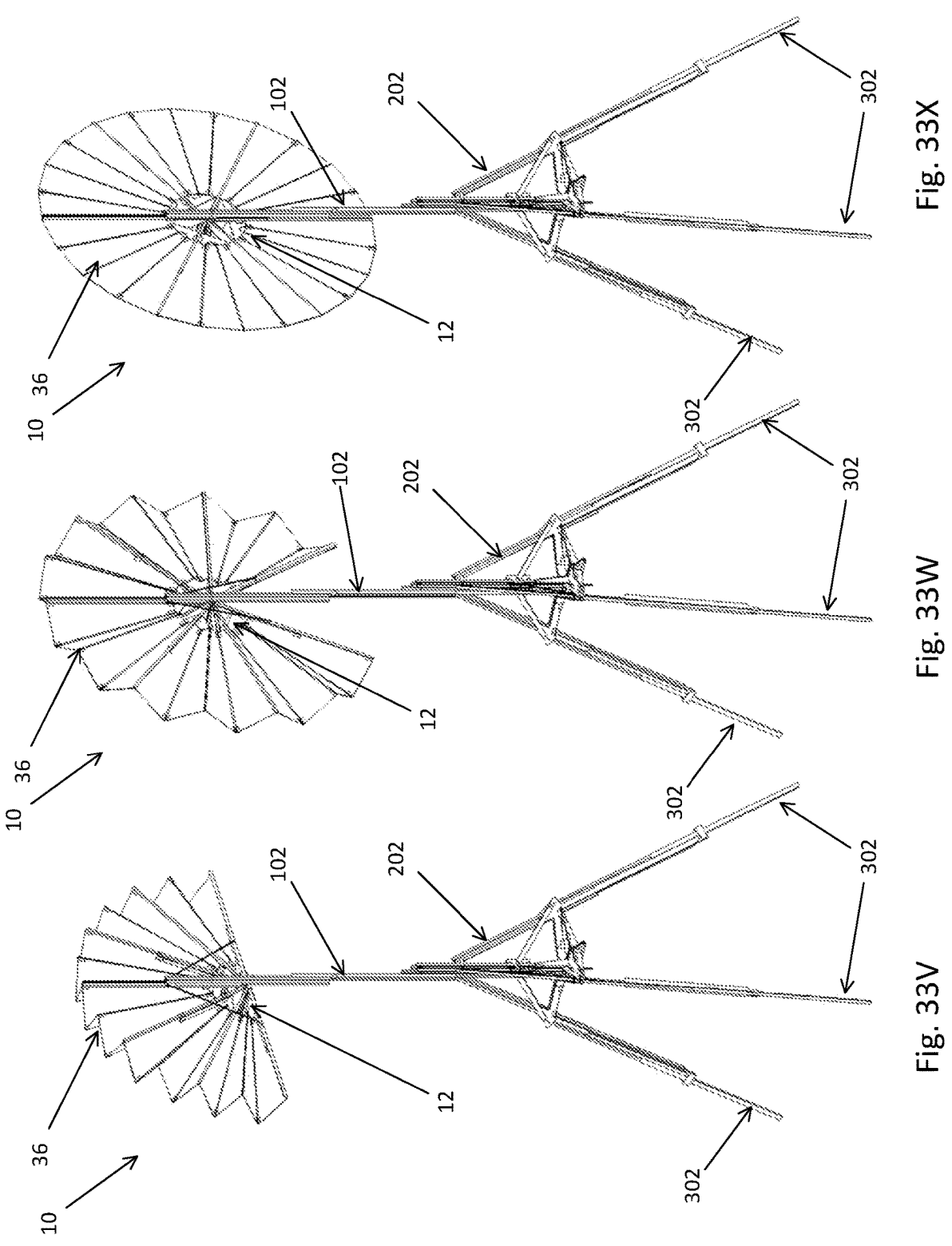
Figures 34A, 34B:
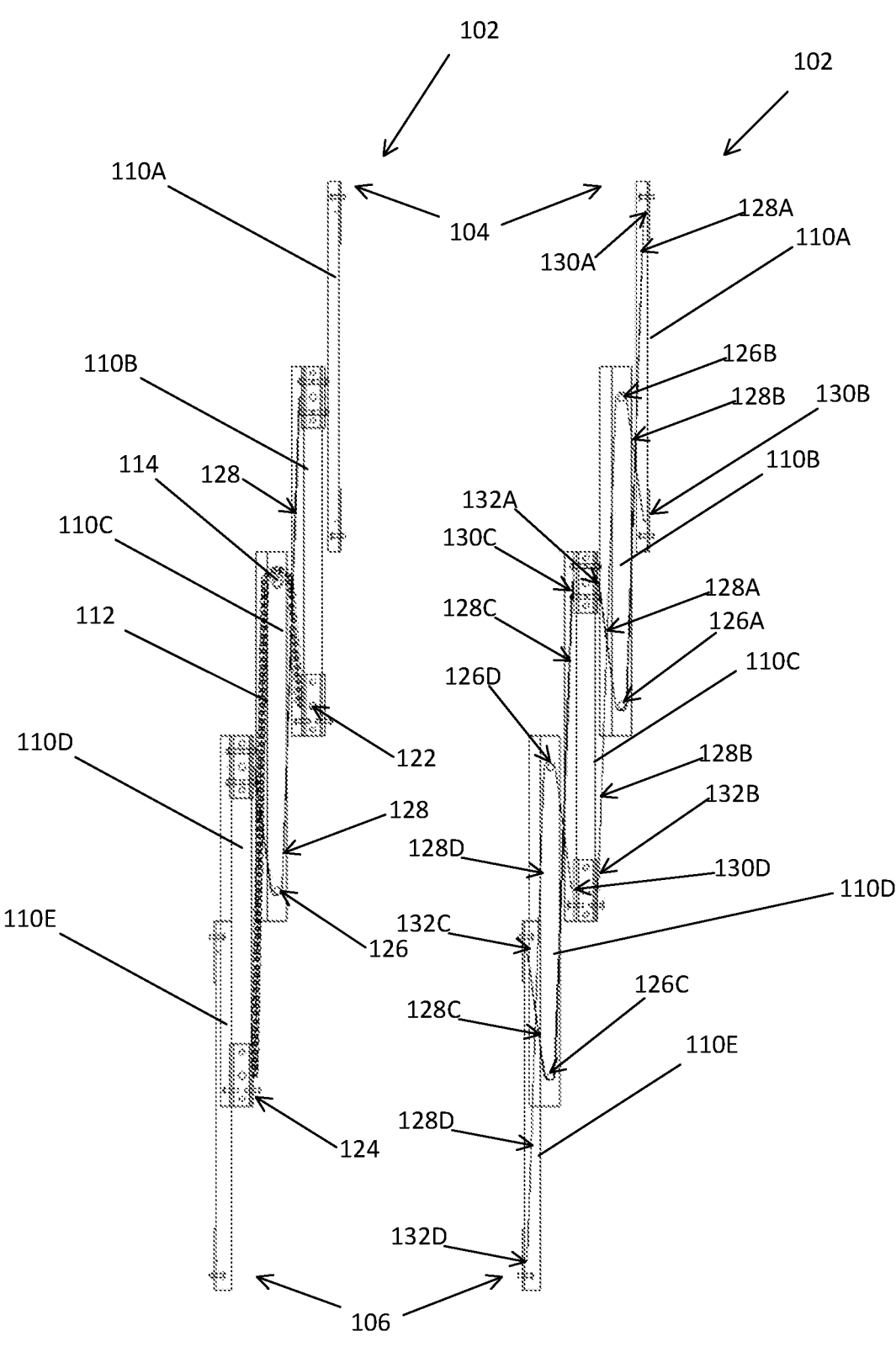
Figures 35A, 35B:
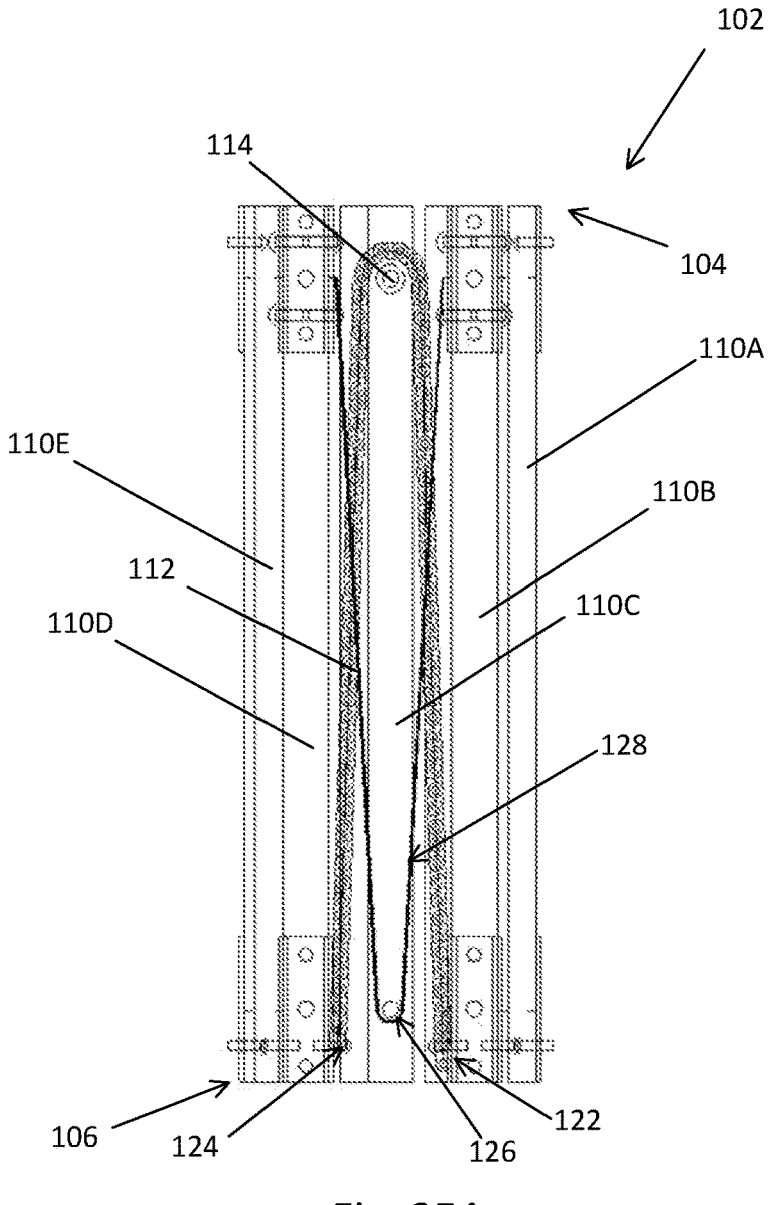
Figure 36A:
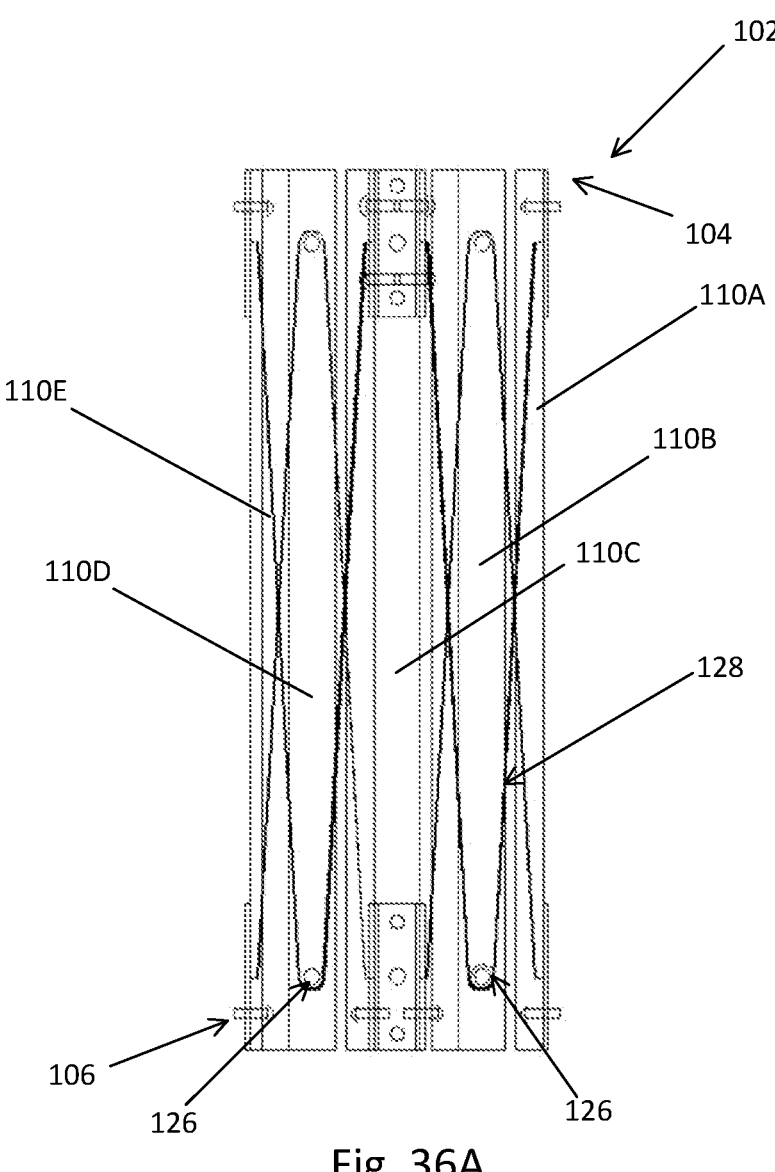

To assist those of ordinary skill in the art in making and using the disclosed assemblies and systems, reference is made to the appended figures, wherein:

FIG. 1 is a front perspective of one suitable embodiment of a solar array assembly in an expanded (or deployed) position including a solar array structure, a mast structure, a base structure, and legs, according to the present disclosure;

FIG. 2 is a rear perspective of the array assembly in the expanded position;

FIG. 3 is a front view of the array assembly in the expanded position;

FIG. 4 is a perspective view of the array assembly in a collapsed (or stowed) position;

FIG. 5 is a front perspective view of the array structure of the array assembly in the expanded position;

FIG. 6 is a side perspective view of the array structure of FIG. 5 in the expanded position;

FIG. 7 is a side view of the array structure in the expanded position;

FIG. 8 is a bottom perspective of the array structure in the expanded position;

FIG. 9 is an enlarged front view of the array structure in an intermediary position;

FIG. 10 is an enlarged side perspective of the array structure of FIG. 9 in the intermediary position;

FIG. 11 is a front view of the array structure in the intermediary position;

FIG. 12 is a front perspective of the array structure in the collapsed position;

FIG. 13 is a side view of the array structure of FIG. 12 in the collapsed position;

FIG. 14 is a rear view of the array structure in the collapsed position;

FIG. 15 is a rear side view of the array structure in the collapsed position;

FIG. 16 is a front side view of the array structure in the collapsed position;

FIG. 17 is a side perspective of the array structure in the collapsed position;

FIG. 18 is a side perspective of the array structure in the collapsed position;

FIG. 19 is a rear side perspective of a portion of the array structure in the collapsed position;

FIG. 20 is a rear side perspective of a portion of the array structure in the collapsed position;

FIG. 21 is a front perspective of a portion of the array structure with a plurality of solar panels in the collapsed position;

Figures 22C, 22D:
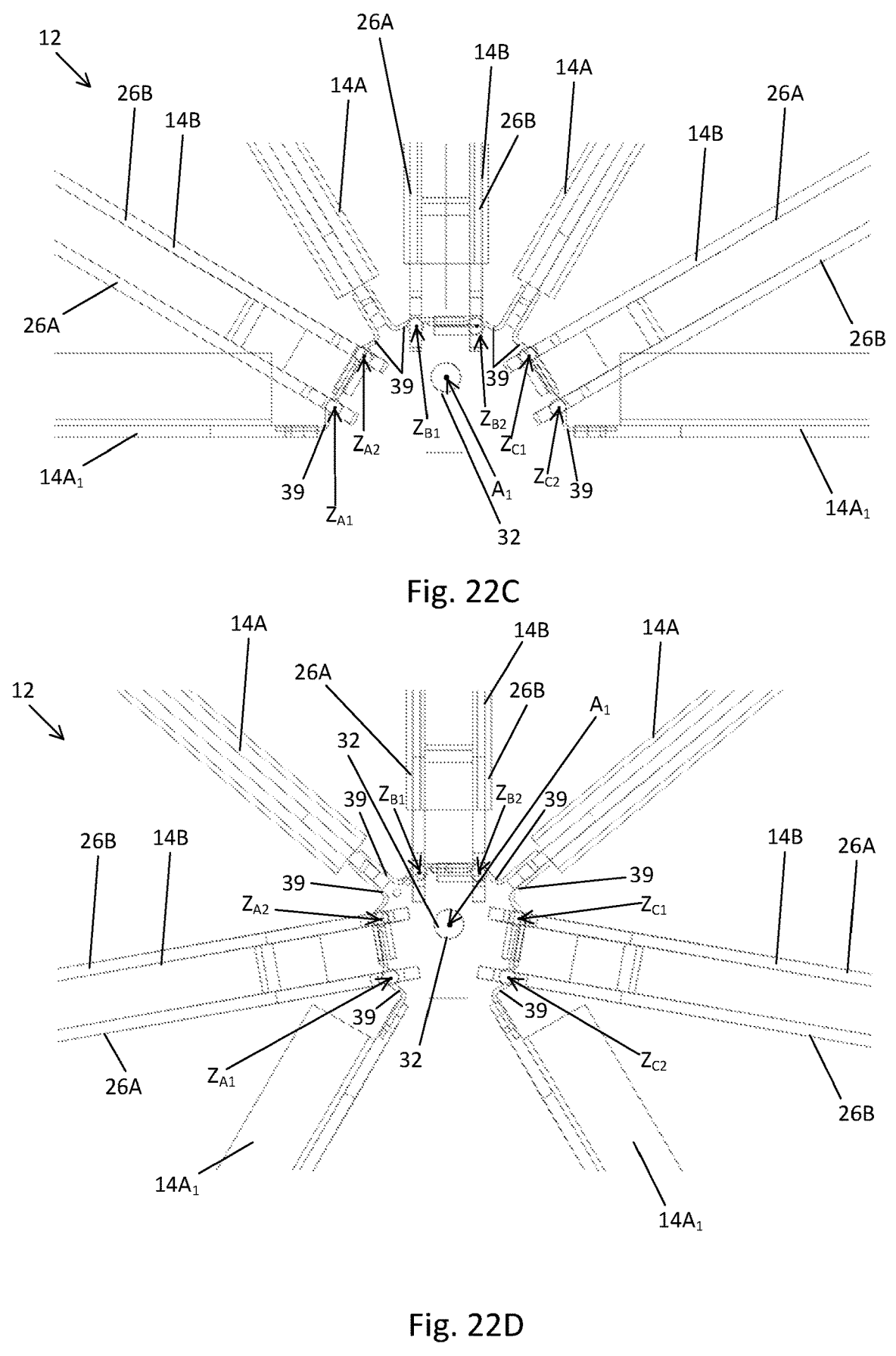

FIG. 22A is a top view of a portion of the array structure in a collapsed position;

FIG. 22B is a top view of a portion of the array structure shown in FIG. 22A in a partial expanded position;

FIG. 22C is a top view of a portion of the array structure shown in FIG. 22A in the partial expanded position;

FIG. 22D is a top view of a portion of the array structure shown in FIG. 22A in the partial expanded position;

FIG. 22E is a top view of a portion of the array structure shown in FIG. 22A in an expanded position;

FIG. 23 is a side view of the array assembly in a partial expanded position with the array structure including the plurality of solar panels in a collapsed position;

FIG. 24 is a rear perspective of the array assembly in a partial expanded position with the array structure including the plurality of solar panels in an intermediary position;

FIG. 25 is a rear perspective of the array assembly in a partial expanded position with the array structure including the plurality of solar panels in an intermediary position;

FIG. 26 is a rear side perspective of a portion of the array structure of FIG. 12;

FIG. 27A is a front perspective of the mast structure in a collapsed position;

FIG. 27B is a detailed perspective view of the mast structure of FIG. 27A;

FIG. 27C is a detailed perspective view of the mast structure of FIG. 27B;

FIG. 28 is a front perspective of the base structure and the legs in an expanded position;

FIG. 29A is a front perspective of the base structure of FIG. 28 in the expanded position;

FIG. 29B is a top perspective of the base structure of FIG. 29A;

FIG. 30 is a front perspective of the legs in a collapsed position;

FIG. 31 is a front perspective of one of the legs of FIG. 28 in the expanded position;

FIG. 32A is a top view of a portion of the base structure in a collapsed position;

FIG. 32B is a top view of a portion of the base structure shown in FIG. 32A in a partial expanded position;

FIG. 32C is a top view of a portion of the base structure shown in FIG. 32A in an expanded position;

FIG. 33A is a perspective view of the array assembly in a collapsed (or stowed) position;

FIG. 33B is a perspective view of the array assembly in a partial expanded position with movement of at least the base structure and the legs;

FIG. 33C is a perspective view of the array assembly in a partial expanded position with movement of at least the base structure and the legs;

FIG. 33D is a perspective view of the array assembly in a partial expanded position with movement of at least the base structure and the legs;

FIG. 33E is a perspective view of the array assembly in a partial expanded position with movement of at least the base structure and the legs;

FIG. 33F is a perspective view of the array assembly in a partial expanded position with movement of at least the base structure and the legs;

FIG. 33G is a perspective view of the array assembly in a partial expanded position with movement of at least the base structure and the legs;

FIG. 33H is a perspective view of the array assembly in a partial expanded position with movement of at least the base structure and the legs;

FIG. 33I is a perspective view of the array assembly in a partial expanded position with movement of at least the base structure and the legs;

FIG. 33J is a perspective view of the array assembly in a partial expanded position with movement of at least the base structure and the legs;

FIG. 33K is a perspective view of the array assembly in a partial expanded position with movement of at least the base structure and the legs;

FIG. 33L is a perspective view of the array assembly in a partial expanded position with movement of at least the base structure and the legs;

FIG. 33M is a perspective view of the array assembly in a partial expanded position with movement of at least the base structure and the legs;

FIG. 33N is a perspective view of the array assembly in a partial expanded position with movement of at least the base structure and the legs;

FIG. 33O is a perspective view of the array assembly in a partial expanded position with movement of at least the base structure and the legs;

FIG. 33P is a perspective view of the array assembly in a partial expanded position with at least the base structure and the legs in an expanded position;

FIG. 33Q is a perspective view of the array assembly in a partial expanded position with movement of at least the mast structure;

FIG. 33R is a perspective view of the array assembly in a partial expanded position with movement of at least the mast structure;

FIG. 33S is a perspective view of the array assembly in a partial expanded position with movement of at least the mast structure;

FIG. 33T is a perspective view of the array assembly in a partial expanded position with at least the mast structure in an expanded position;

FIG. 33U is a perspective view of the array assembly in a partial expanded position with movement of at least the array structure;

FIG. 33V is a perspective view of the array assembly in a partial expanded position with movement of at least the array structure;

FIG. 33W is a perspective view of the array assembly in a partial expanded position with movement of at least the array structure;

FIG. 33X is a perspective view of the array assembly in an expanded position;

FIG. 34A is a front view of the mast structure in an expanded position;

FIG. 34B is a rear view of the mast structure shown in FIG. 34A in the expanded position;

FIG. 35A is a front view of the mast structure in a collapsed position;

FIG. 35B is a top view of the mast structure shown in FIG. 35A in the collapsed position;

FIG. 36A is a rear view of the mast structure in a collapsed position; and

Figure 36B:
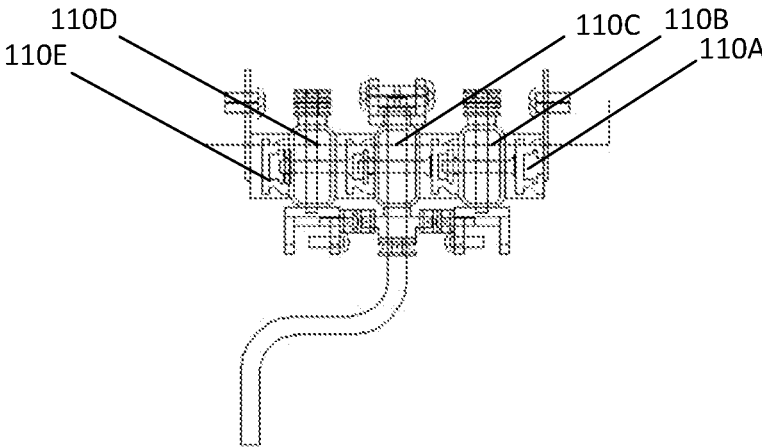

FIG. 36B is a top view of the mast structure shown in FIG. 36A in the collapsed position.

DETAILED DESCRIPTION OF THE DISCLOSURE

The present disclosure describes a suitable embodiment of a deployable array assembly and an array structure for use with such an assembly. The array assembly is configurable between a collapsed (or stowed) position and an expanded (or deployed) position. It should be understood, however, that although embodiments disclosed herein refer to a deployable array assembly and array structure, the disclosed elements/features may be utilized in a variety of industries without departing from the spirit/scope of this disclosure.

With reference now to the accompanying figures, FIGS. 1-4 depict an array assembly, indicated generally at 10, including an array structure 12, a mast structure 102, a base structure 202, and a leg structure 302. The array structure 12 is mounted with respect to the mast structure 102. The mast structure 102 is mounted with respect to the base structure 202. The base structure 202 is mounted with respect to the leg structure 302. The array assembly 10 is selectively configurable between the deployed position, as shown in FIGS. 1-3, and the collapsed position, as shown in FIG. 4. In some instances, the components of the array assembly 10 (i.e., the array structure 12, the mast structure 102, the base structure 202, and the leg structure 302) may move independently between the collapsed position and the deployed position. In some instances, the components of the array assembly 10 may move between the collapsed position and the deployed position in partial combination with each other. In some instances, the components of the array assembly 10 may move between the collapsed position and the deployed position in combination with each other.

The array structure 12 is configurable between the expanded position, for example as shown in FIGS. 5-8, and the collapsed position, for example as shown in FIGS. 4 and 33A-33T. FIGS. 12-18 illustrate the array structure 12 at various positions between the expanded position and the collapsed position. The array structure 12 includes a plurality of arms 14 movably coupled to an adjustable mechanism assembly 16, either directly or indirectly. The plurality of arms 14 are positioned relative to an axis $A_1$ of the array structure 12. At least a portion of the adjustable mechanism assembly 16 may be aligned with the axis $A_1$ of the array structure 12. At least a portion of the adjustable mechanism assembly 16 is movable between a first end B of the array structure 12 and a second end C of the array structure 12. It should be understood, however, that the location of axis $A_1$ is not limited to the location shown in the figures and alternative locations of the array structure 12 may include axis $A_1$.

Referring now to FIGS. 5-8, the plurality of arms 14 are spaced a distance around the axis $A_1$ at predetermined positions. The position of the plurality of arms 14 may depend, in part, on the number of arms 14. Each arm 14 of the plurality of arms 14 defines a first end 18 and a second end 20. The first end 18 of each arm 14 is positioned relative to the axis $A_1$ of the array structure 12 and the second end 20 of each arm 14 is situated opposite from the first end 18. Each arm 14 extends outwardly from the axis $A_1$ when the array structure 12 is at least in the expanded position. For example, each arm 14 extends outwardly from the axis $A_1$ in a substantially perpendicular orientation when the array structure 12 is at least in the expanded position. In some instances, and as depicted in FIG. 13, at least some of the arms 14 extend outwardly from the axis $A_1$ in a substantially perpendicular orientation when the array structure 12 is in the collapsed position. In other instances, and as depicted in FIG. 22A, at least one end of each of the arms 14 may be aligned. For example, each of the arms 14 may be aligned with adjacent arms 14 through an axis of rotation Z.

The plurality of arms 14 includes a first set of arms 14A and a second set of arms 14B. The first set of arms 14A includes two leading arms 14A1 that are each coupled to one of the arms 14B from the second set of arms 14B (see, e.g., FIGS. 5, 6, 8, 9, 11, and 12). The first set of arms 14A and the second set of arms 14B may be collectively referred to as reference number 14 and distinguishing between the two arms 14 enables a more thorough explanation of the array structure 12. It does not, however, inherently indicate differences between the two arms 14, unless otherwise expressly stated. In some instances, the array structure 12 may include an equal quantity of the first set of arms 14A and the second set of arms 14B. In other instances, the array structure 12 may include an unequal quantity of the first set of arms 14A and the second set of arms 14B. For example, the array structure 12 may include more of the first set of arms 14A than of the second set of arms 14B. Alternatively, the array structure 12 may include more of the second set of arms 14B than of the first set of arms 14A.

As illustrated in FIG. 6, the plurality of arms 14, when in the expanded configuration, defines a plurality of spaced openings 34 that are defined by adjacent arms 14, for example, one of the first set of arms 14A and one of the second set of arms 14B. In the illustrated embodiment, the plurality of spaced openings 34 are generally pie-shaped such that the portion in proximity to the first end 18 of the plurality of arms 14 is smaller in width, as measured between the two arms 14A, 14B than the portion in proximity to the second end 20 of the plurality of arms 14, as measured between the two arms 14A, 14B. The spaced opening 34 defined by the arms 14A, 14B defines a first angle X1 (see, e.g., FIG. 6) therebetween. The first angle X1 may have an angle that depends, in part, on the number of arms 14. In the current array structure 12, which has six (6) spaced openings 34, the first angle X1 is about 60 degrees. In some instances, for example where the two leading arms 14A1 define a gap therebetween, the first angle X1A of the two adjacent spaced openings 34, may be slightly less than about 60 degrees. However, in instances where the two leading arms 14A1 are in contact with each other, the first angle X1A may be equal to the remaining first angles X1.

At least a portion of the plurality of arms 14 are movably coupled to the adjustable mechanism assembly 16. For example, of the plurality of arms 14 that are movably coupled to the adjustment mechanism assembly 16, at least the first end 18 of the each of the plurality of arms 14 is movably coupled to the adjustable mechanism assembly 16, either directly or indirectly. The arm 14 may be movably coupled to an adjacent arm 14, either directly or indirectly, so as to promote movement of both arms 14. Referring to FIGS. 5-11 and 19-20, a support member 22 is connected with at least one of the two adjacent arms 14. The support member 22 is directly or indirectly connected with at least one of the two adjacent arms 14. Connections between the support member 22 and the adjacent arms 14 may be provided by one or more flexible connections 24, such as hinges, at each connection point (see, e.g., FIGS. 8, 9, and 26). Other flexible connections 24 may include but are not limited to a flexible material, such as cloth, as well as pivots, such as ball and socket combinations, pivots, rods, dowels, and the like.

Referring to FIGS. 6, 8, 9, 10, and 11, at least one of the first set of arms 14A is hingedly coupled to the support member 22 using one or more flexible connections 24. The support member 22 is hingedly coupled to a connecting member 26. Connections between the support member 22 and the connecting member 26 may be provided by one or more flexible connections 24, such as hinges, at each connection point. The connecting member 26 is directly or indirectly connected to at least one of the second set of arms 14B and the adjustable mechanism assembly 16. The connecting member 26 may be a single component or may include two or more components that collectively combine to represent the connecting member 26. For example, the connecting member 26 may include a first connecting member 26A that is spaced apart from a second connecting member 26B (see, e.g., FIGS. 9 and 10). The first and second connecting members 26A, 26B may be spaced apart from each other by one or more spacers (not shown). The first and second connecting members 26A, 26B spaced apart from each other and define a void 38 therebetween. The void 38 is sized such that one or more other components at least partially fit therebetween. It should be understood that the first and second connecting members 26A, 26B may be collectively referred to as reference number 26 and distinguishing between the two connecting members 26 enables a more thorough explanation of the array structure 12. It does not, however, inherently indicate differences between the two connecting members 26, unless otherwise expressly stated. The connecting member 26 is movably coupled to the adjustable mechanism assembly 16. For example, the connecting member 26 is movably coupled to the adjustable mechanism assembly 16 at pivot 27 (see, e.g., FIG. 10). The pivot 27 may be a pin, bolt, rivet, or another component/ feature that functions similarly.

The connecting member 26 is movably coupled to a connecting arm 28 at an interface 29 (see, e.g., FIG. 10). The interface 29 may be a pin, bolt, rivet, or another component/ feature that functions similarly. The connecting arm 28 may be a single component or may include two or more components that collectively combine to represent the connecting arm 28. For example, the connecting arm 28 includes a first connecting arm 28A that is spaced apart from a second connecting arm 28B (see, e.g., FIGS. 9 and 10). The first and second connecting arms 28A, 28B may be spaced apart from each other by one or more spacers (not shown). The first and second connecting arms 28A, 28B spaced apart from each other and define a void 42 therebetween. The void 42 is sized such that one or more other components at least partially fit therebetween. For example, the connecting members 26A, 26B may be movably coupled to the connecting arms 28A, 28B within the void 42. It should be understood that the first and second connecting arms 28A, 28B may be collectively referred to as reference number 28 and distinguishing between the two connecting arms 28 enables a more thorough explanation of the array structure 12. It does not, however, inherently indicate differences between the two connecting arms 28, unless otherwise expressly stated.

The connecting arm 28 is connected to a translating component 30 of the adjustable mechanism assembly 16 (see, e.g., FIGS. 10 and 13). The engagement between the connecting arm 28 and the translating component 30 may be fixedly coupled, semi-fixedly coupled, or movably coupled. The adjustable mechanism assembly 16 is configured to move the translating component 30 between a first position in proximity to the first end B of the array structure 12 and a second position in proximity to the second end C of the array structure 12 along axis $A_1$. The translating component 30 of the adjustable mechanism assembly 16 may be movably coupled to a guide member 31 of the arm 14B. The guide member 31 is fixedly coupled with the arm 14B and is aligned with the axis $A_1$. The void 38 defined by the first and second connecting members 26A, 26B is sized and shaped such that the guide member 31 at least partially fits therebetween. The void 42 defined by the first and second connecting arms 28A, 28B may be sized and shaped such that the guide member 31 at least partially fits therebetween. The translating component 30 may move relative to the guide member 31. The guide member 31 may be rotatably coupled with the adjustable mechanism assembly 16. The guide member 31 of the arm 14B may move relative to the axis $A_1$. Movement of the guide member 31 may also move the arm 14B that the guide member 31 is connected with.

In some instances, each of the second set of arms 14B includes a brace 33. The brace 33 connects the arm 14B with the corresponding guide member 31. The brace 33 may be angled relative to the arm 14B and the corresponding guide member 31. The void 38 defined by the first and second connecting members 26A, 26B is sized and shaped such that the brace 33 at least partially fits therebetween. The void 42 defined by the first and second connecting arms 28A, 28B is sized and shaped such that the brace 33 at least partially fits therebetween.

In some embodiments, each of the second set of arms 14B includes at least one connecting member 26, at least one connecting arm 28, at least one translating component 30, and at least one brace 33, as described herein. The translating components 30 of the second set of arms 14B are connected together such that each translating component 30 moves in unison with the other translating components along axis $A_1$. For example, the array structure 12 includes three sets of the second arms 14B, which include the at least one connecting member 26, the at least one connecting arm 28, the at least one translating component 30, and the at least one brace 33 (see, e.g., FIG. 11). Each set of the at least one connecting member 26, the at least one connecting arm 28, the at least one translating component 30, and the at least one brace 33 may be referred to as 44.

Referring to FIG. 11, each set 44 may be referred to as one of adjustment set 44A, adjustment set 44B, and adjustment set 44C. However, it should be understood that the three adjustment sets 44A, 44B, and 44C may be collectively referred to as reference number 44 and distinguishing between the three adjustment sets 44 enables a more thorough explanation of the array structure 12. It does not, however, inherently indicate differences between the three adjustment sets 44, unless otherwise expressly stated. It should also be understood that although the discussion pertains to three adjustment sets 44A, 44B, 44C, more or less adjustment sets 44 may be utilized. It should also be understood that although each of the second arms 14B includes the adjustment set 44 in the current configuration, alternative configurations are considered which include, for example, second arms 14B that do not include the adjustment set 44.

The adjustable mechanism assembly 16 includes a runner component 32 that is positioned axial with the axis $A_1$ (see, e.g., FIGS. 10 and 13). The runner component 32 may be a rod (e.g., threaded, partially threaded, smooth), a screw drive, a rope, a cable, which is configured to pull and/or push one or more components of the array structure 12. For example, the runner component 32 may be configured to move the translating component 30 along the axis $A_1$. For example, the runner component 32 may ensure consistent axial movement of each translating component 30 along the axis $A_1$. A mechanism 35 is connected to the translating component 30 and/or the runner component 32 such that the mechanism 35 is configured to move the translating component 30 between a first position in proximity to the first end B of the array structure 12 and a second position in proximity to the second end C of the array structure 12 along axis $A_1$ (see, e.g., FIGS. 8 and 9). The first and second positions may be at various positions along the runner component 32 including one or both of the ends 32B, 32C of the runner component 32. The mechanism 35 is configured to directly or indirectly move the translating component 30 along the runner component 32 may be a motor, hand crank or pulley, and variations thereof.

Referring to FIGS. 22A-22E, each adjustment set 44 of the second arms 14B includes at least two flexible connections 39, such as hinges. The at least two flexible connections 39 are positioned adjacent to each other and hingedly coupled to adjacent arms 14. For example, one of the at least two flexible connections 39 is coupled to the first connecting member 26A and one of the at least two flexible connections 39 is coupled to the second connecting member 26B. Each adjustment set 44 and the adjacent arms 14 define an axis Z. For example, each of the flexible connections 39 of each adjustment set 44 and the adjacent arms 14 define the axis Z. The adjustment set 44 and the adjacent arm 14 move circularly around the axis Z between the collapsed position and the expanded position. FIG. 22A partially depicts the array structure 12 in the collapsed position. FIGS. 22B-22D partially depict the array structure 12 expanding from the collapsed position of FIG. 22A into the expanded position of FIG. 22E. FIG. 22E partially depicts the array structure 12 in the expanded position.

The first adjustment set 44A of the second arms 14B includes two flexible connections 39, one of the two flexible connections 39 is coupled to the first connecting member 26A and the other flexible connection 39 is coupled to the second connecting member 26B. One of the flexible connections 39 is hingedly coupled to the leading arm 14A₁ and the other of the flexible connections 39 is hingedly coupled to one of the first set of arms 14A. The flexible connection 39 hingedly coupled to the leading arm 14A₁ and the adjustment set 44A of the second arm 14B defines an axis of rotation $Z_{A1}$ where the leading arm 14A₁ and the second arm 14B move circularly around. The flexible connection 39 hingedly coupled to the first arm 14A defines an axis of rotation $Z_{A2}$ where the first arm 14A and the second arm 14B move circularly around.

The second adjustment set 44B of the second arms 14B includes two flexible connections 39, one of the two flexible connections 39 is coupled to the first connecting member 26A and the other flexible connection 39 is coupled to the second connecting member 26B. One of the flexible connections 39 is hingedly coupled to one of the first set of arms 14A and the other of the flexible connections 39 is hingedly coupled to another of the first set of arms 14A. The flexible connection 39 hingedly coupled to the first arm 14A and the adjustment set 44A of the second arm 14B defines an axis of rotation $Z_{B1}$ where the first arm 14A and the second arm 14B move circularly around. The flexible connection 39 hingedly coupled to the first arm 14A defines an axis of rotation $Z_{B2}$ where the first arm 14A and the second arm 14B move circularly around. In some instances, the first arm 14A may be hingedly coupled to the first adjustment set 44A and the second adjustment set 44B. Thus, movement of one adjustment set 44A, 44B may affect movement of the other adjustment set 44B, 44A.

The third adjustment set 44C of the second arms 14B includes two flexible connections 39, one of the two flexible connections 39 is coupled to the first connecting member 26A and the other flexible connection 39 is coupled to the second connecting member 26B. One of the flexible connections 39 is hingedly coupled to one of the first set of arms 14A and the other of the flexible connections 39 is hingedly coupled to the leading arm 14A₁. The flexible connection 39 hingedly coupled to the first arm 14A and the adjustment set 44A of the second arm 14B defines an axis of rotation $Z_{C1}$ where the first arm 14A and the second arm 14B move circularly around. The flexible connection 39 hingedly coupled to the leading arm 14A₁ defines an axis of rotation $Z_{C2}$ where the leading arm 14A₁ and the second arm 14B move circularly around. In some instances, the first arm 14A may be hingedly coupled to the second adjustment set 44B and the third adjustment set 44C. Thus, movement of one adjustment set 44B, 44C may affect movement of the other adjustment set 44C, 44B.

The plurality of arms 14 move circularly around the associated axis Z of the adjustment set 44 and adjacent arm 14 between the collapsed position and the expanded position. In some embodiments, at least a portion of the plurality of arms 14 move circularly around the axis A₁ between the collapsed position and the expanded position. In some instances, the plurality of arms 14 move circularly around the associated axis Z of the adjustment set 44 and adjacent arm 14. In moving around the associated axis Z, the array structure 12 moves between the collapsed position and the expanded position (FIGS. 22A-22E). In some instances, the second arm 14B that is coupled with the adjustment set 44B (see, e.g., FIGS. 11 and 22A-22E) may be fixedly positioned during operation.

The adjustable mechanism assembly 16 moves from a first position in proximity to the first end B of the array structure 12 to at second position in proximity to the second end C of the array structure 12. As the adjustable mechanism assembly 16 moves between the first position to the second position, the plurality of arms 14, which are movably coupled to the adjustable mechanism assembly 16, either directly or indirectly, begin to move circularly around the axis A₁ to an expanded position. As the adjustable mechanism assembly 16 moves between the second position to the first position, the plurality of arms 14, which are movably coupled to the adjustable mechanism assembly 16, begin to move circularly around the axis A₁ to a collapsed position. It should be understood, however, that the movement of the adjustable mechanism assembly 16 between the first position to the second position may be reversed such that the plurality of arms 14 move circularly around the associated axes Z to a collapsed position. It should also be understood that the movement of the adjustable mechanism assembly 16 between the second position to the first position may be reversed such that the plurality of arms 14 move circularly around the associated axes Z to an expanded position.

The plurality of arms 14, except the second arm 14B that is connected to the adjustment set 44B, may move around the corresponding axes Z independently, such that each arm 14 moves independent of each other, semi-collectively, such that some of the plurality of arms 14 move together, or collectively, such that all of the plurality of arms 14 move together. Each of the plurality of arms 14 may be movably coupled to one or more adjacent arms 14. As depicted in the figures, the plurality of arms 14 move collectively as the adjustable mechanism assembly 16 moves between the first and second positions. At least a portion of the plurality of arms 14 may be equally spaced relative to each other as the plurality of arms 14 move between the collapsed position and the expanded position, and vice versa. FIGS. 9-11 depict the array structure 12 in intermediary positions between the expanded position of FIGS. 5-8 and the collapsed position of FIGS. 12-18. It should be understood that the intermediary positions occur as the array structure 12 moves between the collapsed position to the expanded position and between expanded position to the collapsed position.

In operation, the translating components 30 of the array structure 12 are moved between a first position in proximity to the first end B of the array structure 12 and a second position in proximity to the second end C of the array structure 12 along axis A₁ to transition the array structure 12 from the collapsed position to the expanded position. Since the connecting arm 28 is coupled with the translating component 30, movement of the translating component 30 causes the connecting arm 28 to move in the same direction. As the connecting arm 28 moves in the direction toward the second end C of the array structure 12, the connecting member 26 pivots about pivot 27 such that the end of the connecting member 26 opposite the pivot 27 rotatably moves toward the second end C. Movement of the connecting member 26 thereby causes the support member 22 to move toward the second end C and in the direction of the arm 14B. The movement of the support member 22 towards the arm 14B causes the arm 14A that is hingedly coupled to the support member(s) 22 and to the adjustment set(s) 44 of the arm 14B to move circularly about the corresponding axes Z and further away from the adjacent arm(s) 14B. The support member 22 moves from a collapsed position (see, e.g., FIGS. 13 and 16-18), where each support member 22 is substantially parallel to the axis A₁, to an expanded position where each support member is substantially perpendicular to the axis $A_1$. As the support member 22 moves from a substantially parallel configuration to a substantially perpendicular configuration relative to the axis $A_1$, the connecting member 26 moves closer to the arm 14B. Movement of the support member 22 causes the arm 14B and the guide member 31 to rotate relative to the axis Z. Once the translating component 30 reaches the second position in proximity to the second end C of the array structure 12, the array structure 12 will be fully expanded, as shown in FIGS. 1-3, 5-8, and 22E. Movement of the arms 14 around the corresponding axes Z is shown in FIGS. 22A-22E. In some instances, and as shown in the figures, the arms 14 rotate circularly around axis $A_1$ as the arms 14 rotate around the corresponding axes Z. In the fully expanded position, the leading arms $14A_1$ may be in close proximity thereto. In some instances, a gap may be between the two leading arms $14A_1$. In other instances, the two leading arms $14A_1$ may be in contact with each other.

In some instances, the plurality of spaced openings 34 are sized to fit one or more devices/components. For example, the plurality of spaced openings 34 are sized to fit one or more panels 36, such as, one or more solar panels and/or one or more thermal panels. Reference to, for example, one or more solar panels does not limit the array assembly 10 to only solar panels. Other panels may be substituted for one or more of the solar panels without departing from the spirit/ scope of this disclosure. The one or more solar panels are mounted with respect to one or more arms 14 and positioned to extend at least partially within the adjacent spaced opening 34. In some instances, the one or more solar panels are mounted with respect to two adjacent arms 14 and positioned to extend at least partially within the adjacent spaced opening 34. For example, FIGS. 1-3 depict the array structure 12 in the expanded position and a plurality of solar panels 36 mounted with respect to the plurality of arms 14. The plurality of solar panels 36 are hingedly coupled so as to move between the expanded position and the collapsed position. For example, FIG. 21 depicts two adjacent arms 14 and one or more solar panels 36 hingedly coupled to the two adjacent arms 14. FIGS. 23-25 depict the unfolding of the array structure 12 including a plurality of solar panels 36.

In operation, the translating components 30 of the array structure 12 are moved between a second position in proximity to the second end C of the array structure 12 and a first position in proximity to the first end B of the array structure 12 and along axis $A_1$ to transition the array structure 12 from the expanded position to the collapsed position. Since the connecting arm 28 is coupled with the translating component 30, movement of the translating component 30 causes the connecting arm 28 to move in the same direction. As the connecting arm 28 moves in the direction toward the first end B of the array structure 12, the connecting member 26 pivots about pivot 27 such that the end of the connecting member 26 opposite the pivot 27 rotatably moves toward the first end B. Movement of the connecting member 26 thereby causes the support member 22 to move away from the second end C and in the direction of the arm 14A. The movement of the support member 22 away from the arm 14B causes the arm 14A that is hingedly coupled to the support member(s) 22 and to the adjustment set(s) 44 of the arm 14B to move circularly about the corresponding axes Z and further away from the adjacent arm(s) 14B. The support member 22 moves from an expanded position (see, e.g., FIGS. 5, 6, and 8), where each support member 22 is substantially perpendicular to the axis $A_1$, to a collapsed position where each support member is substantially parallel to the axis $A_1$ (see, e.g., FIGS. 12-21). As the support member 22 moves from a substantially perpendicular configuration to a substantially parallel configuration relative to the axis $A_1$, the connecting member 26 moves away from the arm 14B. Movement of the support member 22 causes the arm 14B and the guide member 31 to rotate relative to the axis Z. Once the translating component 30 reaches the first position in proximity to the first end B of the array structure 12, the array structure 12 will be fully collapsed, as shown in FIGS. 12-22A. Movement of the arms 14 around the corresponding axes Z is shown in FIGS. 22A-22E. In the fully collapsed position, the plurality of arms 14 are in close proximity with adjacent arms 14. In some instances, the plurality of arms 14 may be in contact with adjacent arms 14. In other instances, the plurality of arms 14 may be spaced a distance from the adjacent arms 14.

Referring to FIGS. 1-3, the array structure 12 is movably coupled to the mast structure 102. The mast structure 102 is movably coupled to the base structure 202. The legs 302 are movably coupled to the base structure 202 and configured to extend a distance to be positioned on a surface, such as the ground. The base structure 202 provides support for the mast structure 102 so as to enable the mast structure 102 to extend a vertical distance from the base structure 202. Extension of the mast structure 102 enables the array structure 12 to be expanded. It should be understood, however, that alternative components may be used based on the desired functionality of the array structure 12. Thus, for example, the array structure 12 may be utilized without the mast structure 102 and/or without the base structure 202 and/or without the legs 302.

Referring to FIGS. 27A-27C, the mast structure 102 defines a longitudinal axis $L_1$ that extends between a first end 104 and a second end 106. The first end 104 of the mast structure 102 includes an engagement component 108 that is configured to engage with the array structure 12, either directly or indirectly. When engaged, the array structure 12 may circularly rotate relative to the longitudinal axis $L_1$ of the mast structure 102. The array structure 12 is configured to rotate between about −360 degrees and about 360 degrees. The array structure 12 is configurable to rotate and stop at any position between about −360 degrees and about 360 degrees. Additionally, the array structure 12 may be angled relative to the longitudinal axis $L_1$ of the mast structure 102 between about 0 degrees and about 90 degrees (see, e.g., FIGS. 1-3).

Referring to FIGS. 1-3, 23-25, and 27A-27C, at least the engagement component 108 of the mast structure 102 is connected to the array structure 12. The mast structure 102 includes an extendable component 110 that raises and lowers the array structure 12 relative to the ground. In some instances, the extendable component 110 includes a plurality of extendable components 110A, 110B, 110C. It should be understood that more or less extendable components may be used. The reference to three extendable components 110 is by no means intended to be limiting and is merely providing a single example of the mast structure 102. The plurality of extendable components 110A, 110B, 110C may be telescoping and/or may be layered such that each of the extendable components 110A, 110B, 110C is coupled with an adjacent of the extendable component 110A, 110B, 110C (see also FIGS. 34A-36B). The plurality of extendable components 110A, 110B, 110C may slide/extend relative to each other between a first extended position (see, e.g., FIGS. 1-3 and 23-25) and a second collapsed position (see, e.g., FIG. 27A), and positions therebetween. The mast structure 102 includes a runner component 112 that is configured to directly or indirectly move the mast structure 102 between the first extended position and the second collapsed position. The runner component 112 may be a rod (e.g., threaded, partially threaded, smooth), a screw drive, a rope, a cable, a chain, which is configured to pull and/or push one or more of the extendable components 110A, 110B, 110C. For example, the runner component 112 is a chain (see, e.g., FIG. 27C).

The runner component 112 is connected to at least two gears 114A, 114B, which are each spaced a distance from the others. For example, the first gear 114A may be positioned in proximity to the first end 104 of the mast structure 102 and the second gear 114B may be positioned in proximity to the second end 106 of the mast structure 102. The gears 114 may be positioned along axis $L_1$. The gears 114 are mounted with respect to the second extendable component 110B and movably coupled to the first and third extendable components 110A, 110C, either directly or indirectly. The runner component 112 is movably coupled to the gears 114. The second gear 114B is movably coupled to a mechanism 116 that is configured to directly or indirectly move the runner component 112 to extend/collapse the mast structure 102. The mechanism 116 may be a motor, hand crank or pulley, and variations thereof. Thus, activation of the mechanism 116 causes the second gear 114B to rotate, thereby causing the runner component 112 to move in a loop around the first and second gears 114A, 114B.

The first and third extendable components 110A, 110C include a plurality of gear-like teeth 120 that extend along the axial distance of the first and third extendable components 110A, 110C. The gear-like teeth 120 engage with the runner component 112 such that movement of the runner component 112 causes the extendable components 110A, 110B to advance axially, either in the direction of the first end 104 or in the direction of the second end 106. The mast structure 102 includes one or more tensioner wheels 118 that are configured to apply pressure against the runner component 112 to maintain engagement with the gear-like teeth 120.

In the collapsed position, the extendable components 110A, 110B, 110C are generally positioned such that the axial length of each extendable component 110 is in proximity to the other extendable components 110. In operation, the mechanism 116 is activated thereby moving the runner component 112 around the first and second gears 114A, 114B. The runner component 112, being in contact with the gear-like teeth 120 of the third extendable component 110C, begins to move the first and second extendable components 110A, 110B axially relative to the third extendable component 110C, in the direction of the first end 104 (see, e.g., FIG. 27C). At a predetermined position, for example in proximity to the end of the third extendable component 110C, the first extendable component 110A begins to move axially relative to the second extendable component 110B. The runner component 112 is in contact with the gear-like teeth 120 of the first extendable component 110A (see, e.g., FIG. 27B). The runner component 112 continues to operate until the extendable components 110 reach the desired expanded position (see, e.g., FIGS. 23-25). To collapse the mast structure 102 from the expanded position, the runner component 112 is activated by the mechanism 116 to move the first extendable component 110A axially relative to the second extendable component 110B, in the direction of the second end 106. Then, the first and second extendable components 110A, 110B move axially relative to the third extendable component 110C in the direction of the second end 106. Movement of the runner component 112 occurs until the extendable components 110A, 110B, 110C are generally positioned such that the axial length of each extendable component 110 is in proximity to the other extendable components 110.

In another embodiment, referring to FIGS. 34A-36B, the mast structure 102 includes the plurality of extendable components 110A, 110B, 110C, 110D, 110E. Each of the extendable components 110 defines a first end that correlates to the first end 104 of the mast structure 102 and a second end that correlates to the second end 106 of the mast structure 102. It should be understood that more or less extendable components may be used. The reference to five extendable components 110 is by no means intended to be limiting and is merely providing a single example of the mast structure 102. The plurality of extendable components 110A, 110B, 110C, 110D, 110E are layered such that each of the extendable components 110A, 110B, 110C, 110D, 110E is coupled with an adjacent of the extendable component 110A, 110B, 110C, 110D, 110E. The plurality of extendable components 110A, 110B, 110C, 110D, 110E slide/extend relative to each other between the first extended position (see, e.g., FIGS. 34A-34B) and the second collapsed position (see, e.g., FIGS. 35A-36B), and positions therebetween.

The mast structure 102 includes at least one gear 114 mounted with respect to one of the extendable components 110. For example, the at least one gear 114 may be mounted with respect to the extendable component 110 positioned at or near the middle of the plurality of extendable components, such as extendable component 110C. However, it should be understood that the gear or gears 114 may be mounted with respect to alternative extendable components 110. The gear 114 is movably attached to a mechanism (not shown), such as a motor, hand crank or pulley, and variations thereof. The runner component 112, such as a chain, is movably coupled to the gear 114. The runner component 112 is fixedly attached to at least one extendable component 110. The runner component 112 is fixedly attached to adjacent extendable components 110 from the extendable component 110 where the gear 114 is mounted. For example, a first runner end 122 of the runner component 112 is fixedly attached to the extendable component 110B and a second runner end 124 of the runner component 112 is fixedly attached to the extendable component 110D. It should be understood that mounting variations of the gears 114 and/or the runner component 112 is anticipated.

The second runner end 124 of the runner component 112 is fixedly attached to the second end 106 of the extendable component 110D and the remaining portion of the runner component 112 extends in the direction of the first end 104. The runner component 112 wraps at least partially around the gear 114 mounted to the extendable component 110C and extends in the direction of the second end 106. The first runner end 122 of the runner component 112 is fixedly attached to the second end 106 of the extendable component 110B. Thus, movement of the gear 114 in a first direction causes the extendable components 110 to extend (FIGS. 34A-34B) and movement of the gear 114 in a second opposite direction causes the extendable components 110 to collapse (FIGS. 35A-36B).

The mast structure 102 includes a plurality of pulleys (or the like) 126 positioned relative to the extendable components 110. At least one cable component 128 is coupled to at least one of the plurality of pulleys. The cable component 128 may be rope, chain, wire, cable, and variations thereof. The mast 102 includes a plurality of sets which include at least one pulley 126 and at least one cable component 128. The plurality of sets will be designated by using an A, B, C, D after reference number 126 for the pulley and 128 for the cable component. It should be understood that more or less sets of pulleys 126 and cable components 128 may be used. The reference to four sets of pulleys 126 and cable components 128 is by no means intended to be limiting and is merely providing a single example of the mast structure 102. The cable component 128 is fixedly attached to at least one extendable component 110. For example, a first cable end 130 of the cable component 128 is fixedly attached to one end of the extendable component and a second cable end 132 of the cable component 128 is fixedly attached to another end of the extendable component 110. It should be understood that mounting variations of the pulleys 126 and/or the cable component 128 is anticipated.

Referring to the first set, designated with an A, the first cable end 130A of the cable component 128A is fixedly attached to the first end 104 of the extendable component 110A. The cable component 128A wraps around the pulley 126A mounted to the second end 106 of the extendable component 110B. The second cable end 132A of the cable component 128A is fixedly attached to the first end 104 of the extendable component 110C. Referring to the second set, designated with a B, the first cable end 130B of the cable component 128B is fixedly attached to the second end 106 of the extendable component 110A. The cable component 128B wraps around the pulley 126B mounted to the first end 104 of the extendable component 110B. The second cable end 132B of the cable component 128B is fixedly attached to the second end 106 of the extendable component 110C. Referring to the third set, designated with a C, the first cable end 130C of the cable component 128C is fixedly attached to the first end 104 of the extendable component 110C. The cable component 128C wraps around the pulley 126C mounted to the second end 106 of the extendable component 110D. The second cable end 132C of the cable component 128C is fixedly attached to the first end 104 of the extendable component 110E. Referring to the fourth set, designated with a D, the first cable end 130D of the cable component 128D is fixedly attached to the second end 106 of the extendable component 110C. The cable component 128D wraps around the pulley 126D mounted to the first end 104 of the extendable component 110D. The second cable end 132D of the cable component 128D is fixedly attached to the second end 106 of the extendable component 110E.

In operation, movement of the gear 114 in a first direction engages the runner component 112 which causes the extendable components 110B and 110D to extend (FIGS. 34A-34B). The extendable components 110A, 110C, and 110E are coupled to the extendable components 110B and 110D by the plurality of cable components 128. Thus, movement of the extendable components 110B and 110D by the runner component 112 causes the plurality of cable components 128 to extend. The extensible components 110 may extend in the direction of the first end 104 or in the direction of the second end 106. For example, the extendable components 110 may extend in the direction of the first end 104 such that the extendable component 110A leads the extension. The extendable components 110 may extend in the direction of the second end 106 such that the extendable component 110E leads the extension. Thus, the extension of the extendable components 110 is bidirectional. In a similar operation, movement of the gear 114 in a second opposite direction engages the runner component 112 which causes the extendable components 110B and 110D to collapse, which causes the plurality of cable components 128 to retract, thereby causing the extendable components 110A, 110C, and 110E to collapse (FIGS. 35A-36B). In the collapsed position, the extendable components 110 are generally positioned such that the axial length of each extendable component 110 is in proximity to the other extendable components 110.

Referring to FIGS. 1-3, 27, 28A-28B, and 32A-32C, the base structure 202 includes a stem 204 defining a first end 206 and a second end 208. The stem 204 is connected to the third extendable component 110C of the mast structure 102. In some instances, the third extendable component 110C and the stem 204 may be the same component. The stem 204 includes three separate components, each extending between the first end 206 and the second end 208. The three stem components 204 may be parallel with each other. The base structure 202 defines an axis $A_2$ that extends along the stem 204 and is central to the three stem components 204. The base structure 202 may be shaped as a pyramid (e.g., tetrahedron, triangular pyramid) including three arms 210 that are movably coupled to each stem component 204. The arms 210 are configured to move between a first position along the stem 204 where the arms 210 are substantially parallel to the stem 204 and a second position where the arms 210 are substantially angled relative to the stem 204, as shown in FIGS. 1-3, 27, and 28A-28B. In the first position, the base structure 202 is in a collapsed position and in the second position, the base structure 202 is in an expanded position. For example, the arms 210 are connected to a glide component (not shown) that is sized and shaped to engage with the stem component 204. The glide component (not shown) is configured to move axially relative to the stem component 204 between the first end 206 and the second end 208. The base structure 202 includes a pulley 222 coupled to an end of each arm 210 in proximity to the stem component 204. The pulley 222, in part, deploys the legs 302.

The base structure 202 includes three support members 212 that are pivotally coupled to the corresponding stem component 204 at interface 219. The interface 219 may be a pin, bolt, rivet, or another component/feature that functions similarly. The base structure 202 includes three support arms 214 that are each pivotally coupled to a corresponding support member 212 at interface 221. The interface 221 may be a pin, bolt, rivet, or another component/feature that functions similarly. Each of the support arms 214 is fixedly mounted with respect to a corresponding arm 210. The support arm 214 is pivotally coupled to the stem 204 at interface 218. The interface 218 may be a pin, bolt, rivet, or another component/feature that functions similarly. The support arm 214 is hingedly coupled to a support connector 215 provided by one or more flexible connections 220, such as hinges, at each connection point. Other flexible connections 220 may include but are not limited to a flexible material, such as cloth, as well as pivots, such as ball and socket combinations, pivots, rods, dowels, and the like. The support connector 215 is hingedly coupled to an extension component 217 that is hingedly coupled to the corresponding stem component 204.

Each set of the at least one support member 212, the at least one stem component 204, the at least one support arm 214, and the at least one support connector may be referred to as 226. Each set 226 may be referred to as one of base adjustment set 226A, base adjustment set 226B, and base adjustment set 226C. However, it should be understood that the three base adjustment sets 226A, 226B, and 226C may be collectively referred to as reference number 226 and distinguishing between the three base adjustment sets 226 enables a more thorough explanation of the base structure 202. It does not, however, inherently indicate differences between the three base adjustment sets 226, unless otherwise expressly stated. It should also be understood that although the discussion pertains to three base adjustment sets 226A, 226B, 226C, more or less base adjustment sets 226 may be utilized. It should also be understood that although each of arms 210 includes the base adjustment set 226 in the current configuration, alternative configurations are considered which include, for example, arms 210 that do not include the base adjustment set 226.

Referring to FIGS. 32A-32C, at least one of the base adjustment sets 226 of the arms 210 include at least two flexible connections 228, such as hinges. At least two of the base adjustment sets 226 of the arms 210 include at least one flexible connection 228, such as a hinge. Each adjustment set 226 is separated by at least one extension component 217, which is hingedly coupled to the corresponding stem component 204 by the flexible connection 228. Each adjustment set 226 and the adjacent extension component 217 define an axis Y. For example, each of the flexible connections 228 of each adjustment set 226 and the adjacent extension component 217 define the axis Y. The adjustment set 226 and the adjacent extension component 217 move circularly around the axis Y between the collapsed position and the expanded position. FIG. 32A partially depicts the base structure 202 in the collapsed position. FIG. 32B partially depicts the base structure 202 at an intermediary position between the collapsed position of FIG. 32A into the expanded position of FIG. 32C. FIG. 32C partially depicts the base structure 2022 in the expanded position.

The first base adjustment set 226A of the arm 210 includes a flexible connection 228 that is coupled to the support arm 214. The first base adjustment set 226A of the arm 210 includes the flexible connection 228 that is hingedly coupled to the adjacent extension component 217. The flexible connection 228 hingedly coupled to the extension component 217 and the first base adjustment set 226A defines an axis of rotation $Y_{A1}$ where the extension component 217 moves circularly around.

The second base adjustment set 226B of the arm 210 includes two flexible connections 228, one of the two flexible connections 228 is coupled to the first support arm 214 and the other flexible connection 228 is coupled to the second support arm 214. One of the flexible connections 228 is hingedly coupled to the adjacent extension component 217 and the other of the flexible connections 228 is hingedly coupled to another of the adjacent extension components 217. The flexible connection 228 hingedly coupled to the adjacent extension component 217 and the base adjustment set 226A of the arm 210 defines an axis of rotation $Y_{B1}$ where the arm 210 of the second base adjustment set 226B and the extension component 217 move around. The flexible connection 228 hingedly coupled to the adjacent extension component 217 defines an axis of rotation $Y_{B2}$ where the extension component 217 move circularly around. In some instances, the extension component 217 may be hingedly coupled to the first base adjustment set 226A and the second base adjustment set 226B. Thus, movement of one base adjustment set 226A, 226B may affect movement of the other base adjustment set 226B, 226A.

The third base adjustment set 226C of the arm 210 includes a flexible connection 228 that is coupled to the support arm 214. The third base adjustment set 226C of the arm 210 includes the flexible connection 228 that is hingedly coupled to the adjacent extension component 217. The flexible connection 228 hingedly coupled to the extension component 217 and the third base adjustment set 226C defines an axis of rotation $Y_{C1}$ where the extension component 217 moves circularly around. In some instances, the extension component 217 may be hingedly coupled to the second base adjustment set 226B and the third base adjustment set 226C. Thus, movement of one base adjustment set 226B, 226C may affect movement of the other base adjustment set 226C, 226B.

The plurality of arms 210 and stem components 204 move circularly around the associated axis Y of the base adjustment set 226 and adjacent extension component 217 between the collapsed position and the expanded position. In some instances, the plurality of arms 210 and stem components 204 move circularly around the associated axis Y of the base adjustment set 226 and adjacent extension component 217. In moving around the associated axis Y, the base structure 202 moves between the collapsed position and the expanded position (FIGS. 32A-32C). In some instances, the arm 210 and stem component 204 that is coupled with the base adjustment set 226A (see, e.g., FIGS. 32A-32C) may be fixedly positioned during operation.

The base structure 202 includes a runner component (not shown) that is configured to directly or indirectly move the base structure 202 between the first collapsed position and the second expanded position. The runner component (not shown) may be a rod (e.g., threaded, partially threaded, smooth), a screw drive, a rope, a cable, which is configured to pull and/or push one or more of the arms 210, support members 212, and support arms 214, either directly or indirectly. In some instances, the runner component (not shown) is a screw drive that is rotatably coupled to the stem components 204. The stem components 204 are connected to one or more gear mechanisms 224. Thus, rotation of the runner component rotates the stem components 204 around the associated axis Y and the gear mechanisms 224 ensure movement of each stem component 204 in unison. A mechanism (not shown) is configured to directly or indirectly move the runner component to extend/collapse the base structure 202. The mechanism (not shown) may be a motor, hand crank or pulley, and variations thereof.

In operation, the mechanism (not shown) activates the runner component (not shown) to rotate the stem components 204 around the associated axis Y. The gear mechanisms 224 enable the stem components 204 to rotate together relative to the associated axis Y. In some instances, and as shown in the figures, the stem components 204 rotate circularly around axis $A_2$ as the stem components 204 rotate around the corresponding axes Y. As the stem components 204 rotate, the extension component 217 rotates and moves the support connector 215 from a substantially vertical position, relative to the axis $A_2$ to a substantially horizontal position. Movement of the stem component 204 in addition to movement of the support connector 215 causes the corresponding support members 212 and support arms 214 to pivot relative to the stem 204 at interfaces 219 and 218, respectively. Movement of the support members 212 and support arms 214 thereby moves the corresponding arms 210 angularly relative to the stem 204. As the angle between the arm 210 and the stem 204 increases (i.e., movement into the expanded position), it causes the corresponding glide component (not shown) to translate along the stem 204 from the first end 204 to the second end 206.

Referring to FIGS. 28, 30, and 30, the legs 302 are mounted with respect to the arms 210 of the base structure 202 and extendable therefrom. A first end 304 of the legs 302 are connected to a first end 216 of the arms 210. In some instances, the legs 302 includes a plurality of extendable components 302A, 302B, 302C. It should be understood that more or less extendable components may be used. The reference to three extendable components 302A, 302B, 302C of the legs 302 is by no means intended to be limiting and is merely providing a single example of the legs 302. The plurality of extendable components 302A, 302B, 302C may be telescoping and/or may be layered such that each of the extendable components 302A, 302B, 302C is coupled with an adjacent of the extendable component 302A, 302B, 302C. The plurality of extendable components 302A, 302B, 302C may slide/extend relative to each other between a first extended position (see, e.g., FIGS. 1-3 and 31) and a second collapsed position (see, e.g., FIG. 30), and positions therebetween.

In operation, the array assembly 10 is delivered to and positioned at a desired location in the collapsed position (see, e.g., FIGS. 4 and 33A). The base structure 202 and the legs 302 extend vertically relative to the remainder of the collapsed array assembly 10 until the base structure 202 and the legs 302 reach a predetermined position, the progression of which is shown in FIGS. 33B-33F. At the predetermined position, the base structure 202 is expanded, as described herein, the progression of which is shown in FIGS. 33G-33P. For example, the mechanism (not shown) activates the runner component (not shown) to rotate the stem components 204 around the axis A2. The gear mechanisms 224 enable the stem components 204 to rotate together relative to the axis A2. As the stem components 204 rotate, the extension component 217 rotates and moves the support connector 215 from a substantially vertical position, relative to the axis A2 to a substantially horizontal position. Movement of the stem component 204 in addition to movement of the support connector 215 causes the corresponding support members 212 and support arms 214 to pivot relative to the stem 204 at interfaces 219 and 218, respectively. Movement of the support members 212 and support arms 214 thereby moves the corresponding arms 210 angularly relative to the stem 204. As the angle between the arm 210 and the stem 204 increases (i.e., movement into the expanded position), it causes the corresponding glide component (not shown) to translate along the stem 204 from the first end 204 to the second end 206. Prior to and/or once the base structure 202 is in the expanded position, the legs 302 are extended so as to be positioned in direct or indirect contact with the ground (or another surface), the progression of which is shown in FIGS. 33O and 33P.

Once the base structure 202 and the legs 302 are in the expanded position, the mast structure 102 is extended vertically to a predetermined position at a distance from the base structure 202, the progression of which is shown in FIGS. 33Q-33T. For example, the mechanism 116 of the mast structure 102 is activated thereby moving the runner component 112 around the first and second gears 114A, 114B. The runner component 112, being in contact with the gear-like teeth 120 of the third extendable component 110C, begins to move the first and second extendable components 110A, 110B axially relative to the third extendable component 110C, in the direction of the first end 104 (see, e.g., FIG. 27C). At a predetermined position, the first extendable component 110A begins to move axially relative to the second extendable component 110B. The runner component 112 is in contact with the gear-like teeth 120 of the first extendable component 110A (see, e.g., FIG. 27B). The runner component 112 continues to operate until the extendable components 110 reach the desired expanded position (see, e.g., FIGS. 23-25).

Prior to and/or once the mast structure 102 is in the expanded position, the array structure 12 begins to expand, as described herein, the progression of which is shown in FIGS. 33U-33X. The fully expanded array assembly 10 is depicted in FIGS. 1-3. For example, the translating components 30 of the array structure 12 are moved between a first position, in proximity to the first end B of the array structure 12, and a second position, in proximity to the second end C of the array structure 12 along axis A$_1$. Since the connecting arm 28 is coupled with the translating component 30, movement of the translating component 30 causes the connecting arm 28 to move in the same direction. As the connecting arm 28 moves in the direction toward the second end C of the array structure 12, the connecting member 26 pivots about pivot 27 such that the end of the connecting member 26 opposite the pivot 27 rotatably moves toward the second end C. Movement of the connecting member 26 thereby causes the support member 22 to move toward the second end C and in the direction of the arm 14B. The movement of the support member 22 towards the arm 14B causes the arm 14A that is hingedly coupled to the support member(s) 22 to move circularly about the axis A$_1$ and further away from the adjacent arm(s) 14B. As the support member 22 moves from a substantially parallel configuration to a substantially perpendicular configuration relative to the axis A$_1$, the connecting member 26 moves closer to the arm 14B. Movement of the support member 22 causes the arm 14B and the guide member 31 to rotate relative to the axis A$_1$. As the arms 14 move circularly about the axis A$_1$, the plurality of solar panels 36 unfold, as shown in FIGS. 23-25. Once the translating component 30 reaches the second position in proximity to the second end C of the array structure 12, the array structure 12 will be fully expanded, as shown in FIGS. 1-3, and 5-8. Thus, the plurality of solar panels 36 will be substantially planar. It should be understood that one or more of the structures, such as the array structure 12, the mast structure 102, the base structure 202, and/or the leg structure 302, of the array assembly 10 may move individually, in partial combination, or in combination therewith.

In some embodiments, the array assembly 10 may be a solar array assembly 10. The solar array assembly 10 may be used during a lunar expedition, for example, on the surface of the moon. The solar array assembly 10 may be used on the surface of the earth. In some embodiments, the solar array assembly 10 may be used at a location between the earth's surface and the moon's surface.

The following clauses further define particular aspects and embodiments of the present disclosure.

Clause 1. An array assembly including a base structure including a plurality of extendable legs; a mast structure movably coupled to the base structure; and an array structure movably coupled to the mast structure, the array structure including a plurality of arms spaced relative to each other, the plurality of arms are configurable between a collapsed position and an expanded position, wherein adjacent arms of the plurality of arms each define an axis of rotation, and the adjacent arms are circularly movable around the axis of rotation relative to each other between the collapsed position and the expanded position.

Clause 2. The array assembly of clause 1, wherein the base structure, the plurality of extendable legs, the mast structure, and the array structure are configurable between a collapsed position and an expanded position.

Clause 3. The array assembly of any of the preceding clauses, wherein the array structure includes the axis of rotation for each of the plurality of arms.

Clause 4. The array assembly of any of the preceding clauses, wherein the array structure in the expanded position defines a plurality of spaced openings between two adjacent arms, at least one panel mounted with respect to the adjacent arms and the spaced opening positioned therebetween.

Clause 5. The array assembly of any of the preceding clauses, wherein the array structure includes a plurality of panels mounted with respect to the adjacent arms and the spaced opening positioned therebetween, wherein the array structure in the expanded position includes the plurality of panels positioned in a planar configuration.

Clause 6. The array assembly of any of the preceding clauses, wherein the array structure defines the adjacent arms of the plurality of arms as a first set of arms and a second set of arms, the array structure further includes a plurality of support members, at least one support member of the plurality of support members movably coupled to a corresponding arm of the first set of arms, wherein the at least one support member is movably coupled with respect to an adjustable mechanism assembly, the adjustable mechanism assembly is configured to move between a first position and a second position such that movement of the adjustable mechanism assembly moves the at least one support member, wherein movement of the at least one support member between a first position and a second position moves the corresponding arm of the first set in a direction circular to the axis of rotation and away from an adjacent arm of the second set of arms.

Clause 7. The array assembly of any of the preceding clauses, wherein the adjustable mechanism assembly is aligned with a longitudinal axis such that each arm of the first and second set of arms move circularly around the adjustable mechanism assembly during movement between the collapsed position and the expanded position.

Clause 8. The array assembly of any of the preceding clauses, wherein the array structure is configured to tilt relative to a longitudinal axis of the mast structure.

Clause 9. An array structure configured to engage with an array assembly, the array structure including a first set of arms and a second set of arms spaced relative to each other, at least one of the arms of the first set of arms and at least one of the arms of the second set of arms define an axis of rotation therebetween; an adjustable mechanism assembly aligned with a longitudinal axis and configured to move between a first position and a second position; each of the first set of arms movably coupled to a corresponding support member; and each of the second set of arms movably coupled to the adjustable mechanism assembly, wherein movement of the adjustable mechanism assembly between the first position and the second position causes the corresponding support member to move from a first position to a second position, wherein the corresponding support member in the second position causes each of the first set of arms to move circularly relative to the corresponding axis of rotation and in a direction away from each of the second set of arms, wherein each of the second set of arms moves circularly relative to the corresponding axis of rotation as the corresponding support member moves from the first position to the second position, wherein the array structure is in an expanded position when the corresponding support member is in the second position.

Clause 10. The array structure of any of the preceding clauses, wherein the first position of the corresponding support member is substantially parallel to the longitudinal axis and the second position of the corresponding support member is substantially perpendicular to the longitudinal axis.

Clause 11. The array structure of any of the preceding clauses, wherein the array structure is movably coupled to a mast structure of the array assembly.

Clause 12. The array structure of any of the preceding clauses, wherein movement of the corresponding support member from the second position to the first position causes the array structure to move from the expanded position to a collapsed position.

Clause 13. The array structure of any of the preceding clauses, wherein the adjustable mechanism assembly further comprises a runner component configured to move the adjustable mechanism assembly between the first position and the second position.

Clause 14. The array structure of any of the preceding clauses, wherein the runner component is selected from a group including a rod that is threaded, partially threaded, smooth, a screw drive, a rope, a cable, and combinations thereof.

Clause 15. The array structure of any of the preceding clauses, wherein the runner component is coupled to a mechanism configured to move the adjustable mechanism assembly between the first position and the second position.

Clause 16. The array structure of any of the preceding clauses, wherein the mechanism is selected from a group consisting of a motor, a hand crank, a pulley, and combinations thereof.

Clause 17. A method of moving an array assembly between a collapsed position and an expanded position, the array assembly including a base structure; a mast structure movably coupled to the base structure, and an array structure movably coupled to the mast structure, wherein the array structure includes a plurality of arms spaced relative to each other, wherein adjacent arms of the plurality of arms each define an axis of rotation, the method including moving the base structure in a vertical direction away from the mast structure and the array structure; expanding the base structure; extending the mast structure and the array structure to a predetermined position that is a distance from the base structure in the vertical direction; and expanding the array structure such that each of the plurality of arms move circularly around the axis of rotation until two leading arms of the plurality of arms move into a predetermined position.

Clause 18. The method of any of the preceding clauses further including extending a plurality of legs from the base structure in a direction away from the array structure.

Clause 19. The method of any of the preceding clauses, wherein expanding the array structure further defines the array structure as having as a first set of arms and a second set of arms, at least one support member movably coupled to a corresponding arm of the first set of arms, and an adjustable mechanism assembly movably coupled to each of the at least one support members, wherein the method further includes: moving the adjustable mechanism assembly between a first position and a second position such that movement of the adjustable mechanism assembly moves each of the at least one support members, wherein movement of each of the at least one support member between a first position and a second position moves the corresponding arm of the first set in a direction circular to the axis of rotation and away from an adjacent arm of the second set of arms.

Clause 20. The method of any of the preceding clauses, wherein expanding the array structure further includes the array structure having a plurality of panels mounted with respect to adjacent arms of the plurality of arms.

While the invention has been described with reference to preferred embodiments, it will be understood by those skilled in the art that various changes may be made, and equivalents may be substituted for the elements thereof without departing from the scope of the invention. In addition, many modifications may be made to adapt the teaching of the invention to particular use, application, manufacturing conditions, use conditions, composition, medium, size, and/ or materials without departing from the essential scope and spirit of the invention. Therefore, it is intended that the invention is not limited to the exemplary embodiments and best mode contemplated for carrying out this invention as described herein. Since many modifications, variations, and changes in detail can be made to the described examples, it is intended that all matters in the preceding description and shown in the accompanying figures be interpreted as illustrative and not in a limiting sense.

The invention claimed is:

1. An array assembly comprising:

a base structure comprising a plurality of extendable legs;

a mast structure movably coupled to the base structure; and an array structure movably coupled to the mast structure, the array structure comprising:

a plurality of arms spaced relative to each other, the plurality of arms being configurable between a collapsed position and an expanded position, the plurality of arms including a first lead arm and a second lead arm, the first lead arm moveable in a first rotational direction, the second lead arm moveable in a second rotational direction opposite of the first rotational direction; and at least one solar panel;

wherein pairs of adjacent arms of the plurality of arms define corresponding axes of rotation, wherein a first arm of each pair of adjacent arms is circularly movable around the corresponding axis of rotation relative to a second arm of each pair of adjacent arms between the collapsed position and the expanded position.

2. The array assembly of claim 1, wherein each of the base structure, the plurality of extendable legs, the mast structure, and the array structure are configurable between a respective collapsed position and a respective expanded position.

3. The array assembly of claim 1, wherein the array structure comprises the axis of rotation for each corresponding pair of adjacent arms of the plurality of arms.

4. The array assembly of claim 1, wherein the array structure in the expanded position defines a plurality of spaced openings, each spaced opening of the plurality of spaced openings positioned between two adjacent arms of the plurality of arms, wherein at least one panel is mounted with respect to the adjacent arms and the spaced opening positioned therebetween.

5. The array assembly of claim 4, wherein the array structure comprises a plurality of panels, wherein the plurality of panels includes the at least one panel, each panel of the plurality of panels mounted with respect to respective adjacent arms and the corresponding spaced opening positioned therebetween, wherein the array structure in the expanded position comprises the plurality of panels positioned in a planar configuration.

6. The array assembly of claim 1, wherein the array structure defines the adjacent arms of the plurality of arms as a first set of arms and a second set of arms, the array structure further comprises a plurality of support members, at least one support member of the plurality of support members movably coupled to a corresponding arm of the first set of arms, wherein the at least one support member is movably coupled with respect to an adjustable mechanism assembly, the adjustable mechanism assembly is configured to move between a first position and a second position such that movement of the adjustable mechanism assembly moves the at least one support member, wherein movement of the at least one support member between a first position and a second position moves the corresponding arm of the first set in a direction circular to the axis of rotation and away from an adjacent arm of the second set of arms.

7. The array assembly of claim 6, wherein the adjustable mechanism assembly is aligned with a longitudinal axis such that each arm of the first and second set of arms move circularly around the adjustable mechanism assembly during movement between the collapsed position and the expanded position.

8. The array assembly of claim 1, wherein the array structure is configured to tilt relative to a longitudinal axis of the mast structure.

9. An array structure configured to engage with an array assembly, the array structure comprising:

at least one solar panel;

a first set of arms and a second set of arms spaced relative to each other, wherein at least one of the arms of the first set of arms and at least one of the arms of the second set of arms define a pair of arms, the pair of arms defining an axis of rotation, wherein the at least one of the arms of the first set of arms rotates relative to the at least one of the arms of the second set of arms about the axis of rotation, the first set of arms including a first lead arm and a second lead arm, the first lead arm moveable in a first rotational direction, the second lead arm moveable in a second rotational direction opposite of the first rotational direction;

an adjustable mechanism assembly aligned with a longitudinal axis and configured to move between a first position and a second position;

each of the first set of arms movably coupled to a corresponding support member; and each of the second set of arms movably coupled to the adjustable mechanism assembly, wherein movement of the adjustable mechanism assembly between the first position and the second position causes the corresponding support member to move from a first support member position to a second support member position, wherein the corresponding support member in the second position causes each of the first set of arms of each pair of arms to move circularly relative to the corresponding axis of rotation and in a direction away from each corresponding arm of each pair of arms of the second set of arms, wherein each of the second set of arms moves circularly relative to the corresponding axis of rotation as the corresponding support member moves from the first support member position to the second support member position, wherein the array structure is in an expanded position when the corresponding support member is in the second support member position.

10. The array structure of claim 9, wherein the first support member position of the corresponding support member is substantially parallel to the longitudinal axis and the second support member position of the corresponding support member is substantially perpendicular to the longitudinal axis.

11. The array structure of claim 9, wherein the array structure is movably coupled to a mast structure of the array assembly.

12. The array structure of claim 9, wherein movement of the corresponding support member from the second support member position to the first support member position causes the array structure to move from the expanded position to a collapsed position.

13. The array structure of claim 9, wherein the adjustable mechanism assembly further comprises a runner component configured to move the adjustable mechanism assembly between the first position and the second position.

14. The array structure of claim 13, wherein the runner component is a runner component selected from the group consisting of a rod that is threaded, a rod that is partially threaded, a rod that is smooth, a screw drive, a rope, a cable, or combinations thereof.

15. The array structure of claim 13, wherein the runner component is coupled to a mechanism configured to move the adjustable mechanism assembly between the first position and the second position.

16. The array structure of claim 15, wherein the mechanism is a mechanism selected from the group consisting of a motor, a hand crank, a pulley, or combinations thereof.

17. A method of moving an array assembly between a collapsed position and an expanded position, the array assembly including a base structure, a mast structure movably coupled to the base structure, and an array structure movably coupled to the mast structure, wherein the array structure comprises a plurality of arms spaced relative to each other and at least one solar panel, wherein pairs of adjacent arms of the plurality of arms define corresponding axes of rotation, the method comprising:

moving the base structure in a vertical direction away from the mast structure and the array structure;

expanding the base structure;

extending the mast structure and the array structure from a first position to a second position that is a distance from the base structure in the vertical direction, the array structure beneath the base structure in the first position, the array structure above the base structure in the second position; and expanding the array structure such that a first arm of each pair of adjacent arms moves circularly around each corresponding axis of rotation until two leading arms of the plurality of arms move into a predetermined position.

18. The method of claim 17 further comprising extending a plurality of legs from the base structure in a direction away from the array structure.

19. The method of claim 17, wherein expanding the array structure further defines the array structure as having a first set of arms and a second set of arms, at least one support member movably coupled to a corresponding arm of the first set of arms, and an adjustable mechanism assembly movably coupled to each of the at least one support members, wherein the method further comprises:

moving the adjustable mechanism assembly between a first position and a second position such that movement of the adjustable mechanism assembly moves each of the at least one support members, wherein movement of each of the at least one support member between a first position and a second position moves each of the first set of arms of each pair of arms in a direction circular to the axis of rotation and away from each corresponding arm of each pair of arms of the second set of arms.

20. The method of claim 17, wherein expanding the array structure further comprises the array structure having a plurality of panels mounted with respect to adjacent arms of the plurality of arms.

\* \* \* \* \*